(12) United States Patent
Allan et al.

(10) Patent No.: US 11,414,928 B2
(45) Date of Patent: Aug. 16, 2022

(54) STORAGE CONTAINER

(71) Applicant: DECKED LLC, Ketchum, ID (US)

(72) Inventors: Calvin Allan, Ketchum, ID (US); Timothy Smith, Commerce Township, MI (US); Jake Peters, Ketchum, ID (US)

(73) Assignee: DECKED LLC, Ketchum, ID (US)

( * ) Notice: Subject to any disclaimer, the term of this patent is extended or adjusted under 35 U.S.C. 154(b) by 380 days.

(21) Appl. No.: 16/559,425

(22) Filed: Sep. 3, 2019

(65) Prior Publication Data

US 2021/0062581 A1    Mar. 4, 2021

(51) Int. Cl.
| | |
|---|---|
| *E06C 5/04* | (2006.01) |
| *B60R 5/04* | (2006.01) |
| *B60R 11/06* | (2006.01) |
| *E06C 5/44* | (2006.01) |
| *B65D 25/02* | (2006.01) |
| *B60R 9/00* | (2006.01) |
| *B60R 11/00* | (2006.01) |

(52) U.S. Cl.
CPC .............. *E06C 5/04* (2013.01); *B60R 5/042* (2013.01); *B60R 5/045* (2013.01); *B60R 9/00* (2013.01); *B60R 11/06* (2013.01); *B65D 25/02* (2013.01); *E06C 5/44* (2013.01); *B60R 2011/004* (2013.01); *B60R 2011/0094* (2013.01)

(58) Field of Classification Search
CPC .................................. E06C 5/04; B60R 11/06
USPC .............. 296/37.6, 26.15, 26.11, 62; 108/44
See application file for complete search history.

(56) References Cited

U.S. PATENT DOCUMENTS

| | | | | |
|---|---|---|---|---|
| 5,695,207 | A * | 12/1997 | Mouterde | B60P 3/14 280/163 |
| 7,464,978 | B1 * | 12/2008 | Meeks | B25H 1/00 108/44 |
| 9,415,503 | B1 * | 8/2016 | Ferragonio | B25H 1/04 |
| 10,399,511 | B2 * | 9/2019 | Peter | B66F 3/22 |
| 2015/0132090 | A1 * | 5/2015 | Giamatti | B60R 9/042 414/462 |
| 2016/0362070 | A1 * | 12/2016 | Reed, III | B60R 11/06 |
| 2017/0327052 | A1 * | 11/2017 | Singer | B60P 7/14 |

* cited by examiner

*Primary Examiner* — D Glenn Dayoan
*Assistant Examiner* — Sunsurraye Westbrook
(74) *Attorney, Agent, or Firm* — Norton Rose Fulbright US LLP; Gerard Messina; Barry Greenbaum

(57) ABSTRACT

This disclosure describes systems, devices, apparatuses, kits, and methods of accessing a container. In a particular implementation, a container includes a housing that defines a cavity and a ladder coupled to the housing. The ladder is movable relative to the housing while the ladder is coupled to the housing. The ladder is movable relative to the housing between: a first position in which the ladder is disposed within the cavity; and a second position in which the ladder is disposed outside the cavity.

21 Claims, 34 Drawing Sheets

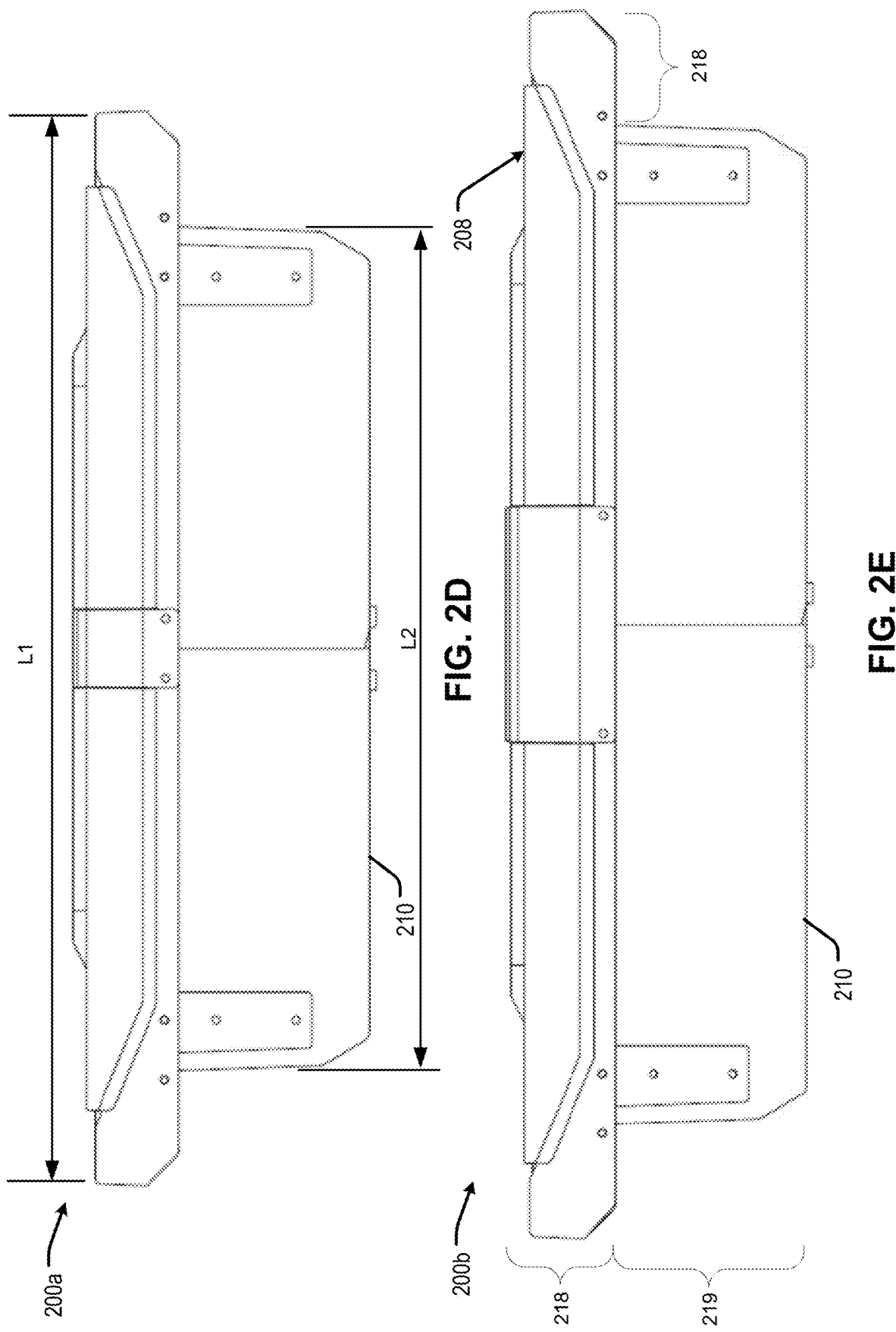

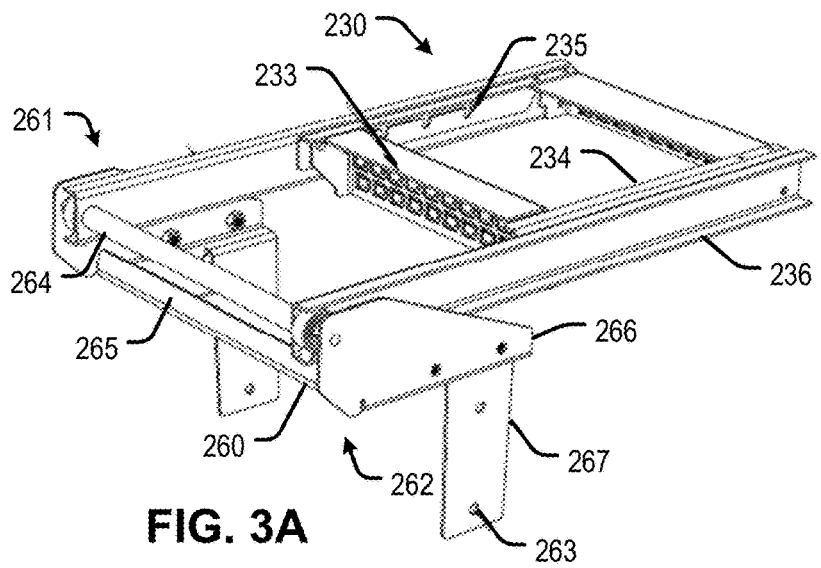
FIG. 3A
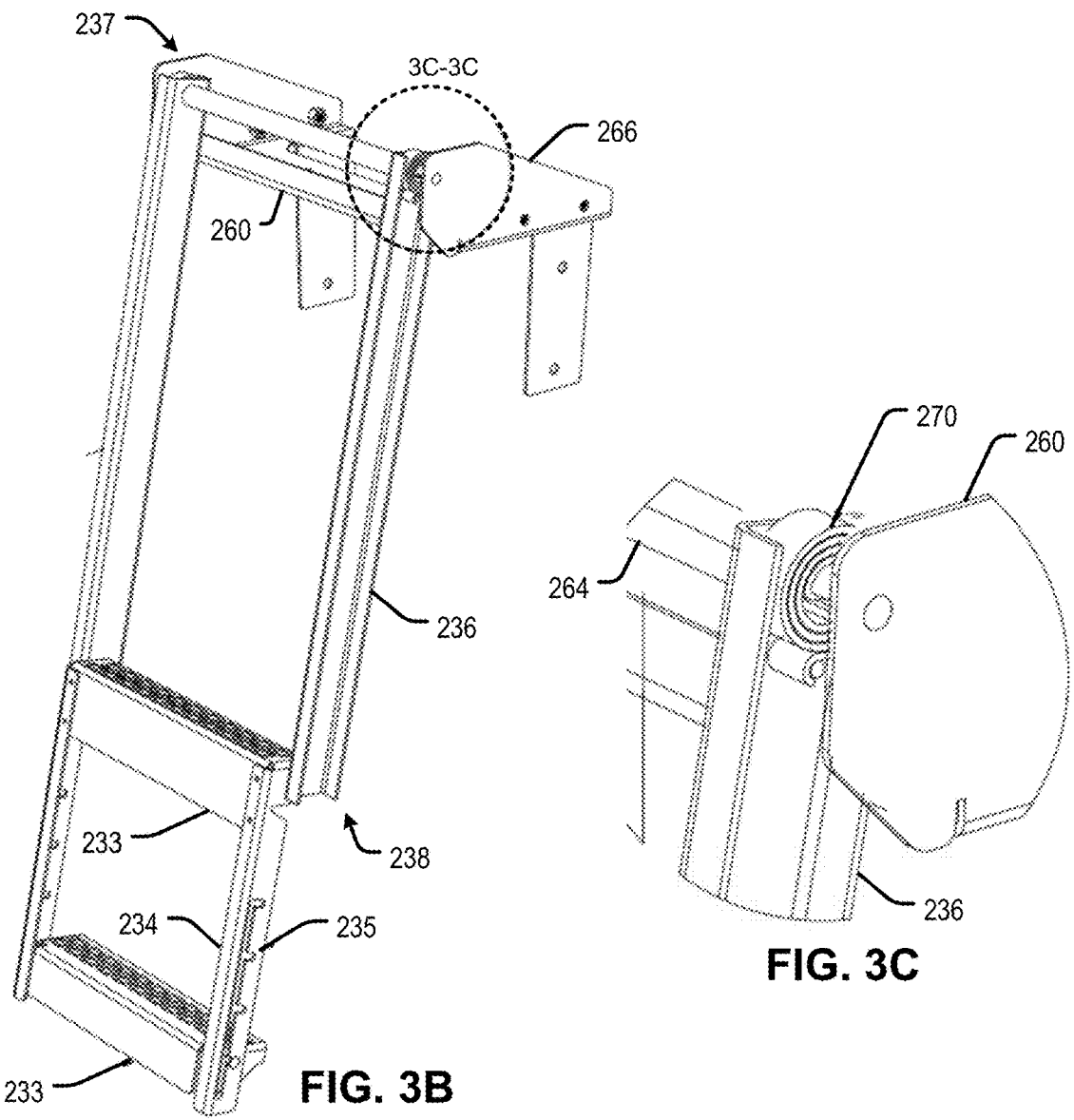
FIG. 3B
FIG. 3C

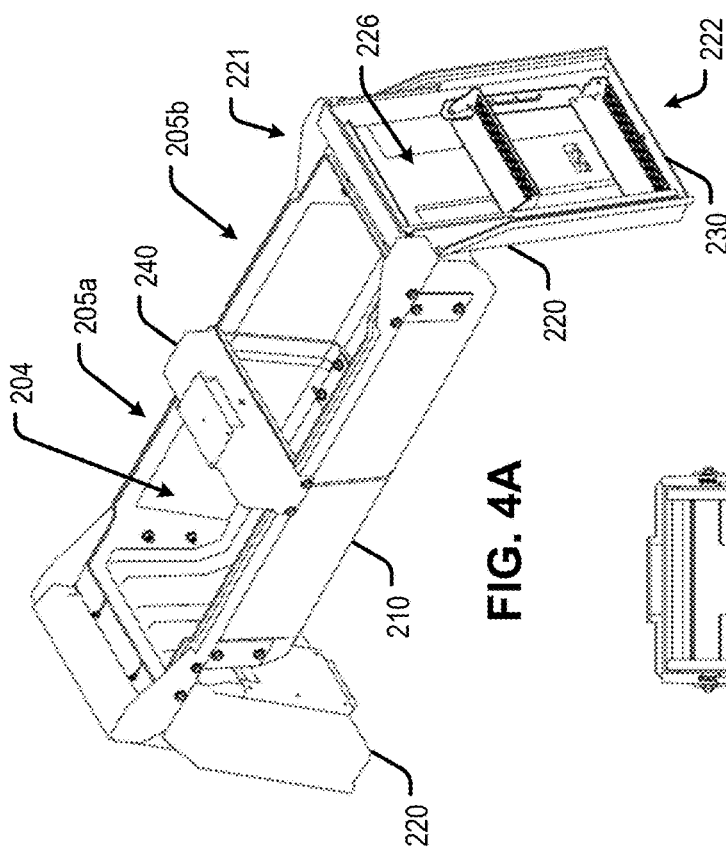
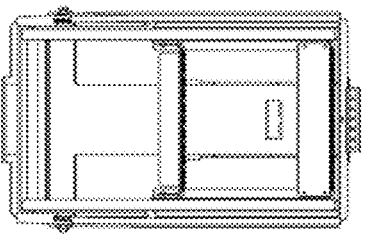
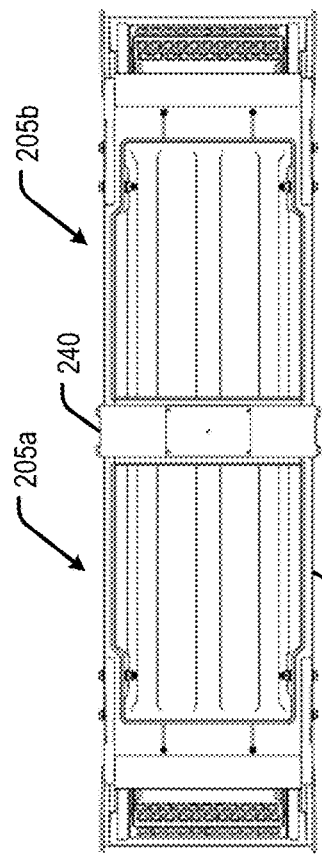
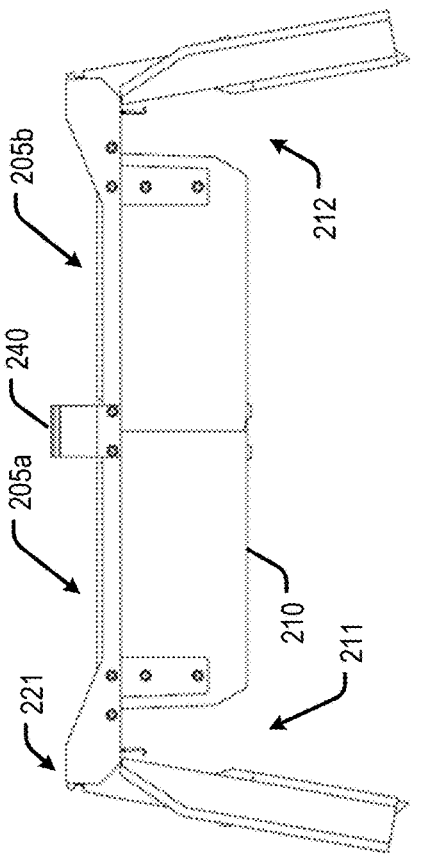
FIG. 4A
FIG. 4C
FIG. 4D
FIG. 4B

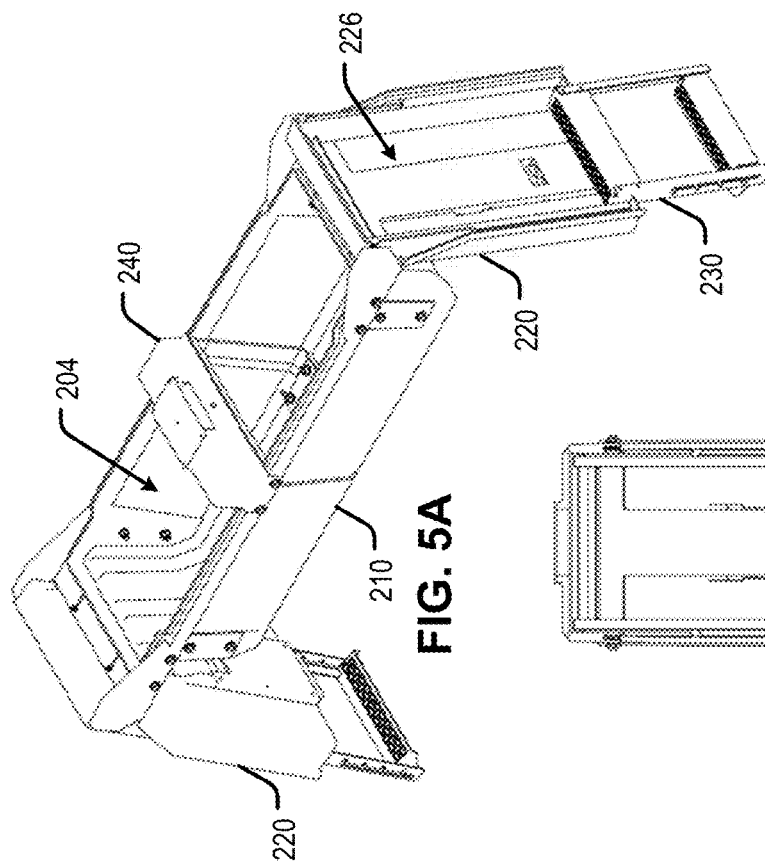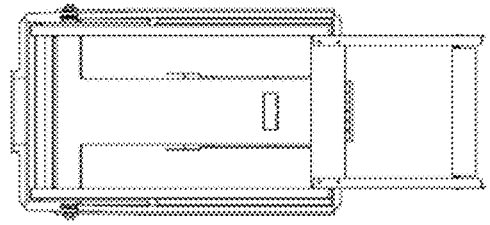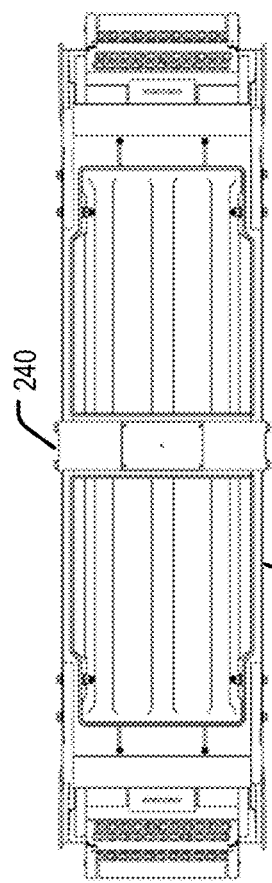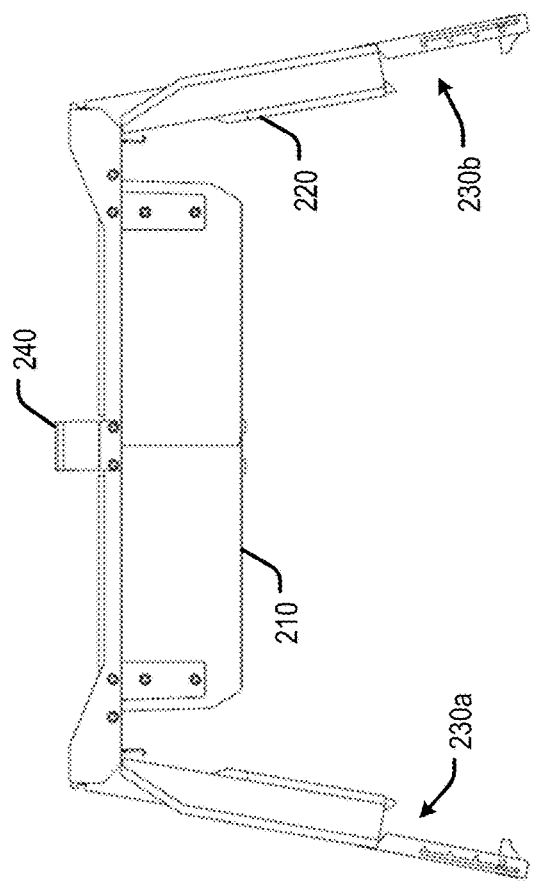
FIG. 5A
FIG. 5C
FIG. 5D
FIG. 5B

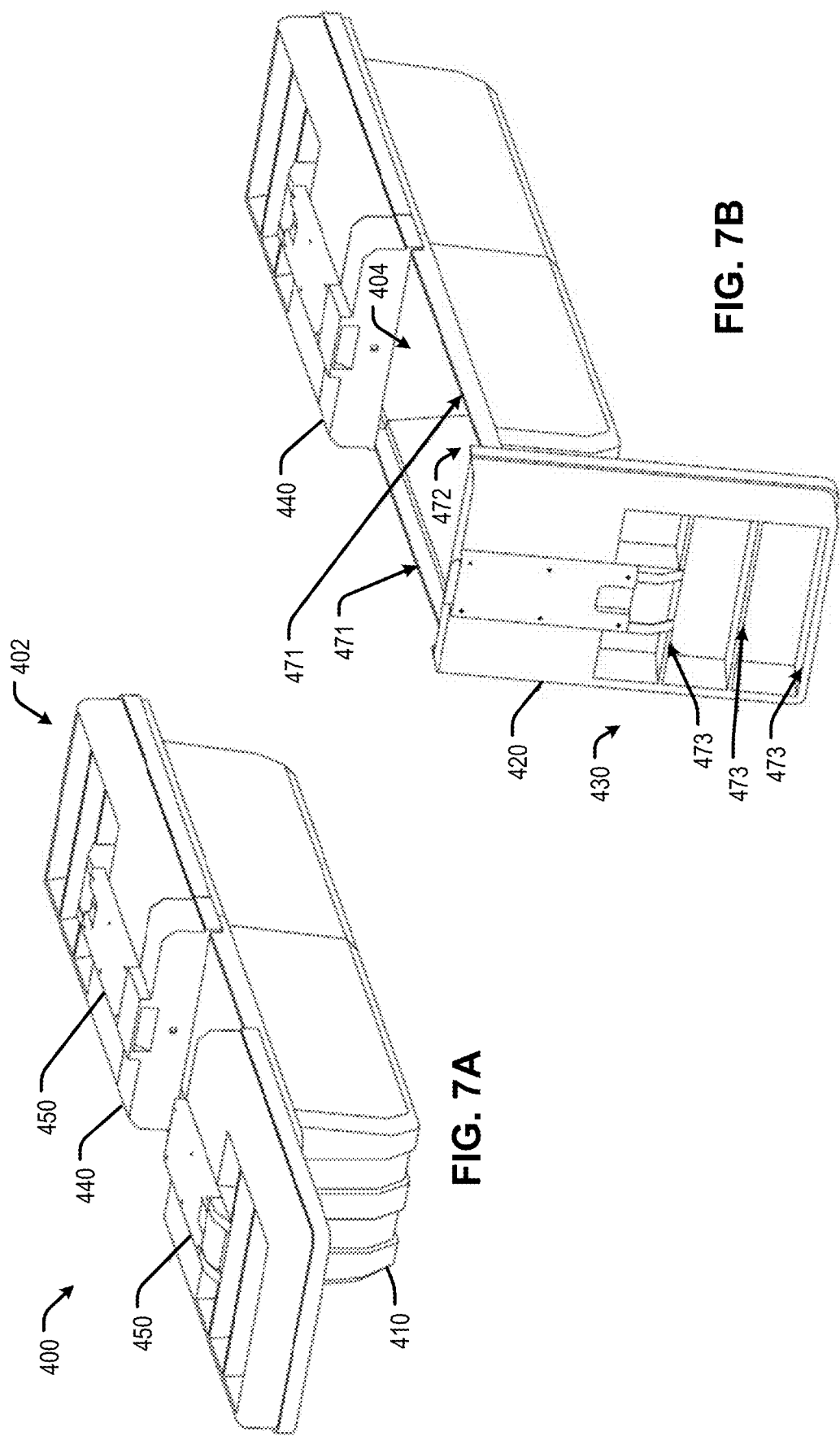

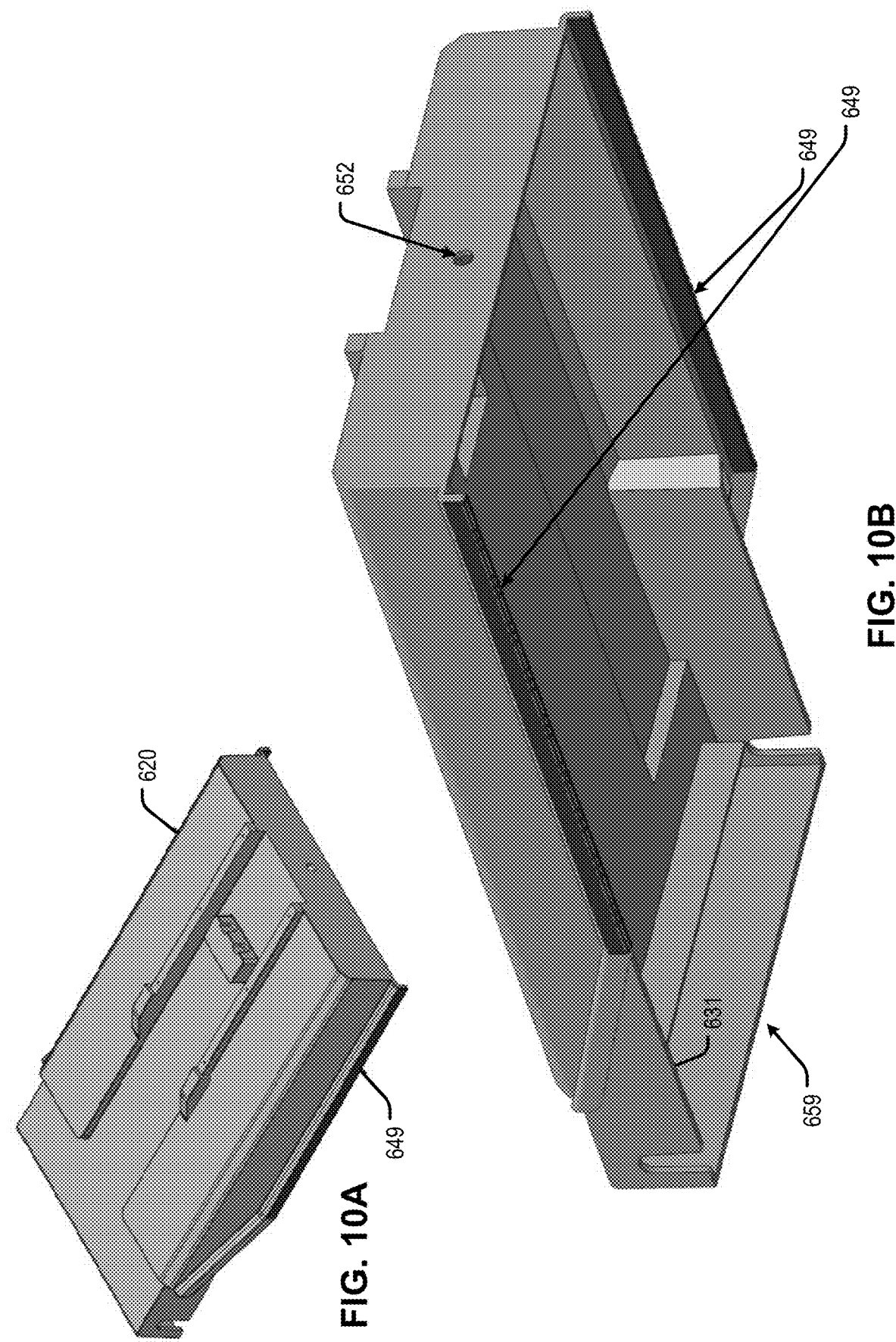

STORAGE CONTAINER

TECHNICAL FIELD

The present disclosure relates generally to apparatuses and methods for vehicle storage systems, and more particularly, but not by way of limitation, to a storage container with a deployable structure for access to the storage container.

BACKGROUND

Vehicles, such as trucks, can include one or more compartments or areas for storing and/or transporting items, such as personal items (e.g., golf clubs), tools (e.g., a hammer), machinery (e.g., a saw), etc. To illustrate, a user of a pickup truck can store or transport one or more items in a cab (or cabin) of the truck, in a bed of the truck, or both. A cab of a vehicle may provide a secure location to store one or more items and to protect the one or more items from theft and/or exposure to the weather (e.g., water, sun, dust/dirt contamination). Alternatively, items can be stored outside of the cab, such as in the bed of a truck or on a carrier mounted to the vehicle. To protect items stored outside of the cab, security measures are often present, such as locks, covers, or fasteners (e.g., straps, bolts, etc.), as illustrative, non-limiting examples. However, storage of items outside of the cab is often viewed as less secure and more accessible to a potential thief and has a greater risk of damage from expose to an external environment.

In some situations, a vehicle may have a storage container, such as a box (e.g., a toolbox), permanently or temporarily attached to the vehicle. For example, a truck may have one or more toolboxes permanently or temporarily attached to the rails or the floor surface of a truck bed. Such storage containers can offer a variety of compartments (e.g., boxes, bins, chests, and bedcovers) for safely storing and organizing items.

However, use of a storage container can present a variety of challenges and problems. Although a storage container can increase the capability to store and organize items, they may create difficulties to access the items stored within the storage container. For example, when the storage container is mounted within a truck bed, users typically face an ergonomic challenge when attempting to access the container while standing next to the truck. A user often has to climb up in to the truck bed or climb onto the rear wheel of the vehicle in order to fully access the storage container regardless of the mounting configuration or location of the container (e.g., on the bed rail or sitting on the floor of the truck bed). Such situations present unnecessary strain on the user and increase the risk of injury when accessing or storing items in the storage container.

In addition, storage containers may be susceptible to theft. Often, a storage container is not equipped with any theft-prevention devise and external locks or safety equipment must be purchased separately from the containers. This can limit the protection possible for vehicle storage containers. For example, most security devices are designed to attach to the outside of a container and may still be accessible to and/or tampered with by a potential thief.

Manufacturing and shipping of a storage container may also present various problems to both the manufacturer and the recipient (e.g., installer and/or end user). For most storage containers, the container is shipped in its preassembled form. Depending on the size of the container, this can require excessive shipping time and costs. Additionally, shipping containers may be vulnerable to damage. For example, certain components of shipping containers can be easily scratched or damaged when being shipped or installed due to the material and fabrication of the shipping container.

In addition, some larger storage containers may be too heavy or cumbersome for single-person installation. To illustrate, installation of shipping containers (e.g., toolboxes) for use in a truck often requiring customization such as machining or altering of the stock vehicle in order fit properly. As a result, many toolbox manufacturers design a specific toolbox configuration for use with a corresponding vehicle or vehicle manufacturer. A container manufacturer must then organize and supply unique (non-shared components) for each particular model, resulting in numerous product SKU's, sub-components, manufacturing jigs, fixtures, and processes for fabrication of the storage containers, which increases complexity and costs for the container manufacturer.

The above problems related to shipping and installation of a storage container on a vehicle may be compounded by aftermarket modifications to the vehicle. For example, trucks with tall stock bed rail heights and aftermarket lifted suspension configurations may exacerbate issues with installation, accessibility, and security of storage containers. Thus, conventional storage containers provide a variety of problems and challenges ranging from manufacturing, shipping, installation, and use.

SUMMARY

The present disclosure is generally related to systems, devices, apparatuses, kits, and methods of accessing a storage container, such as a toolbox. For example, a storage container, such as a box (e.g., a container) may include a deployable structure configured to enable access to an interior of the storage container. In some implementations, such storage containers may be coupled to a vehicle, such as a storage container installed in a bed of a truck. A storage container may include a housing that defines a storage space for storage of various items and a ladder coupled to the housing. The ladder may be moveable relative to the housing while the ladder is coupled to the housing. For example, the ladder may be movable relative to the housing between a first position, in which the ladder is disposed within the storage space, and a second position, in which the ladder is disposed (e.g., deployed) outside of the storage space. To illustrate, the ladder may be positioned in an enclosed space defined by the storage container while the storage container is in a closed state for compact storage, and may be deployed while the storage container is in an open state for simplified access to a cavity of the storage container. In implementations where the storage container is coupled to a vehicle, such as a bed of a truck, the moveable ladder integrated with the storage container may be deployed to allow a user to easily access the contents of the toolbox without having to climb on or in the vehicle. To illustrate, the ladder may be deployed to a position such that a user can achieve an elevated position to access the container without having to climb onto the truck bed or a truck tire. Accordingly, the container may be used to store items while the ladder minimizes and/or reduces physical exertion required by a user to access the toolbox. In this way, storage container may be used to ergonomically store items regardless of aftermarket modifications to the vehicle.

In some implementations, the storage container may include a base including one or more modular components (e.g., interleaving bins) that define the base of the storage container. For example, modular components may be coupled together to modify length or width of the storage container. The modular components may be uniformly manufactured and coupled together to provide a customizable shipping container that is universally compatible with multiple vehicles (e.g. truck), such as vehicles of different manufacturers. To illustrate, interleaving bins may be designed as two symmetric components configured to interleave with each other. For example, the storage container may be modified—either through manufacturing or installation—to accommodate both mid-size and full-size truck beds. The modular geometry may enable the manufacturer to derive a family of products from the same uniform parts, reducing the number of SKU's, sub-components, manufacturing jigs, fixtures, and processes for fabrication. Likewise, the modular geometry may allow for components to be stacked during shipping to enable delivery in compact packages reducing shipping costs and delivery time.

In some implementations, the storage container may include a lid coupled to the base. The lid may be pivotably or slidably coupled to the base to both control access to an interior of the storage container. For example, the lid is pivotably coupled to an outer end of the base (e.g., located outboard near the truck bed rails) to rotate in a manner contrary to traditional truck bed toolboxes to deploy the ladder. In some implementations, the lid may rotate about the base, coming to rest nearly parallel to the vertical truck bed sides. This rotation may be limited by an anti-rotation device (e.g., geometry, components of the lid and, or external device) to prevent the lid from physically contacting the vehicle sides so that the ladder or other components of storage container will not damage the vehicle. Additionally, or alternatively, padding or another surface contact member (e.g., a rubber stopper) may be coupled to the lid to reduce a risk of damage to the vehicle when the ladder is deployed and/or in use. In addition, the ladder is designed to be robust and sturdy to enable heavier users to use the assembly without causing any damage to the toolbox or vehicle. Accordingly a user may place one or both feet on ladder in order to gain height and improve access to the contents stowed within the container.

In some implementations, the lid and the base possess geometry to manage water and dust intrusion. Specifically, a continuous vertical rib protrudes upward from each base and forms a nesting wall within the inside of the lid. A bulb seal or similar compressible gasket may be placed near this vertical wall. In some implementations, the lid presents an overhanging lip that extends beyond the gasket interface, thereby helping direct water flow. The geometry of this overhanging lip may be optimized to bias water away from the interface between the lid and the base.

In some implementations, the storage container may include a security assembly (e.g., a security system), such as one or more security features. The security assembly may include a mechanical or electro-mechanical locking mechanism. To illustrate, upon actuation, the mechanism may engage the free end of the lid, effectively locking the lid in the closed position. For example, actuation may be performed by pushing a button (wired) or actuating a computer application (wirelessly). In some implementations, locking mechanism may be independent from latch to create a two-factor security system. For example, locking mechanism may be toggled via a discrete or hidden mechanical or electromechanical switch. As another example, the locking mechanism may be operated remotely via wireless control. In some implementations, the storage container may include an interface (e.g., a port) configured to be coupled via a wired connection to a control device configured to initiate operation of the locking mechanism. Thus, with security assembly and lid locked together, the storage container is inaccessible to unintended users or thieves.

To further deter access by unintended users or thieves, metal plates and/or stringers may be placed visibly and/or discretely within the lid and bin components. Metal plates may be permanently affixed (e.g., riveted) to the nesting lips on the lid components to discourage prying and sawing. Stringers—actualized as long thin metal rods loosely captured in surrounding geometry—may be inserted into channels within the bins. These stringers, by nature of their loose attachment to the bins, facilitate resonance and binding with reciprocating saw blades.

In some of the foregoing implementations, a toolbox assembly for use with a vehicle includes a housing that defines a cavity. The toolbox assembly further includes a ladder coupled to the housing. The ladder is movable relative to the housing while the ladder is coupled to the housing. The ladder is movable relative to the housing between: a first position in which the ladder is disposed within the cavity; and a second position in which the ladder is disposed outside the cavity.

The housing includes a base comprising a first end and a second end opposite the first end. In such implementations, a lid is coupled to the base and includes a first end and a second end. The lid may be pivotably coupled to the first end of the base and moveable between: a closed position in which the lid covers an opening defined by the base and an open position in which at least a portion of the opening is exposed. In some such implementations, the ladder is coupled to the lid and the ladder includes one or more steps.

In some implementations, while the lid is in the closed position, a bottom surface of the lid abuts a top surface of the base. In some such implementations, the lid is configured to rotate at least 180° relative to a top surface of the base from the closed position to the open position. In some implementations, at least a portion of the housing is configured to be disposed within a truck bed such that the first end of the base and the second end of the base are positioned on a left side and a right side, respectively, of the truck bed and, while the lid is in the open position and the housing is disposed in the truck bed, the lid is not in contact with the truck bed.

In some implementations, while the ladder is coupled to the lid the ladder is configured to be in a stowed position in which a portion of the ladder is positioned within a cavity defined by the lid. In some such implementations, the ladder is configured to be moveable from the stowed position to a deployed position in which the portion of the ladder is positioned outside the cavity defined by the lid. In some implementations, the ladder is pivotably coupled to the second end of the lid and configured to rotate relative to the lid to transition between the stowed position and a deployed position. In some additional implementations, the cavity of the lid is configured to enable the ladder to transition via sliding between the stowed position and a deployed position.

In some implementations, the first end of the lid is pivotably coupled to the first end of the base, and the lid pivots about the first end of the base to move from the first position to the second position. In some implementations, an anti-rotation device configured to restrict the lid from rotating past a predetermined angle relative to the base, the rotation restrictor is coupled to the housing. In some such implementations, the predetermined angle is 260 degrees, resulting in a near-vertical ladder orientation.

In some implementations, the toolbox assembly also includes a locking device coupled to the base. The locking device includes an outer casing and a lock disposed within the outer casing. In some implementations, the lock is moveable between: a locked positioned and an unlocked position. In some such implementations, when the lid is in the first position and the lock is in a locked position, the lid is in a locked state. In additional implementations, the lock comprises one or more rods, while the lock is in the unlocked position, the one or more rods are disposed within the outer casing and while the lock is in the locked position, at least one of the one or more rods extends from the outer casing such that a portion of the rod is disposed outside of the outer casing.

In some implementations, while the lid is in the closed position the housing defines an outer surface and an entirety of the lock is disposed within the outer surface of the housing. In some such implementations, the toolbox assembly includes a handle disposed on the outer surface of the housing, and a latch configured to move the lid from the closed position while in an unlocked state. In some implementations, the latch is independent of the lock In some implementations, the toolbox assembly also includes a lock control system coupled to the housing and configured to control operation of the lock between the locked position and the unlocked position. In some such implementations, the lock control system includes a controller coupled to the locking device and configured to operate the locking device between the locked position and the unlocked position, a receiver configured to receive a first signal from an electronic device (e.g., a remote device) and communicate the first signal to the controller, and a transmitter configured to transmit a second signal from the controller. Additionally, or alternatively, the toolbox assembly includes a power source coupled to the locking device.

In some of the foregoing implementations, a toolbox assembly for use with a vehicle includes a housing. The housing includes a base, a first lid coupled to a first end of the base, and a second lid coupled to a second end of the base. Each lid of the first lid and the second lid is moveable between: a first position in which the lid covers an opening defined by the base and a second position in which at least a portion of the opening is exposed. The toolbox further includes a first ladder coupled to the first lid. The first ladder is movable relative to the first lid while the first ladder is coupled to the first lid.

In some implementations, the toolbox further includes a second ladder coupled to the second lid. The second ladder is movable relative to the second lid while the second ladder is coupled to the second lid. Additionally, or alternatively, the toolbox includes a locking device coupled to the base. The locking device includes an outer casing and a lock disposed within the outer casing. In some such implementations, the lock includes one or more rods moveable between a locked position in which a portion of at least one of the one or more rods is positioned outside the outer casing, and an unlocked position in which the portion of the one or more rods is positioned within the outer casing. In some implementations, the outer casing is positioned between the first lid and the second lid, and while each lid is in the first position and the lock is in a locked position, each lid is in a locked state.

In some implementations, the toolbox includes a controller coupled to the locking device and configured to operate the locking device between the locked position and the unlocked position. In some such implementations, the toolbox may include a receiver configured to receive a first signal from a remote device and communicate the first signal to the controller and/or a transmitter configured to transmit a second signal from the controller. Additionally, or alternatively, the toolbox may include a power source coupled to the locking device.

In some implementations, the base includes a first modular bin and a second modular bin coupled together to define the base. In some implementations, a first end of the first lid is coupled to a first end of the first modular bin, a first end of the second lid is coupled to a first end of the second modular bin, and the first lid and second lid are independently movable relative to the base.

In some implementations, at least a portion of the base is configured to be disposed within a truck bed such that the first end of the base and the second end of the base are positioned on opposing sides of the truck bed. Additionally, or alternatively, at least one lid is configured to rotate at least 180° relative to a top surface of the base from the first position to the second position and while the lid is in the second position, the lid is positioned outside of the truck bed. In some implementations, the toolbox also includes an anti-rotation device configured to a corresponding lid from rotating past a predetermined angle relative to the base. The predetermined angle is less than or equal to a second angle in which the lid contacts a sidewall of the truck bed while the base is disposed in the truck bed.

In some of the foregoing implementations, methods of operating a toolbox include supporting, by a toolbox, a ladder within a first cavity defined by a base and a lid while the lid is in a closed position. The methods also include; rotating, while the ladder is coupled to the toolbox, the lid relative to the toolbox to an open position and supporting, by the toolbox, the ladder outside of the cavity, while the lid is in the open position. The methods further include moving the ladder relative to the lid.

In some of the forgoing methods, rotating the ladder relative to the toolbox further includes rotating the lid about a pivot point of the base at least 180°, from the closed position to the open position. In such implementations, the methods may also include, while the lid is in the open position, extending a portion of the ladder from a stowed position in which the portion of the ladder is positioned within a second cavity defined by the lid, to a deployed position in which the portion of the ladder is positioned outside the second cavity. Additionally, or alternatively, the portion of the ladder may include at least one step. In some of the foregoing implementations of the present methods, to extend the ladder, the ladder is rotated about a first end of the lid or sliding the ladder from the second cavity defined by the lid.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed configuration, the term "substantially" may be substituted with "within [a percentage] of" what is specified, where the percentage includes 0.1, 1, 5, and 10 percent.

The term "about" as used herein can allow for a degree of variability in a value or range, for example, within 10%, within 5%, or within 1% of a stated value or of a stated limit of a range and includes the exact stated value or range. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed implementation, the term "substantially" may be substituted with "within [a percentage] of" what is specified, where the percentage includes 0.1, 1, or 5 percent; and the term "approximately" may be substituted with "within 10 percent of" what is specified. The statement "substantially X to Y" has the same meaning as "substantially X to substantially Y," unless indicated otherwise. Likewise, the statement "substantially X, Y, or substantially Z" has the same meaning as "substantially X, substantially Y, or substantially Z," unless indicated otherwise. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Similarly, the phrase "A, B, C, or a combination thereof" or "A, B, C, or any combination thereof" includes: A alone, B alone, C alone, a combination of A and B, a combination of A and C, a combination of B and C, or a combination of A, B, and C.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any implementation of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where".

Additionally, a vehicle may be referred to in terms "front," "rear," "left side," and "right side" to refer to directions with reference to a vehicle, e.g., a pickup truck, in which the truck storage system may be installed. For example, the term "front" refers to a forward-moving direction of the vehicle, the term "rear" refers to a rearward-moving direction of the vehicle, the term "left side" refers to a driver side of the vehicle (as commonly used in the U.S.), and the term "right side" refers to a passenger side of the vehicle (as commonly used in the U.S.).

Further, a device or system that is configured in a certain way is configured in at least that way, but it can also be configured in other ways than those specifically described. The feature or features of one implementation may be applied to other implementations, even though not described or illustrated, unless expressly prohibited by this disclosure or the nature of the implementations.

Some details associated with the implementations are described above, and others are described below. Other implementations, advantages, and features of the present disclosure will become apparent after review of the entire application, including the following sections: Brief Description of the Drawings, Detailed Description, and the Claims.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the configuration depicted in the figures.

FIG. 2D is a side view of an example of the container of FIG. 2A having a first length.

FIG. 2E is a side view of an example of the container of FIG. 2A having a second length.

FIG. 3A is a perspective view of an example of a ladder sub-assembly of the container in a first position.

FIG. 3B is a perspective view of the ladder sub-assembly of FIG. 3A in a second position.

FIG. 3C is a perspective view of a portion 3C-3C of the ladder sub-assembly of FIG. 3B.

FIG. 4A is a perspective view of an example of the container.

FIGS. 4B-4D are front, side, and top views, respectively, of the container of FIG. 4A.

FIG. 5A is a perspective view of another example of the container.

FIGS. 5B-5D area front, side, and top views, respectively, of the container of FIG. 5A.

FIGS. 7A-7B are perspective views of an example of a lid of a container in a first deployment stage and a second deployment stage, respectively.

DETAILED DESCRIPTION

Figure 1A:
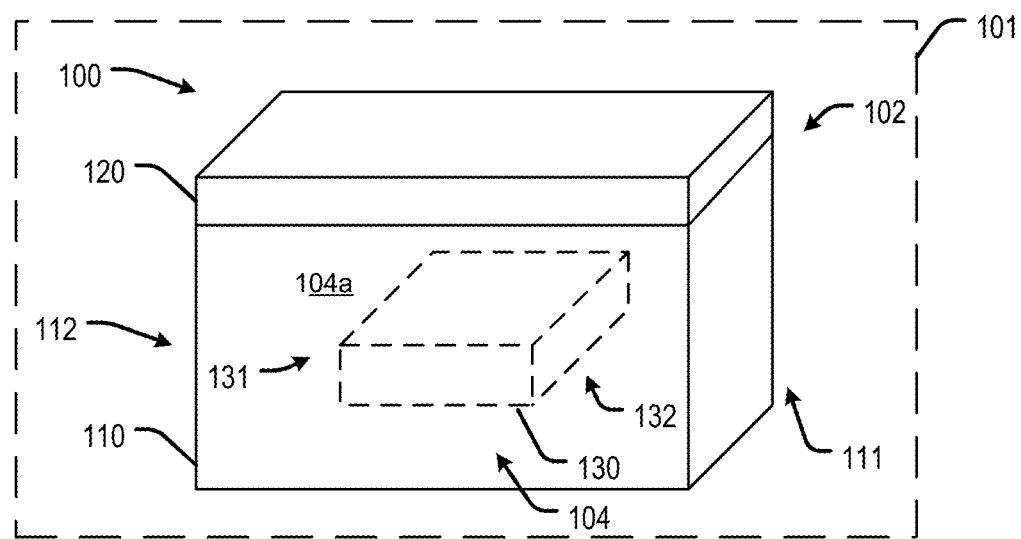
FIG. 1A is a diagram of an example of a container in a first configuration.
Figure 1B:
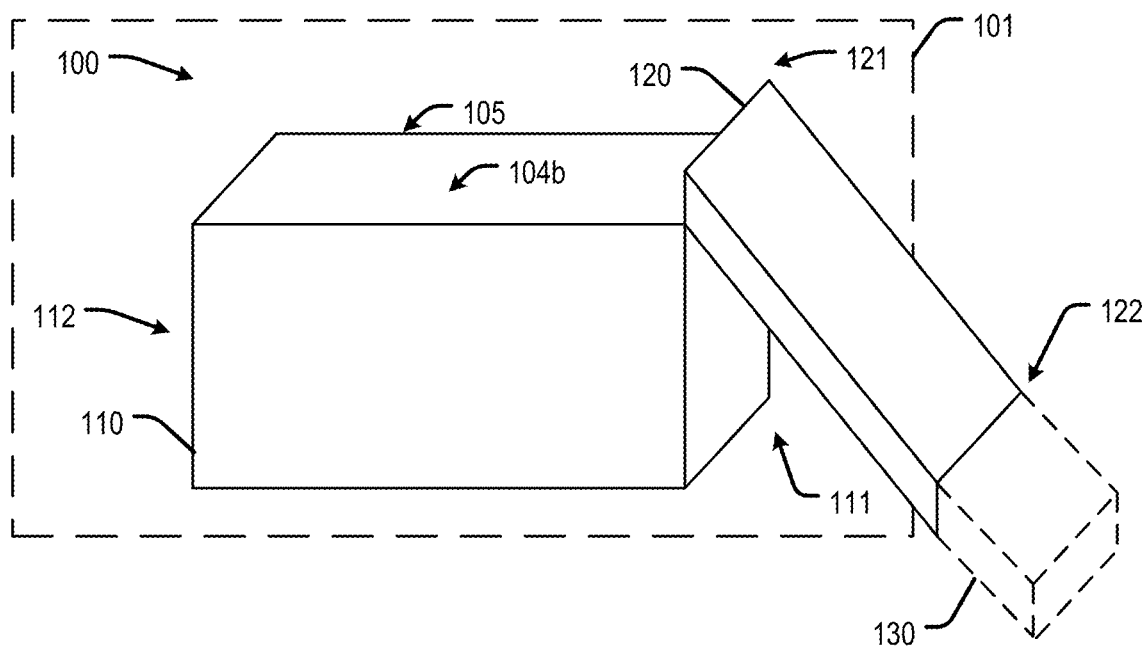
FIG. 1B is a diagram of an example of the container of FIG. 1A in a second configuration.

Referring to FIGS. 1A-1B, an example of a container is shown and generally designated 100. For example, FIG. 1A is an example of container 100 in a first configuration, such as a closed configuration, and FIG. 1B is an example of container 100 in a second configuration, such as an open configuration. Each of FIGS. 1C and 1D, as compared to FIG. 1B, show alternative examples of container 100 in the second configuration. Although referred to herein as container 100, container 100 may also be referred to herein a storage system, a container assembly or a container system, a storage container, a storage container assembly or a storage container system, a box, a toolbox, a toolbox assembly or a toolbox system, a carrier, or a carrier assembly or a carrier system. In some implementations, container 100 may be coupled to a structure 101 (as indicated by a dashed rectangle), such as a vehicle, as described further herein at least with reference to FIGS. 13A-13C. For example, container 100 may be in contact with, mounted, and/or secured to structure 101.

Referring to FIG. 1A, container 100 includes a housing 102 and a ladder 130. Housing 102 may have a first end 111 and a second end 112. As shown, first end 111 is opposite second end 112. In an implementation where container 100 is coupled to structure 101, such as a vehicle, first end 111 may correspond to or face a left side of the vehicle and second end 112 may correspond or face a right side of the vehicle. Alternatively, first end 111 may correspond to or face a right side of the vehicle and second end 112 may correspond or face a left side of the vehicle. In other implementations, first end 111 may correspond to or face a front of the vehicle and second end 112 may correspond or face a rear of the vehicle. Alternatively, first end 111 may correspond to or face a rear of the vehicle and second end 112 may correspond or face a front of the vehicle.

Housing 102 includes a base 110 and a lid 120. Lid 120 may be coupled to base 110. For example, lid 120 may be connected or mounted, directly or indirectly, via one or more components, to base 110. To illustrate, lid 120 may be coupled to base 110 via a hinge. Alternatively, lid 120 may be coupled to base 110 via one or more pins and one or more channels. For example, lid 120 may include a pin configured to be positioned within a channel of base 110.

As shown in FIG. 1A, lid 120 is in a first configuration, such as a closed configuration with respect to base 110. While in the first configuration, housing 102 (e.g., base 110 and lid 120) defines a cavity (e.g., 104a), such as an enclosed space or a storage space. Alternatively, as described further herein at least with reference to FIGS. 1B-1D, lid 120 may be in a second configuration, such as an open configuration, with respect to base 110 to provide access to the cavity (e.g., 104b). In some implementations, lid 120 may be configured to be moveable between the first configuration and the second configuration. In some implementations, cavity 104a is defined by the enclosed space within the interior of base 110 and lid 120 in the first configuration. In other implementations, cavity 104b is defined by the interior space accessed via an opening (e.g., 105) of base 110. Opening 105 may be defined by the periphery of the base 110. For example, opening 105 may be defined by a portion of a plane orthogonal to a top surface of base 110 that is within the periphery of the base 110. To illustrate, opening 105 may comprise a boundary between the top surface of base 110 and the bottom surface of lid 120.

Ladder 130 may be coupled to housing 102. For example, ladder 130 may be coupled to base 110 or lid 120. In some implementations, ladder 130 may be connected or mounted, directly or indirectly via one or more components, to base 110. Additionally, or alternatively, ladder 130 may be connected or mounted, directly or indirectly via one or more components, to lid 120. In some implementations, at least a portion of ladder 130 may be configured to be unitary with lid 120. While in the first configuration, ladder 130 may be positioned within container 100, such as within cavity 104a—e.g., within an enclosed space of housing 102. For example, ladder 130 may be positioned between first end 111 and second end 112 while lid 120 is in the first configuration. Additionally, or alternatively, while in the first configuration, ladder 130 may be positioned within a cavity defined by lid 120.

Referring to FIG. 1B, lid 120 is in the second configuration (e.g., the open configuration). While lid 120 is in the second configuration, housing 102 defines a cavity 104*b*, such as cavity 104*b* defined by at least base 110. Cavity 104*b* may be configured to store one or more objects (e.g., one or more items). While in the second configuration, at least a portion of or an entirety of ladder 130 may be positioned outside of cavity 104*b*. As shown in FIG. 1B, lid 120 is coupled to first end 111 of housing 102 (e.g., a first end of base 110). Additionally, ladder 130 is coupled base 110 via lid 120. Alternatively, ladder 130 may be coupled directly to base 110.

Figure 1C:
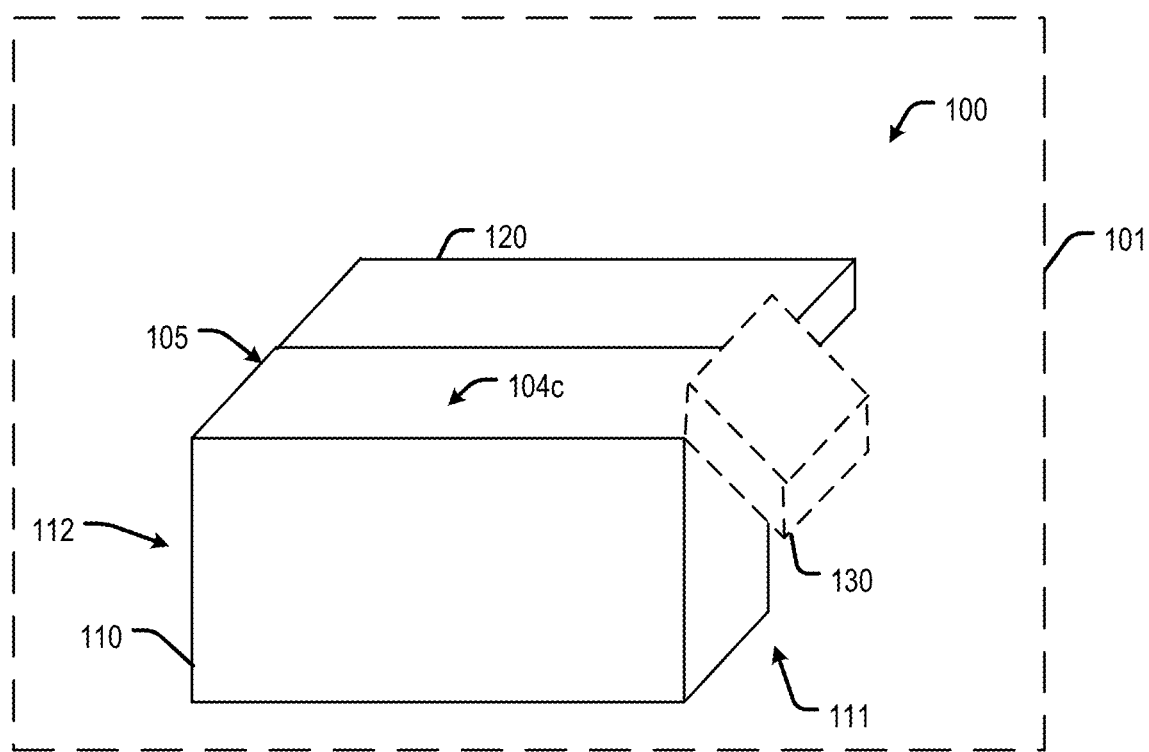
FIG. 1C is a diagram of another example of the container of FIG. 1A in a second configuration.

Referring to FIG. 1C, lid 120 is in the second configuration (e.g., the open configuration). While lid 120 is in the second configuration, housing 102 defines a cavity 104*c*, such as cavity 104*c* defined by at least base 110. Cavity 104*c* may be configured to store one or more objects (e.g., one or more items). While in the second configuration, at least a portion of or an entirety of ladder 130 may be positioned outside of cavity 104*c*. As shown in FIG. 1C, lid 120 is coupled to a side of housing 102 that is adjacent to or a neighboring side of the side of housing 102 via which ladder 130 deploys.

Figure 1D:
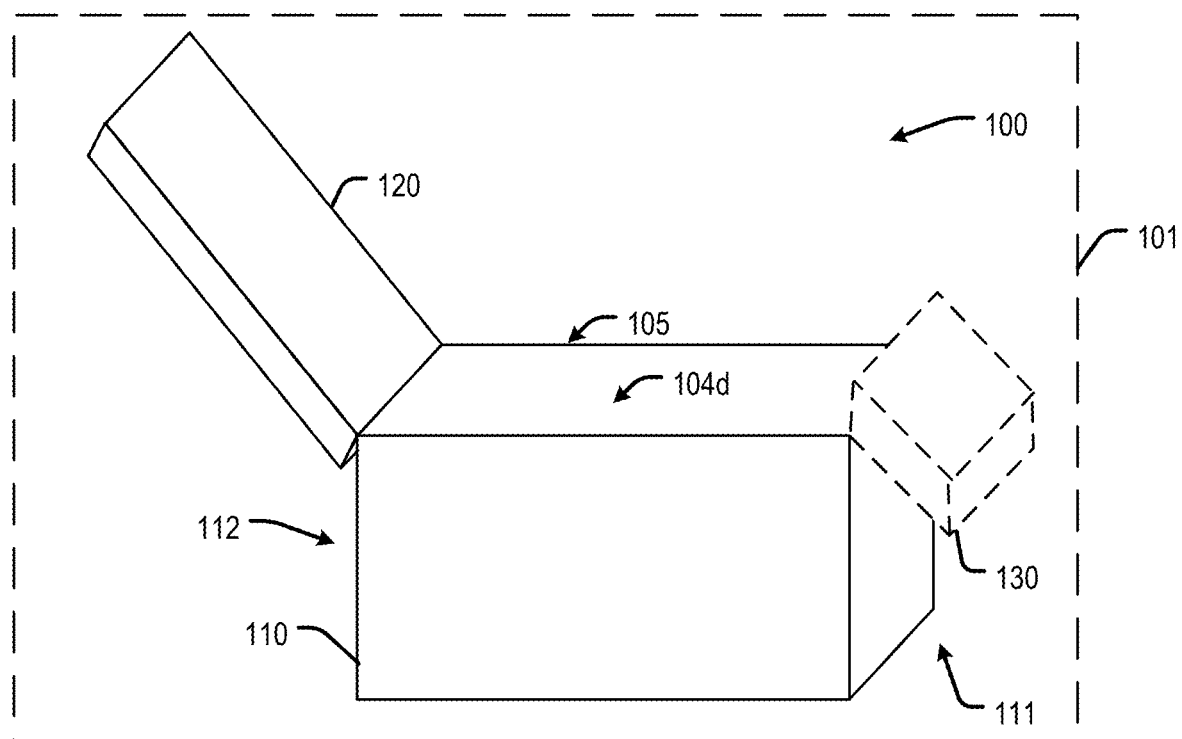
FIG. 1D is a diagram of an example of the container of FIG. 1A in a second configuration.

Referring to FIG. 1D, lid 120 is in the second configuration (e.g., the open configuration). While lid 120 is in the second configuration, housing 102 defines a cavity 104*d*, such as cavity 104*d* defined by at least base 110. Cavity 104*d* may be configured to store one or more objects (e.g., one or more items). While in the second configuration, at least a portion of or an entirety of ladder 130 may be positioned outside of cavity 104*d*. As shown in FIG. 1D, lid 120 is coupled to a side of housing 102 that is opposite to the side of housing 102 via which ladder 130 deploys.

Referring to FIGS. 1A-1D, lid 120 may be moveable relative to base 110 while coupled to base 110. Lid 120 is moveable between the first configuration (e.g., FIG. 1A) in which lid 120 covers an opening 105 of cavity 104*b* defined by base 110 and the second configuration (e.g., FIGS. 1B-1D) in which at least a portion of opening 105 is exposed. In some implementations, an entirety of opening 105 is exposed while lid 120 is in the second configuration, while in other implementations, lid 120 covers a portion of opening 105 while in the second configuration.

Lid 120 may be slidably and/or pivotably coupled to base 110. For example, a first end 121 of lid 120 may be pivotally coupled to base 110 such that, in the first configuration, first end 121 of lid 120 is positioned at first end 111 of base 110 and a second end 122 of lid 120 is positioned at second end 112 of base 110. As another example, lid 120 may be slidably coupled to base 110 such that, in the first configuration, first end 121 of lid 120 is positioned at second end 112 of base 110 and second end 122 of lid 120 is positioned at first end 111 of base 110. In some implementations when lid is slidably coupled to base 110 and lid 120 is in the second configuration, lid 120 may also be pivotably coupled to base 110.

In some implementations, ladder 130 may be movable relative to housing 102 while ladder 130 is coupled to housing 102. For example, ladder 130 may be slidably and/or pivotably coupled to base 110 and/or lid 120. To illustrate, ladder 130 may be coupled to and movable with lid 120 so ladder 130 is movable relative to base in the same manner as lid 120. In some implementations, ladder is slidably and/or pivotably coupled to lid 120. For example, a first end 131 of ladder 130 may be pivotally coupled to lid 120 such that, in the first configuration, first end 131 of ladder 130 is positioned at first end 121 of lid 120 and a second end 132 of ladder 130 is positioned at second end 122 of lid 120. As another example, ladder 130 may be slidably coupled to lid 120 such that, in the first configuration, first end 131 of ladder 130 is positioned at second end 122 of lid 120 and second end 132 of ladder 130 is positioned at first end 121 of lid 120. In a particular implementation, ladder 130 is moveable with lid 120 relative to base 110 and is also moveable relative to lid 120. In other implementations, ladder 130 may be moveable independent of lid 120. For example, lid 120 may be configured to rotate in a first direction (e.g. a front-rear direction) and ladder 130 may be configured to rotate in a second direction (e.g., a left-right direction).

Referring to FIGS. 1A and 1B, container 100 is shown to be moveable from a first configuration (e.g., FIG. 1A) to a second configuration (e.g., FIG. 1B). As shown in FIG. 1B, while lid 120 is in the open position, ladder 130 may be positioned outside of a space (e.g., cavity 104*b*) between first end 111 and second end 112 of base 110. In some implementations, ladder 130 is positioned outside of vehicle (e.g., 101) while in the second configuration (e.g, deployed configuration). In some implementations, lid 120 and/or ladder 130 are freely movable between the first configuration and the second configuration. To illustrate, ladder 130 may be disposed at any position along the path of movement between the first configuration and the second configuration.

During operation of container 100, as shown in FIGS. 1A-1D, while lid 120 is in the closed position, housing 102 supports ladder 130 within cavity 104*a* that is defined by base 110 and lid 120. Operation of container 100 may include rotating lid 120 relative to housing 102 to an open position, while ladder 130 is coupled to housing 102. Operation of container 100 may also include rotating ladder 130 relative to housing 102. In some implementations, rotating lid 120 relative to housing 102 may include concurrently rotating ladder 130 relative to housing. In some implementations, operation of container 100 may also including providing ladder 130 in a deployed position. Providing ladder 130 in the deployed position may include rotating or sliding ladder with respect to lid 120 and/or with respect to base 110.

In some implementations, container 100 includes housing 102, which defines cavity 104, and ladder 130. Ladder 130 is coupled to housing 102 and is movable relative to housing 102. For example, ladder 130 may be movable relative to housing 102 between: the first position, in which ladder 130 is disposed within cavity 104*a*, and the second position, in which ladder 130 is disposed outside of cavity 104*b*.

Although container 100 is shown as having a single lid 120, in other implementations, container 100 may have multiple lids. For example, container 100 may include a first lid (e.g., 120) and a second lid (e.g., 120), as described further herein at least with reference to FIG. 2A. In some such implementations, container 100 may include a housing 102 that comprises: base 110, the first lid (e.g., 120) coupled to first end 111 of base 110, and the second lid (e.g., 120) coupled to second end 112 of base 110. At least one lid 120 (e.g., of the first lid and the second lid) is moveable between: a first position, in which the lid 120 covers opening 105 defined by base 110, and a second position, in which at least a portion of opening 105 is exposed. In some such implementations, a first ladder (e.g., 130) is coupled to the first lid, and the first ladder is movable relative to the first lid while the first ladder is coupled to the first lid.

In some implementations, container 100 may include a security assembly, as described with reference to a least FIGS. 2F, 8A, and 8B. Additionally, or alternatively, container 100 may include a control system, as described further herein at least with reference to FIG. 8E. In some implementations, container 100 may include one or more additional security features, as described at least with reference to FIGS. 11A-11D.

Thus, container 100 of FIGS. 1A-1D enable a user to safely and ergonomically access cavity 104 of housing 102 using ladder 130. The moveable ladder 130 integrated with housing 102 may allow a user to easily access the contents of the container 100 without having to climb on or in the vehicle. To illustrate, the ladder 130 may be deployed to a position closer to the ground than the truck bed, or truck tire, to reduce the range of motion needed to climb into the truck to access container 100. Accordingly, the physical exertion needed to access container 100 (e.g., to store or remove items from cavity 104) is reduced. This may reduce the risk of injury for individuals that routinely access a storage container. In another way, the decreased range of motion may enable individuals with certain physical limitations to utilize container 100.

Figure 2A:
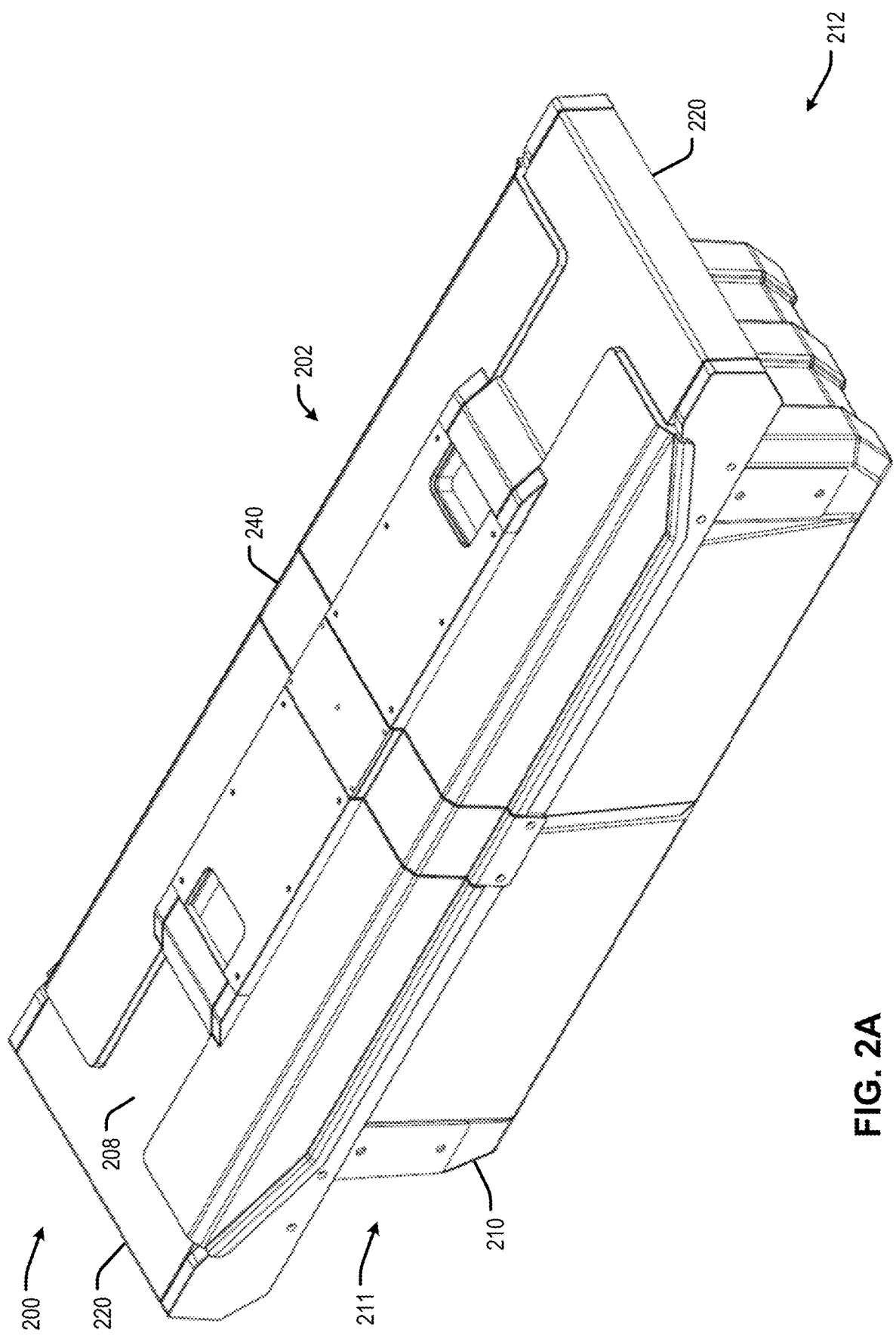
FIG. 2A is a perspective view of an example of a container.
Figure 2B:
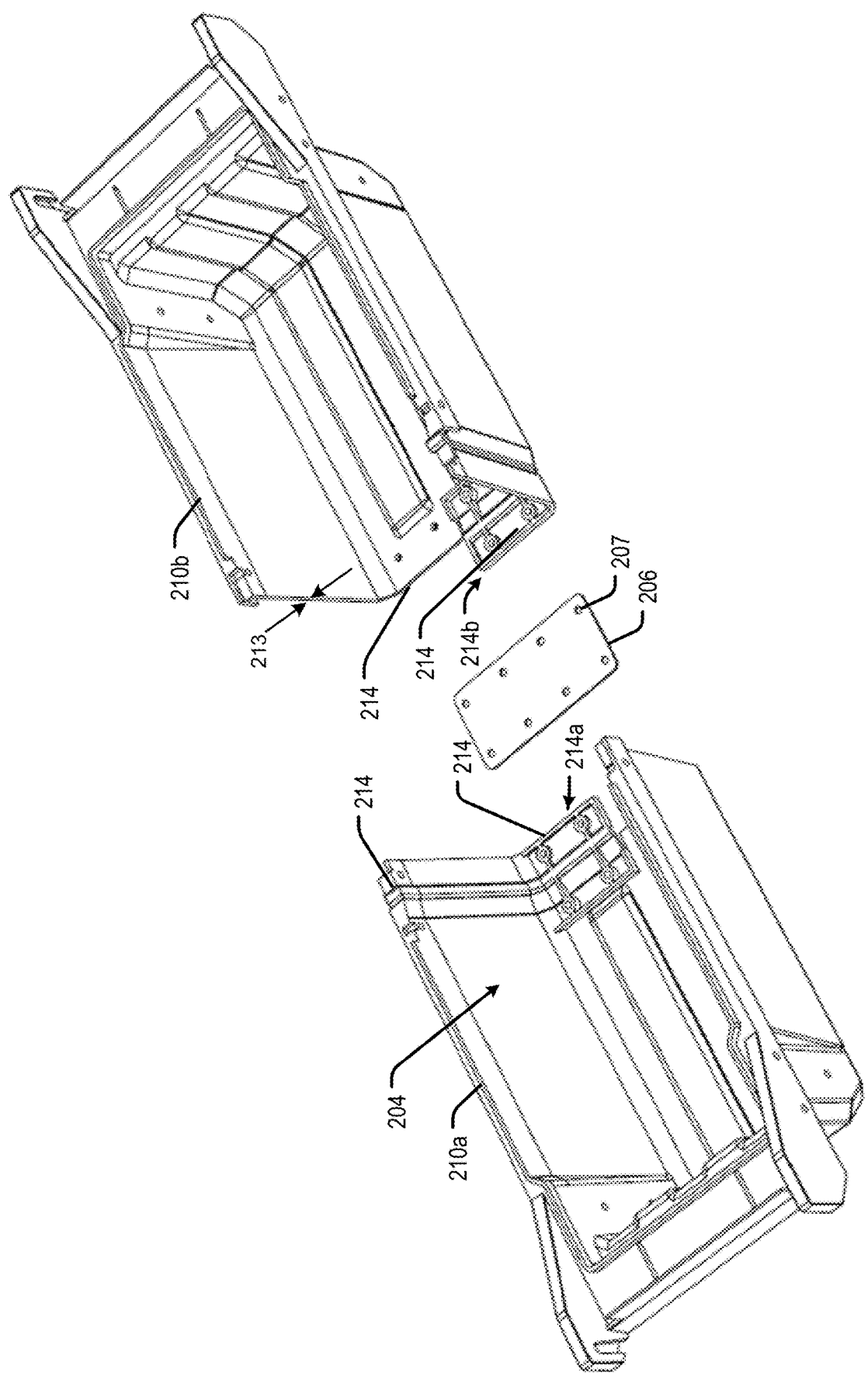
FIGS. 2B and 2C are perspective views of a portion of the container of FIG. 2A.
Figure 2C:
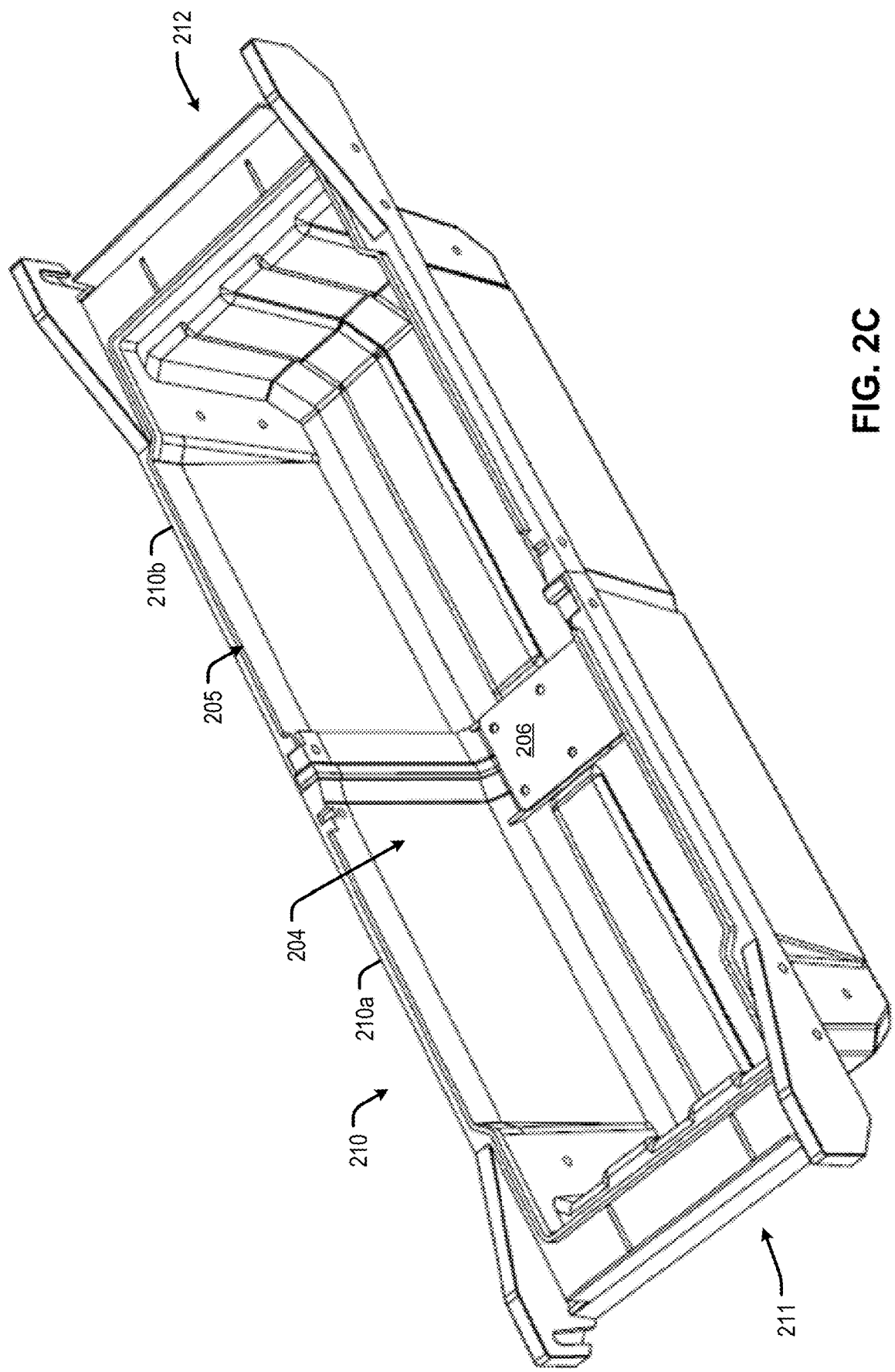
Figure 2F:
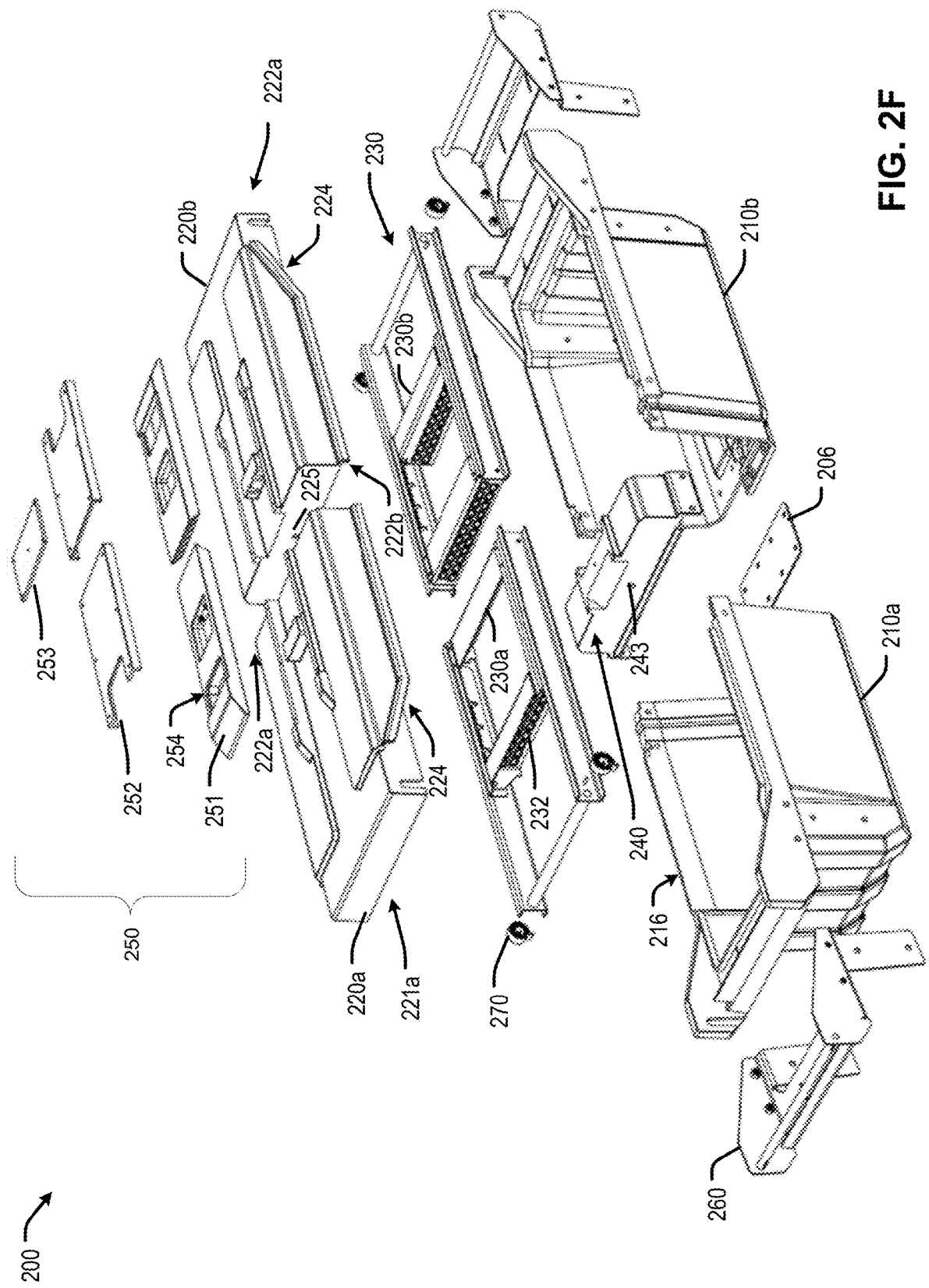
FIG. 2F is a partially exploded view of the container of FIG. 1A.

Referring to FIG. 2A-2F, views of one or more examples of a container 200 are shown. For example, FIG. 2A shows a perspective view of an example of container 200 in the first configuration (e.g., a closed configuration); FIGS. 2B and 2C show a view of an example of container 200; each of FIGS. 2D-2E show a side view of an example of container 200; and FIG. 2F shows a respective exploded view of one or more portions of another example of container 200. Although different examples of container 200 are depicted in FIGS. 2A-2F, the examples share many common features and the common features are described together. To illustrate, the one or more examples of container 200 include different configurations of a housing. Additionally, diverging features and/or additional features are described with reference to a particular example and figure such that a person of skill in the art will understand such differences.

Referring to FIG. 2A, container 200 includes a housing 202. Container 200 and housing may include or correspond to container 100 and housing 102, respectively. Housing 202 may have a first end 211 and a second end 212. As shown, first end 211 is opposite second end 212. First end 211 and second end 212 may include or correspond to first end 111 and second end 112, respectively. In some implementations, container 200 is configured to be coupled to a structure, such as a vehicle, as described further herein at least with reference to FIGS. 13A-13C.

Housing 202 includes base 210 and one or more lids 220. Base 210 and the one or more lids 220 may include or correspond to base 110 and lid 120, respectively. As shown, container 200 includes two lids (e.g., a first 220a and a second lid 220b). Lids 220 may operate independently of one another. For example, lid 220a may be in a stowed configuration while lid 220b is in an open configuration, and vice versa. In some implementations, lids 220 are configured to be positioned, or coupled, together to define a space (e.g., cavity 104) where a plurality of items (e.g., tools, equipment, or the like) may be stored.

Additionally, housing 202 may include a security assembly 240. In some implementations, security assembly 240 may be selectively coupled to lid(s) 220 to keep the lid(s) in the first configuration (e.g., closed configuration), as described further herein at least with reference to FIGS. 8A and 8B. As shown in FIG. 2A, housing 202 is in a first configuration (e.g., closed configuration). When housing 202 is in the first configuration, the lid(s) 220 are closed such that cavity 204 (e.g., a storage space) is enclosed by base 210 and lid(s) 220. In some implementations, security assembly 240 may define a portion of the enclosed cavity 204, along with base 210 and lid(s) 220. It is noted that although container 200 is described as having security assembly 240, in other implementations, security assembly 240 may be replaced with another component or piece (e.g., a molded piece without one or more security components), or may be omitted and lids may be larger in view of the omitted security assembly 240.

Housing 202 may include, or be coupled to, a ladder 230, such as one or more ladders. Ladder 230 may include or correspond to ladder 130. Ladder 230 may be disposed within cavity 204 of housing 202. In some implementations, ladder 230 may be coupled to base 210, lid(s) 220 or both.

Referring now to FIG. 2F, container 200 may include housing 202 that comprises base 210 and lid(s) 220, a ladder 230, a security assembly 240, a latch 250, and a bracket 260 (e.g., a joint). In some implementations, one or more of base 210, lid(s) 220, ladder 230, security assembly 240, latch 250, and bracket 260 may comprise or include one or more sub-components.

Base 210 may include one or more modular components (e.g., interleaving bins 210a and 210b) that are configured to be coupled, or positioned, together to form base 210. For example, as shown in FIG. 2F, base 210 includes a first bin 210a and a second bin 210b. In some implementations, the one or more modular components may be coupled together via one or more additional components. For example, an insert 206 and/or security assembly 240 may be used to couple the modular components of base 210 together. In other implementations, the modular components (e.g., bins 210a and 210b) may be coupled to each other in any suitable fashion, such as, for example, via fasteners (e.g., zip-ties, nuts and bolts, screws, pins, and/or the like), straps, adhesives, friction, and/or the like (as described further herein at least with reference to FIGS. 2B and 2C). In some implementations, bins 210a, 210b have the same size and shape. For examples, bins 210a, 210b may be made using the same mold and/or design specification.

Lid(s) 220 may be coupled to base 210 and configured to move relative to base 210. In some implementation, lid(s) 220 may be coupled to base via a connection member (e.g., bracket, joint, hinge, or the like). In some implementations, housing 202 may comprise one or more lid(s) 220 coupled to base 210. As shown, housing 202 includes a first lid 220a and a second lid 220b coupled to base 210; however, in other implementations, container 100 may include a single lid (e.g., 120) or more than two lids. In some implementations, lid(s) 220 is/are configured to be positioned to cover the cavity 204 defined by base 210, or alternatively lid(s) 220 may be coupled to base 210 to define the cavity 204. In some implementations, each lid (e.g., 220a) is configured to be coupled to a respective bin (e.g., 210a) of the base 210. For example, base 210 may comprise a first bin 210a that is coupled to a first lid 220a and a second bin 210b that is coupled to a second lid 220b.

In some implementations, each lid 220 is coupled to base 210. Each lid 220 may be moveable relative to base 210 in a linear and/or rotational manner while lid(s) 220 are coupled to base 210. For example, each lid 220 may be pivotably or slidably coupled to base 210. In some implementations, each lid 220 is coupled to base 210 in the same manner (e.g., pivotably or slidably) while in other implementations, a first lid (e.g., 220a) may be pivotably coupled to base 210 and a second lid (e.g., 220b) may be slidably coupled to base 210. To illustrate, lid(s) 220 is/are moveable to/from a closed position (e.g., FIG. 2) in which lid(s) 220 cover(s) an opening 205 of a cavity 204 defined by base 210.

Additionally, or alternatively, lid(s) 220 is/are moveable to/from an open position (e.g., FIGS. 4A-4D) in which at least a portion of opening 205 is exposed (as described further herein at least with reference to FIGS. 4A-4D).

Security assembly 240 may be positioned, or associated, with lid(s) 220 to define a top surface 208 of housing 202 that covers base 210. In some implementations, security assembly 240 may be coupled to a center of housing 202 (e.g., a distance from security assembly 240 to first end 211 of base 210 is substantially equal to a distance from security assembly 240 to second end 212 of base 210). For example, security assembly 240 may be positioned between first lid 220a and second lid 220b. In a further example, security assembly 240 may be interposed between first lid 220a and second lid 220b when the container 200 is closed (i.e., as shown in FIG. 2). In some implementations, a first end 221a of first lid 220a is coupled to first end 211 of base 210 and a first end 221b of second lid 220b is coupled to second end 212 of base 210. In this implementation, a second end 222a of first lid 220a and a second end 222b of second lid 220b abut opposing sides of security assembly 240 (e.g., center support component).

In some implementations, security assembly 240 may be configured to selectively prevent access to container 200. For example, security assembly 240 is configured to secure lid(s) in a fixed, secure, and locked position when security assembly 240 is coupled to (e.g., engaged with) lid(s) 220. In some implementations, second end 222 of lid 220 may define an aperture (e.g., through hole 225) and security assembly 240 may define an aperture (e.g., through hole 243). When the aperture of lid 220 is aligned or substantially aligned with the aperture of security assembly 240, security assembly 240 may be operated to be selectively coupled to lid 220. Security assembly 240 may be manufactured similarly to base 210. For example, security assembly 240 may comprise a customizable injection molded polymer as described further herein at least with reference to FIGS. 2D and 2E).

Lid(s) 220 may include, or be coupled to, latch 250. In some implementations, latch 250 is configured to assist lid in moving from the first configuration to the second configuration. In some implementations, each lid 220 includes a latch 250, while in other implementations, housing 202 has only one latch 250. Latch 250 may be positioned on lid(s) 220 in any suitable position. For example, in the implementations where lid(s) 220 are pivotably coupled to base 210, latch 250 may be positioned closer to first end (e.g., 221a) of the lid (e.g., 220a) so that latch 250 is closer to a side of a vehicle (e.g., 101) for easier access. In such implementations, latch 250 may also be positioned closer to second end (e.g., 222a) of the lid (e.g., 220a) to decrease the amount of force required to rotate lid 220 about an end of base 210.

Latch 250 may include a latch slide 251, a latch cover 252, and a latch strike plate 253. Latch slide 251 may translate (e.g., move linearly), relative to the lid 220, toward or away from an end (e.g., first end 221) of a lid(s) 220. In some implementations, latch slide 251 may include a handle 254 configured to operate latch 250. In some implementations, handle 254 may be contoured to allow a user to easily engage and to begin movement of latch 250. Latch cover 252 is configured to prevent an unauthorized user from accessing selective components, or sub-components, of latch 250. In some implementations, latch cover 252 may be disposed over latch 250 to cover one or more components of latch 250 (as described further herein at least with reference to FIGS. 4A-4D). Latch strike plate 253 may be configured to operate with latch slide 251 to prevent lid(s) 220 from inadvertently transitioning from the closed position to the open position. For example, latch strike plate 253 may contact latch slide 251 to block lid 220 from rotating relative to base 210. In some implementations, security assembly 340 may be associated with latch 250 to operate container 200. In some implementations, one or more components of latch 250 is/are configured to be coupled to security assembly 340. Additional aspects of lid(s), latch 250 and security assembly 240, such as latch slide 251 and latch strike plate 253, are described further herein at least with reference to FIGS. 8A-8D.

Ladder 230 is configured to be coupled to base 210 and/or lid 220. In some implementations, a first portion of ladder 230 is coupled to base 210 and a second portion of ladder 230 is coupled to lid 220.

In some implementations (e.g., closed configuration), ladder 230 may be positioned between base 210 and lid(s) 220. For example, ladder 230 is interposed between base 210 and a lid (e.g., 220a) while the lid(s) 220 are in the closed position. In some implementations, ladder 230 is disposed within cavity 204 of housing 202 while lid(s) 220 is in the closed position (e.g., first configuration). To illustrate, while housing 202 is in the first configuration, ladder 230 may be positioned within a first portion of cavity 204 that is defined by base 210 and opening 205; or in other implementations, ladder 230 may be positioned within a second portion of cavity 204 defined by lid 220 and opening 205. In other implementations, ladder 230 may be positioned within a third portion of cavity 204 that is a combination of the first and second portions of cavity 204.

Ladder 230 may define, or include, one or more steps 233. Step(s) 233 may provide support for individuals to stand upon, or climb, to access container 200. As shown in FIG. 2F, ladder 230 comprises two steps. In some implementations, container 200 comprises one or more ladder(s) 230. For example, as shown in FIG. 2F, container 200 includes a first ladder 230a and a second ladder 230b. In some implementations, each lid (e.g., 220a) is coupled to a respective ladder (e.g., 230a). Additionally, or alternatively, each ladder (e.g., 230a) may move with the respective lid (e.g., 230a) while the lid 220 moves relative to base 210.

Bracket 260 (e.g., a bracket) may be coupled to base 210, lid 220, and/or ladder 230. For example, bracket 260 may be coupled to first end 211 of base 210 or second end 212 of base 210. Additionally, or alternatively, bracket 260 may be coupled to lid 220 and ladder 230 to facilitate the movement of lid 220 and ladder 230 relative to base 210. For example, bracket 260 may be configured to rotate ladder 230, lid 220, or both relative to base 210. Bracket 260 may comprise any suitable material (e.g., polymer, metal, composite material, or the like) that may support a lid 220 and/or ladder 230 in the deployed configuration. In some implementations, bracket 260 is molded to fit first or second end 211, 212 of base 210.

Referring to FIGS. 2B and 2C, base 210 may include a first bin 210a and second bin 210b. Base 210 (e.g., 210a and 210b) may comprise any suitable material, such as but not limited to a polymer, metal, or combination thereof. In an illustrative, non-limiting example, base 210 may comprise polyethylene (such as LDPE, LLDPE, HDPE, UHMW, or the like), Acrylonitrile Butadiene Styrene (ABS), polycarbonate, glass fiber reinforced polyester (GRP), polypropylene, or combination thereof. In some implementations, base 210 may be formed by molding (e.g., injection, extrusion, rotational, matrix, reaction injection, or the like) or machining. In some implementations, base 210 may comprise a material that is ultraviolet (UV) stabilized, UV inhibited, and/or UV resistant to prevent UV degradation. In some implementations, the material may be inherently UV stable, while in other implementations, a chemical, coating, or film may be added to the material to produce such effects. In one example, polyethylene, or any other suitable polymer, may be low-pressure injection molded to form base 210. Base 210 may comprise one or more corrugations to improve rigidity of the housing 202. In some implementations, a metal (e.g., aluminum or steel) may then be coupled to base 210 after injection molding. Alternatively, a metal (e.g. aluminum or steel) may be co-molded into base 210. In a specific implementation, each bin may be low-pressure injection molded from polyethylene to form base 210 having a wall thickness 213 of 0.30 inches. In other embodiments, wall thickness 213 may be greater than or equal to any one of, or between any two of: 0.05, 0.10, 0.15, 0.20, 0.25, 0.30, 0.35, 0.40, 0.45, 0.50, 0.60, 0.70, 0.80, 0.90, or 1.0 inches (in.) (e.g., between 0.25 inches and 0.40 in., such as approximately 0.30 in.).

In some implementations, first bin 210*a* and second bin 210*b* may comprise an injection molded polymer. In some implementations, the modular components (e.g., first bin 210*a* and second bin 210*b*) are formed using the same injection mold. In this way, first bin 210*a* and second bin 210*b* can be stackable for easy and compact shipping (e.g., base 210 can be nested/packed in a much smaller carton). Additionally, the uniform (e.g., identical) design of bins 210*a* and 210*b* may allow for quicker and more efficient manufacturing of base 210. Therefore, the cost of machining and shipping the container 200 may be reduced.

The uniform design of bins 210*a* and 210*b* may also relieve problems typically associated with assembly of containers. In some implementations, first bin 210*a* may be coupled to second bin 210*b* via an insert 206 and/or may be further secured together with insert 206. In some implementations, insert 206 may be coupled to a connection portion 214 of the modular components (e.g., 210*a* and 210*b*). Connection portion 214 may be configured to couple bin (e.g., 210*a*) to other components. For example, insert 206 may define one or more holes 207, such that a first portion of the one or more holes 207 are configured to align with one or more holes defined by connection portion 214*a* of first bin 210*a* and a second portion of the one or more holes 207 are configured to align with one or more holes defined by connection portion 214*b* of second bin 210*b* to couple the modular components (e.g., 210*a* and 210*b*) of base 210 together. In some implementations, a connection portion (e.g., 214*a*) of a first bin (e.g., 210*a*) is positioned on a second bin (e.g., 210*b*) such that hole(s) of the connection portion (e.g., 214*a*) align with hole(s) defined by second bin (e.g., 210*b*). In such implementations, fastener(s) (e.g., bolt, screw, pin, etc.) may be inserted into holes 207 to couple first bin 210*a* and second bin 210*b*. Insert 206 may also be positionable so that holes 207 may be aligned with holes of connection portion 214.

Referring to FIGS. 2D and 2E, the uniform bin geometry also enables the manufacturer to create a family of products from the same basic parts. For example, the dimensions of insert 206 (e.g., plate) may be modified to couple the modular components (e.g., first bin 210*a* and second bin 210*b*) of base 210 such that base 210 is customized to fit a specific vehicle. To illustrate, in one implementation, the dimensions of the bins may be modified—via configurable inserts in the injection mold tooling—to accommodate both mid-size (e.g., FIG. 2D) and full-size truck beds (e.g., FIG. 2E). In another implementation, a center insert (not shown) may be coupled to identically manufactured bins (e.g., 210*a* and 210*b*) to customize the dimensions of base 210. Thus, container 200 may be manufactured to use universal parts and configurable manufacturing methods to minimize costs while allowing the container 200 to easily fit within both mid-sized (narrow) and full-sized (wide) truck beds.

Each bin (e.g., 210*a* and 210*b*) may include a first portion 218 and a second portion 219. In some implementations, second portion 219 may comprise the portion of bin (e.g., 210*a*) that at least partially defines cavity 204. First portion 218 may be connected to second portion 219. For example, first portion 218 may extend away from second portion 219 to provide additional support for base 210. In some implementations, first portion 218 defines an overhang. First portion 218 may provide a place for a user to easily grip housing 202 during transportation and/or installation. Additionally, or alternatively, first portion 218 may support housing 202 when placed within a vehicle. To illustrate, when housing 202 is placed within a bed of a truck, first portion 218 may contact the left and right railing of the truck to support housing 202. In some implementations, lid(s) 220 and/or ladder 230 are coupled to first portion 218 of base 210. To illustrate, lid 220 and/or ladder 230 may rotate about first portion of base 210.

Container 200 may include a lower length L2 that defines a distance measured along a bottom side of container 200 between along a straight line. Additionally, or alternatively, container 200 may include an upper length L1 that that defines a distance measured along the top surface 208 of container 200 a straight line. As shown, length L1 is greater than length L2 so that container forms an overhang (e.g., 218). Referring to FIG. 2D, a short container 200*a* is shown for use with a mid-size truck bed and, referring to FIG. 2E, a long container 200*b* is shown for use with a full-size truck bed.

Security assembly 240 may be manufactured in conjunction with base 210 and lid(s), so that an entirety of the cavity 204 is enclosed by top surface 208 of housing 202. For example, a length of security assembly 240 may be increased (e.g., FIG. 2E) to cover cavity 204 while container is in the closed configuration. This allows for manufacturing of lid(s) 220 so that lid(s) are compatible with both mid-size containers (e.g., 200*a*) and full-size containers (e.g., 200*b*). In this way lid(s) 220 may be manufactured based on the height of the vehicle and not the width. Thus, manufacturers do not have to sacrifice ergonomic placement of ladder 230 to enclose cavity 204 while container 200 is in the first configuration.

Referring to FIGS. 3A-3C, various perspective views of sub-components (e.g., ladder 230) of an example of container 200 are shown. For example, FIG. 3A is a perspective view of an example of a ladder sub-assembly in a first position (e.g., a stowed position), FIG. 3B is a perspective of the example of the ladder sub-assembly in a second position (e.g., a deployed position), and FIG. 3C is a perspective view of a portion of the ladder sub-assembly in the second position.

As shown in FIGS. 3A and 3B, the ladder sub-assembly includes ladder 230, bracket 260 (e.g., bracket), and a spring 270, such as a torsion spring or other rotation mechanism. Ladder 230 may include an upper frame 236 (e.g., a first frame or a first frame portion), a lower frame 234 (e.g, a second frame or a second frame portion), a bar 264, and one or more steps 233. In some implementations, step(s) 233 are coupled to, or defined by, a lower frame 234, an upper frame 236, or both. For example, step(s) 233 may extend between rails (e.g., supports) of upper frame 236, and/or rails of lower frame 234. Step(s) may be vertically spaced from each other to allow an individual to climb up and down on ladder 230.

In some implementations, upper frame 236 extends from a first end 237 to a second end 238. In some implementations, first end 237 of upper frame 236 is coupled to bracket 260 and second end 238 upper frame 236 is coupled to lower frame 234. To illustrate, upper frame 236 may comprise a pair of mounts both extending from bracket 260 to lower frame 234. In some implementations, upper frame 236 may rotate about first end 237 and/or bracket 260. For example, upper frame 236 may be rotatable about first end 237 from a first configuration (e.g., a stowed configuration as shown in FIG. 3A) to a second configuration (e.g., a deployed configuration as shown in FIG. 3B). In some implementations, upper frame 236 may be coupled to lid 220. For example, upper frame 236 may be fixed, mounted, or otherwise secured to lid 220.

In some implementations, lower frame 234 is moveable relative to upper frame 236. For example, lower frame 234 may be configured to rotate about second end 238 of upper frame 236 to transition step(s) 233 from a first configuration (e.g., stowed) to a second configuration (e.g., deployed) in which lower frame 234 extends from second end 238 of upper frame 236. In the deployed configuration, lower frame 234 may be positionable such that a user may access step(s) 233. In the stowed configuration, lower frame 234 may be positionable such that ladder 230 may be compactly stowed in lid 220 (e.g., in a cavity defined by lid 220). For example, in the stowed configuration, lower frame 234 may extend from second end 238 toward first end 237 and in the deployed configuration, lower frame 234 may extend from second end 238 away from the first end 237.

In some implementations, lower frame 234 may comprise a pair of mounts both extending from second end 238 of upper frame 236. Additionally or alternatively, lower frame 234 may define a notch 235. At least one of step(s) (e.g., 233a) may be configured to couple to notch 235 such that a position/height of the step (e.g., 233a) is adjustable. For example, each mount of the pair of mounts of lower frame 234 may define identical notches that couple to, or associate with, opposing sides of step(s) (e.g., 232). In this way, ladder 230 may be customized to a user to provide improved ergonomics and comfort to each user of container 200. In some implementations, notch 235 comprises a groove defined by opposing sides of lower frame 234.

In some implementations, upper frame 236 and/or lower frame 234, may define a pair of C-channel shaped frames to provide strength and stability to ladder 230. In some implementations, one or more components (e.g., spring 270) may be coupled to, or disposed in, C-channel. In other implementations, upper frame 236 and lower frame 234 may comprise any suitable shape (e.g., cylindrical, rectangular, I-beam, hexagonal, or other elongated polygonal shape). Additionally, ladder 230 may comprise any suitable material configured to support the weight of a user, including but not limited to, a high strength polymer, metal (e.g., steel, aluminum, titanium, or other alloy), composite material (e.g., laminate), or the like.

Bracket 260 may be operable with ladder 230. In some implementations, bracket 260 is configured to be coupled to a base (e.g., 210). To illustrate, bracket 260 may be coupled to base (e.g., 210) in any suitable fashion, such as, for example, via fasteners (e.g., zip-ties, nuts and bolts, screws, pins, and/or the like), straps, adhesives, friction, and/or the like. For example, bracket 260 may comprise a first side 261 and a second side 262 that are coupled to opposing sides of housing 202. In some implementations, first and second side 261, 262 each comprise a first portion 266 and a second portion 267 of bracket. In some implementations, second portion 267 extends from first portion 266. Although shown as first portion 266 being a relatively horizontal portion and second portion 267 being a relatively vertical portion, first and second portions 266, 267 are not intended to be limited. In some implementations, second portion 267 may be coupled to the second portion 219 of base 210 and first portion 266 is coupled to first portion 218 of base. For example, first portion 266 may be coupled to an interior surface of base 210 and second portion 267 may be coupled to an exterior surface of base 210. Each of first portion 266 and second portion 267 may define one or more hole(s) 263 configured to be aligned with respective holes of base 210 to couple base 210 with bracket 260 via bolts, screws, pins, or other fastener.

In some implementations, bracket 260 may couple ladder 230 to the base 210. Bracket 260 may be pivotably coupled to ladder 230 such that ladder 230 may rotate relative to bracket 260. For example, ladder 230 may rotate about bracket 260 to transition between the closed configuration (e.g., FIG. 3A) and the deployed configuration (e.g., FIG. 3B). In some implementations, ladder 230 rotates about bar 264.

In some implementations, bar 264 may extend between first end 237 of upper frame 236. In some implementations, upper frame 236 is configured to rotate about a longitudinal axis of bar 264. In some embodiments, lid 220 may be coupled to ladder 230 via bar 264. Additionally, or alternatively, lid 220 may rotate about the longitudinal axis of bar 264. In some implementations, bar 264 may extend between first side 261 and second side 262 of first portion 266 of bracket 260. In some implementations, bracket 260 comprises bar 264; while in other implementations, ladder 230 comprises bar 264; yet in other implementations both ladder 230 and bracket 260 comprise bar 264. In implementations, where both ladder 230 and bracket 260 comprise bar 264, ladder 230 may comprise an outer bar and bracket 260 may comprise an inner bar such that the outer bar may be positioned around, and is rotatable about, the inner bar. In such implementations, the outer bar may extend between rails/supports of upper frame 236 and the inner bar may extend between sides 261, 262 of bracket 260. In each implementation, ladder 230 may rotate about the longitudinal axis of bar 264.

In some implementations, bracket 260 comprises a ledge 265. Ledge 265 may extend from first side 261 to second side 262 of first portion 266 of bracket 260. In some implementations, ledge 265 is substantially parallel to the longitudinal axis of bar 264. Additionally, or alternatively, ledge 265 may be positioned vertically below bar 264. In some implementations, ledge 265 may act as a stopping mechanism for ladder 230, lid 220, or both. For example, upper frame 236 or a portion of the lid 220 may contact ledge 265 after rotating about bracket 260. For example, ladder 230 or lid 220 may contact ledge after rotating past a certain angle relative to base 210. In some implementations, ledge may be designed to keep ladder 230 or lid 220 from rotating past a predetermined angle. In this way, ledge 265 may prevent ladder 230 and lid 220 from rotating past a predetermined angle relative to base (e.g., between top surface 216 of base 210 and bottom surface 224 of lid 220). In some implementations, ledge 265 may prevent ladder 230 and lid (e.g., 220) from rotating past an angle that is greater than or equal to any of, or between any two of, the following: 220, 230, 240, 250, 260, 270, 280, or 290° (e.g., between 240° and 270°, such as approximately 260°). In some implementations, the predetermined angle is equal to (or less than) the angle of rotation, relative to the base, for the lid 220 to contact a portion of the vehicle. Accordingly, ledge may prevent container 200 from damaging a vehicle when container 200 is disposed in the vehicle.

Spring 270 is configured to rotate ladder 230 or lid(s) (e.g., 220) about bracket 260. In some implementations, spring 270 may interact with bar 264 and/or upper frame 236 to rotate components of housing 202. In some implementations, spring 270 includes a torsion spring. For example, the torsion spring may be disposed around bar 264 and may be associated with upper frame 236. In some implementations, torsion spring may be biased to help lift the lid (e.g., 220) from a closed position. Torsion spring may be designed to assist the user in lifting the lid (e.g., 220) from the closed position (e.g., closed configuration) to a 90-degree deployment (e.g., open position). Upper frame 236 and bracket 260 may be configured to cause the torsion spring to idle or "float" from the 90-degree deployment to a 260-degree deployment (e.g., deployed configuration) before being stopped by ledge 265. In other configurations spring 270 may comprise a bearing (e.g., ball, roller, linear, slide, jewel), rotation point, etc. In other configurations, spring 270 may be configured to prohibit rotation of lid 220 and/or ladder 230 past a particular position (e.g., a predetermined angle). In this way, spring 270 may prevent ladder 230 and lid 220 from rotating past a predetermined angle relative to base (e.g., between top surface 216 of base 210 and bottom surface 224 of lid 220). In some implementations, spring 270 may prevent ladder 230 and lid (e.g., 220) from rotating past an angle that is greater than or equal to any of, or between any two of, the following: 220, 230, 240, 250, 260, 270, 280, or 290° (e.g., between 240° and 270°, such as approximately 260°). In some implementations, the predetermined angle is equal to (or less than) the angle of rotation, relative to the base, for the lid 220 to contact a portion of the vehicle. Accordingly, spring 270 may prevent container 200 from damaging a vehicle when container 200 is disposed in the vehicle.

Referring now to FIGS. 4A-4D and 5A-5D, views of one more example of container 200 are shown. FIGS. 4A-4D show aspects of container 200 in a first deployment stage, and FIGS. 5A-5D show aspects of container 200 in a second deployment stage. For example, FIG. 4A is a perspective view of container 200, FIG. 4B is a first side view of container 200, FIG. 4C is a second side view of container, and FIG. 4D is a top view of container 200. Additionally, FIG. 5A is a perspective view of container 200, FIG. 5B is a first side view of container 200, FIG. 5C is a second side view of container, and FIG. 5D is a top view of container 200.

As shown in FIG. 4A-4D, lid(s) 220 are shown in the first deployment stage. In some implementations, lid(s) 220 are positioned away from base 210 such that at least a portion of opening 205 is exposed. In another example, cavity 204 may define two openings (e.g, 205a and 205b) separated by security assembly 240. In some implementations, lid(s) 220 and ladder 230 may be, linearly or rotationally, moved relative to base 210 to the open position.

In some implementations, each lid (e.g., 220a) may be pivotably coupled to a corresponding end of base 210 and configured to rotate about an axis (e.g., a longitudinal axis of bar 264).

In some implementations, lid(s) 220 may be rotated relative to base 210 to transition from the closed position to the open position (e.g., a deployed position). For example, lid(s) 220 may be substantially parallel to base 210 while in the closed position and lid(s) 220 may be angularly disposed relative to base 210 while lid(s) 220 are in the open position. Specifically, a bottom surface 224 of a lid (e.g., 220a) may abut a top surface 216 of base 210 when the lid is in the first configuration (e.g., closed position). In some implementations, lid(s) 220 are configured to rotate relative to the top surface 216 of base 210 by an angle that is less than or equal to any one of, or between any two of: 5, 10, 20, 30, 40, 50, 60, 70, 80, 90, 100, 110, 120, 130, 140, 150, 160, 170, 180, 190 200, 210, 220, 230, 240, 250, 260, 270, 280, 290, or 300 degrees)(° (e.g., between 180° and 270°, such as approximately 260°).

In some implementations, ladder 230 may be coupled to lid(s) 220. Ladder 230 may be positioned within a cavity 226 defined by a lid. For example, while ladder 230 is coupled to lid 220 the ladder 230 is configured to be in a stowed position (e.g., FIGS. 4A-4D) in which a portion (e.g., 233a) of the ladder is positioned within cavity 226 defined by lid 220. In some implementations, ladder 230 is moveable relative to lid(s) 220 and base 210. For example, ladder 230 is configured to be moveable from the stowed position (e.g., FIG. 4A-4D) to a deployed position (e.g., FIG. 5A-5D) in which the portion (e.g., 233a) of the ladder is positioned outside cavity 226 defined by lid 220. In some implementations, the portion of the ladder moveable from cavity 226 includes step 233.

As shown in FIGS. 5A-5D, container 200 is shown in second deployment stage, such as a deployed configuration. As described with respect to FIG. 3A-3C, ladder 230 may be rotatable to move between the stowed configuration and the deployed configuration. In some implementations, ladder 230 is coupled to lid such that a portion of ladder (e.g., 234) may be pivotably coupled to second end 122 of lid 220 and configured to rotate relative to lid 220 to from the stowed position to the deployed position. While in the deployed position, step(s) 233 may be positioned outside cavity 226 defined by lid 220. In such implementations, a user may ergonomically step onto the lowermost step (e.g., 233a) to access cavity 204 of housing 202. For example, while container 200 is disposed within, or on, a vehicle, a step (e.g., 233) of ladder 230 may be configured to be closer to the ground in the deployed position than when in the stowed position. Ladder 230 (e.g., step 233, lower frame 234, upper frame 236), bracket 260 e.g., bar 264, ledge 265), spring 270, lid 220, base 210, or combination thereof may be configured to securely withstand the reactant forces applied to container 200 when a load (e.g., person) is applied, statically or dynamically, to step 233 in the deployed configuration. Accordingly, container 200 improves the time and safely required to access a toolbox compared to conventional vehicle toolbox assemblies.

Referring to FIGS. 6A-6D, an illustrative example of a container 300 is shown. Container 300 may include or correspond to container 100 and/or container 200. Container 300 is configured to allow a user to easily and ergonomically access the container via ladder 330. In some implementations, container 300 is configured to be coupled to a structure, such as a vehicle, as described further herein at least with reference to FIGS. 13A-13C.

Container 300 includes a housing 302 having a base 310 and one or more lid(s) 320, a ladder 330, a security assembly 340, a latch 350, and a bracket 360. Housing 302 may include or correspond to housing 102 or housing 202. Base 310 may include or correspond to base 110 or base 210. Lid(s) 320 may include or correspond to lid 120 or lid 220. Security assembly 340 may include or correspond to security assembly 240. Latch 350 and bracket 360 may include or correspond to latch 250 and bracket 260, respectively. Ladder 330 and lid(s) 320 may be rotatable about base 310 from a first configuration (e.g., closed) to a second configuration (e.g., open). In some implementations, ladder 330 may be coupled to lid 320 and configured to rotate with lid 320 to the second configuration.

Figure 6B:
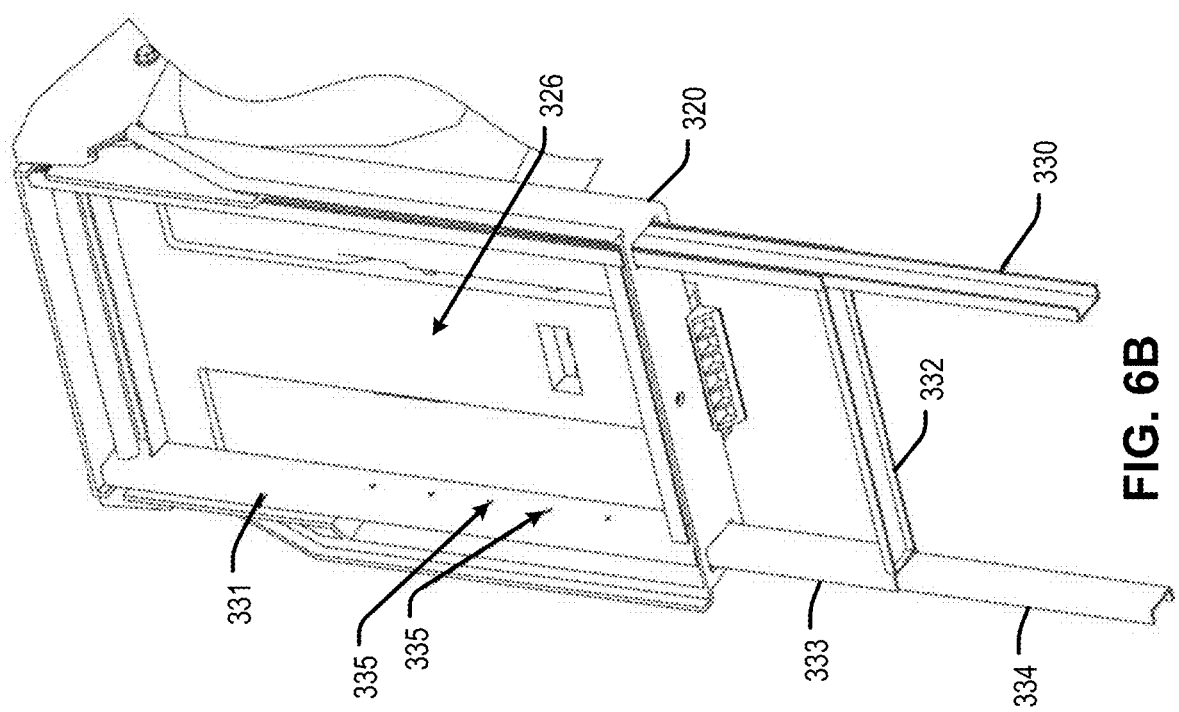
FIGS. 6A-6B are perspective views of an example of a lid of a container in a first deployment stage and a second deployment stage, respectively.
Figure 6A:
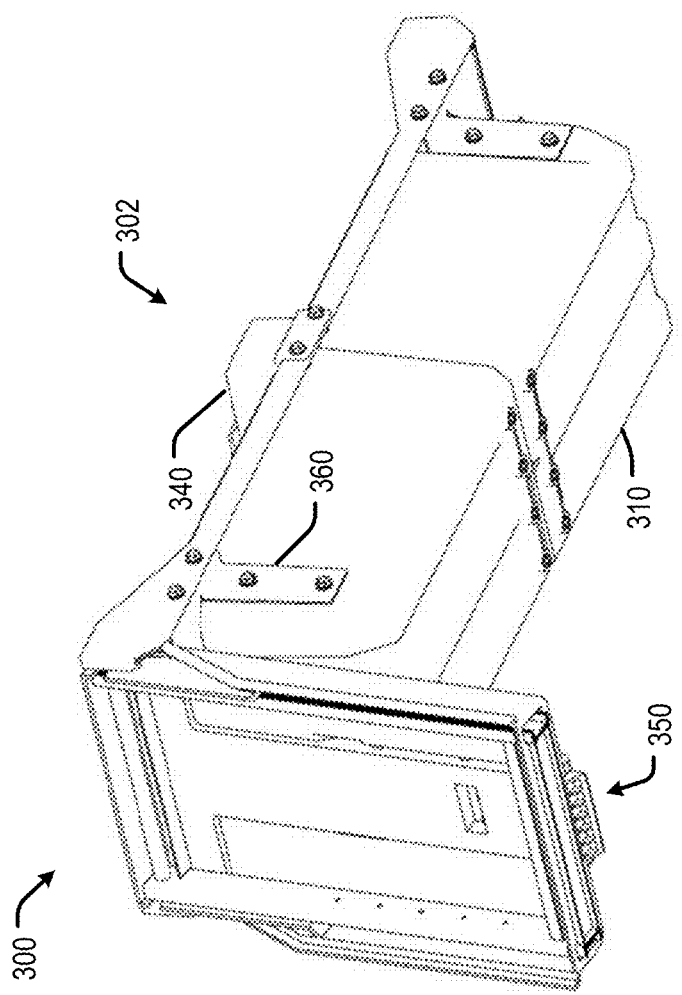

Ladder 330 may include a frame body 331, one or more steps 332, and a locking mechanism 336. Ladder 330 may be positioned within a cavity 326 defined by lid 320. For example, as shown in FIG. 6A, while ladder 330 is coupled to lid 320 the ladder 330 is configured to be in a stowed position in which a portion of the ladder is positioned within cavity 326 defined by lid 320. In some implementations, ladder 330 is moveable relative to lid(s) 320 and base 310. For example, ladder 330 is configured to be moveable from the stowed position (e.g., FIG. 6A) to a deployed position (e.g., FIG. 6B) in which the portion of the ladder is positioned outside cavity 326 defined by lid 320. In some implementations, the portion of the ladder that is moveable from cavity 326 includes one or more step(s) 332.

Frame body 331 is configured to be movable relative to lid 320. For example, ladder 330 may be slidably coupled to lid 320 and configured to translate relative to lid 320 to transition between the stowed position and the deployed position. For example, ladder may extend from lid 320 to the deployed state. In some implementations, frame body 331 may comprise a pair of mounts both extending from bracket 260. For example, frame body 331 may define a C-channel shape to provide strength and stability to ladder 330. In some implementation, frame body 331 may comprise an outer frame 333 and an inner frame 334. Outer and inner frame 333, 334 (e.g., telescoping legs) may be slidably coupled to lid 320 in a telescoping manner. For example, inner frame 334 may be disposed within a portion of outer frame 333 and move relative to outer frame 334. To illustrate, outer frame 333 and inner frame 334 may be configured to define two or more nesting channels and may extend from the lid 320 to a height desired by the user (including all the way to the ground plane). Storage container 300 may have increased stability and reduce the magnitude of forces acting on the container 200 for implementations where ladder 330 extends to the ground plane. Nesting channels may be configured in the shape of U-channel, C-channel, and/or any suitable geometry.

One or more steps 332 may be coupled to frame body 331 and moveable with frame body 331 relative to lid 320. In some implementations, outer frame 333 and/or inner frame 334 may comprise the step(s) 332. For example, step(s) 332 may extend between frame body 331, outer frame 333, and/or inner frame 334. In some implementations, frame body 331 may define one or more holes 335. In some implementations, inner and outer frames 334, 333 may define holes that align with or correspond to hole(s) 335. In some implementations, hole(s) 335 may engage with pin-springs (e.g., detents) associated with outer frame 333 and inner frame 334 to fix the frames (e.g., 333, 334) at a desired height. Accordingly step(s) 332 may be adjusted to a position that is most ergonomic to a user. In this way, the user may safely and ergonomically access a cavity of housing using ladder 330.

Figure 6C:
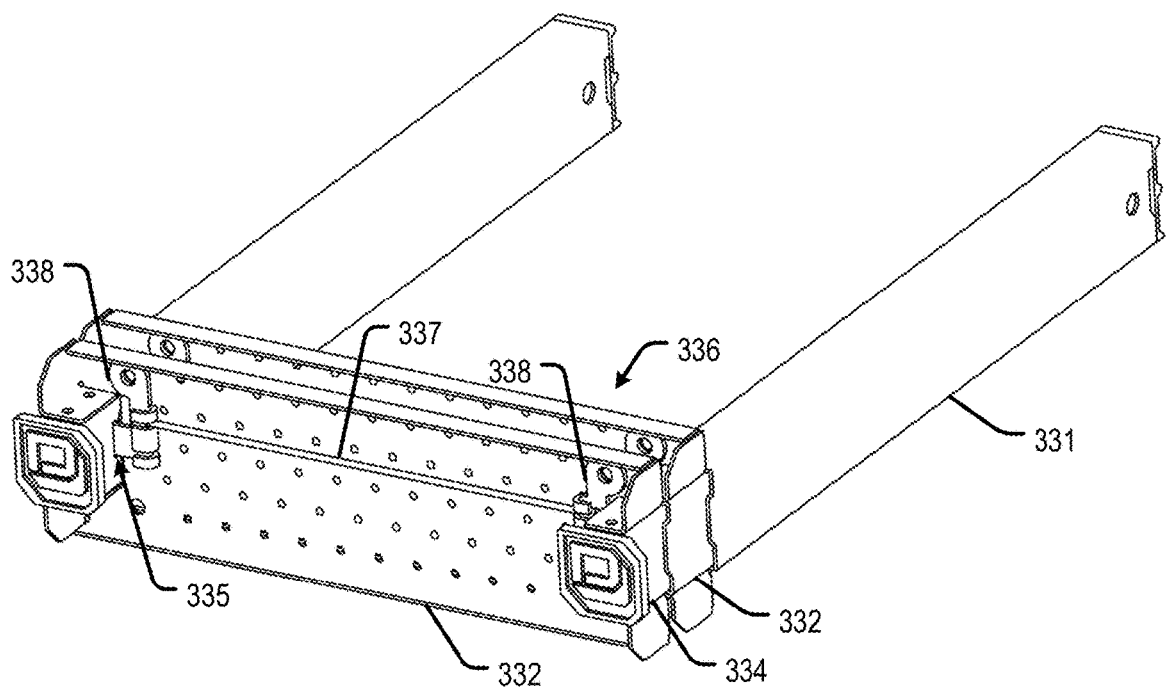
FIGS. 6C-6D are perspective views of an example of a ladder showing a locking mechanism in a first configuration and a second configuration, respectively.
Figure 6D:
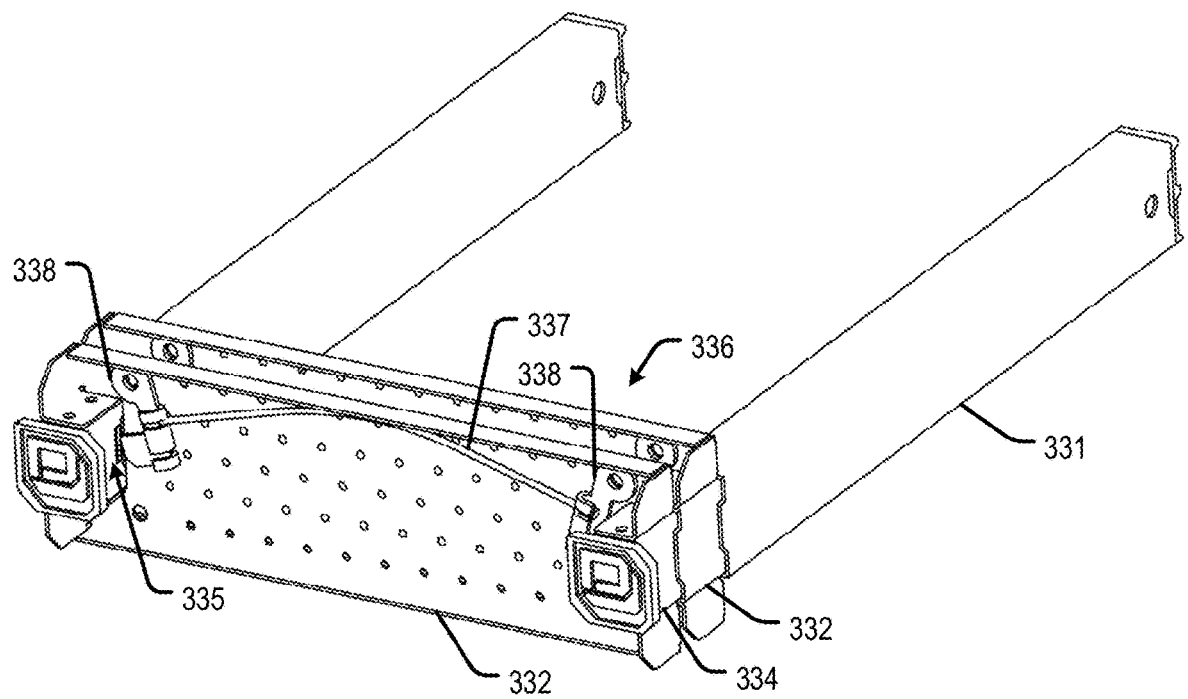

Locking mechanism 336 may be configured to selectively secure the legs (e.g., 331, 333, 334) of ladder 330. Referring to FIGS. 6C and 6D, an illustrative example of a locking mechanism 336 of ladder 330 is shown. For example, FIG. 6C shows a perspective view of locking mechanism 336 in a first configuration (e.g., engaged configuration), and FIG. 6D shows a perspective of locking mechanism 336 in a second configuration (e.g., released configuration).

Locking mechanism 336 may include a connector 337 and one or more attachment members 338. As shown, attachment members 338 are coupled to connector 337. For example, two attachment members 338 are coupled to opposing sides of connector 337 to engage ladder 330. A user may provide an input (e.g., physical or electrical) to operate locking mechanism 336 from the first configuration (e.g., engaged configuration) to the second configuration (e.g., released configuration). In some implementations, locking mechanism 336 may be coupled to a bottom side of one or more steps (e.g., 332). For example, locking mechanism 336 may extend from opposing ends of the step 332 to engage a frame (e.g., 331, 333, 334) of the ladder 330. As shown in FIGS. 6C and 6D, each step 332 includes a corresponding locking mechanism 336. In other implementations, a single step or fewer than all steps 332 includes locking mechanism 336.

Attachment member(s) 338 may be pivotably and/or slidably coupled to ladder 330. For example, each attachment member 338 is moveable to couple or decouple locking mechanism to a hole (e.g., 335) of a frame (e.g., 331, 333, 334). For example, an end of attachment member 338 may constitute a latch configured to engage with the frame to secure on or more legs. In such implementations, attachment member(s) 338 are fixed to a portion (e.g., step 332) of ladder 330 to prevent the telescoping legs from moving. In this way, ladder 330 may remain in a stowed position until desired by a user. Additionally, attachment member(s) 338 may lock the telescoping legs of ladder 330 in place after the legs are moved to a desired height. Accordingly, a user may customize the height of ladder 330 based on a height of the user, a height of a vehicle, a terrain, or other factors.

Connector 337 may be configured to move the attachment member(s) 338 relative to the legs (e.g., 331, 333, 334) of ladder 330. As shown, attachment member(s) 338 are coupled to an end of the connector 337. In some embodiments, connector 337 is biased to prevent the attachment member(s) 338 from moving to the released configuration without any force. For example, connector 337 (e.g., cable) may comprise a flexible material that may be bent such that the ends of the connector move laterally toward each other. A user may bend the connector 337 to disengage the attachment member(s) 338. Connector 337 may automatically flex back toward its original position after the force from the user is release to move the attachment member(s) 338 to the engaged configuration. In this way, a user may be able to lock and unlock the telescoping legs with a single hand. In some implementations, a structure (e.g., hook, knob, pin, or the like) may be positioned on the portion (e.g., step 332) of ladder 330 to secure the connector in the bent configuration. In this way, the user may bend the connector 337 to release the attachment member(s) 338 and can thereafter attach the connector 337 to the structure to keep the attachment member(s) 338 in the released configuration. The user may then manipulate a height of the ladder without fear of accidental locking the telescoping legs.

Referring now to FIGS. 7A and 7B, an illustrative example of a container 400 is shown. Container 400 may include or correspond to container 100, 200, and/or 300. Container 400 is configured to allow a user to easily and ergonomically access the container via one or more steps. In some implementations, container 400 is configured to be coupled to a structure, such as a vehicle, as described further herein at least with reference to FIGS. 13A-13C.

Container 400 includes a housing 402 having a base 410 and one or more lid(s) 420, a ladder 430, a security assembly 440, a latch 450, and a bracket 360. Container 400 is configured to allow a user to easily and ergonomically access a cavity 404 of housing 402 via ladder 430. Housing 402 and base 410 may include or correspond to housing 102, 202, 302 and base 110, 210, 310, respectively. Security assembly 440 may include or correspond to security assembly 240. Latch 450 may include or correspond to latch 250.

Lid 420 is configured to translate (i.e., move linearly) relative to base 410 from a closed position to an open position in which a portion of cavity 404 is exposed. For example, lid 420 may be moveable along sliding rails 471 that are configured to be coupled to base 410. In some implementations, lid 420 may be pivotable relative to base 410 after lid reaches a predetermined portion of sliding rails 471. For example, once lid 220 reaches a first end 472 of sliding rails 471, the lid 420 may pivot downward.

In some implementations, lid 420 defines one or more steps 473 that allow the user to gain access to the contents of container 400. Ladder 430 may be integrated with lid 420. For example, step(s) 473 may be fixed (i.e., not movable) relative to lid 420. In this way, manufacture and operation of container may be simplified. In some implementations, lid 420 may include a frame or rails coupled within a cavity of the lid 420 such that a portion of lid 420 can move relative to the frame or rails such that the one or more steps are provided closer to the ground. In other implementations, lid 420 may be operable with ladder 230 or 330 as previously described with reference to FIGS. 3A-3C and 6A-6B. In some implementations, a latch (e.g., 250) may be coupled to a bottom portion of lid 420 and configured to prevent lid 420 from rotating past a predetermined angle.

Figure 17A:
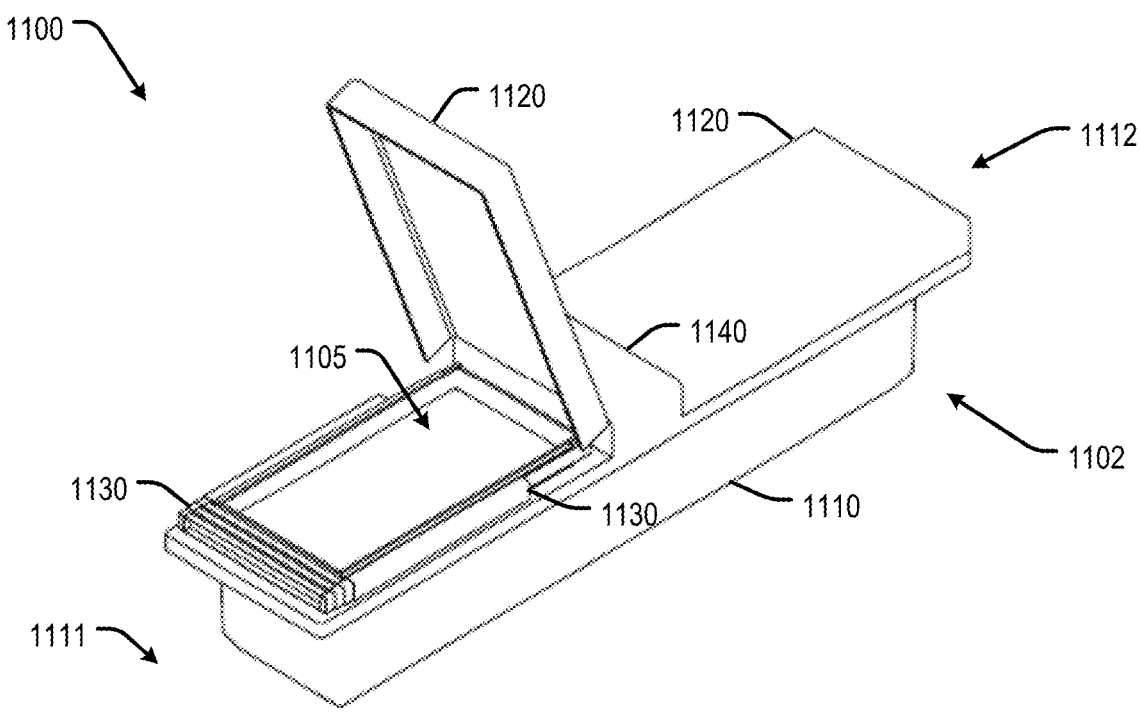
FIG. 17A-17C are perspective views of an example of a container.
Figure 17B:
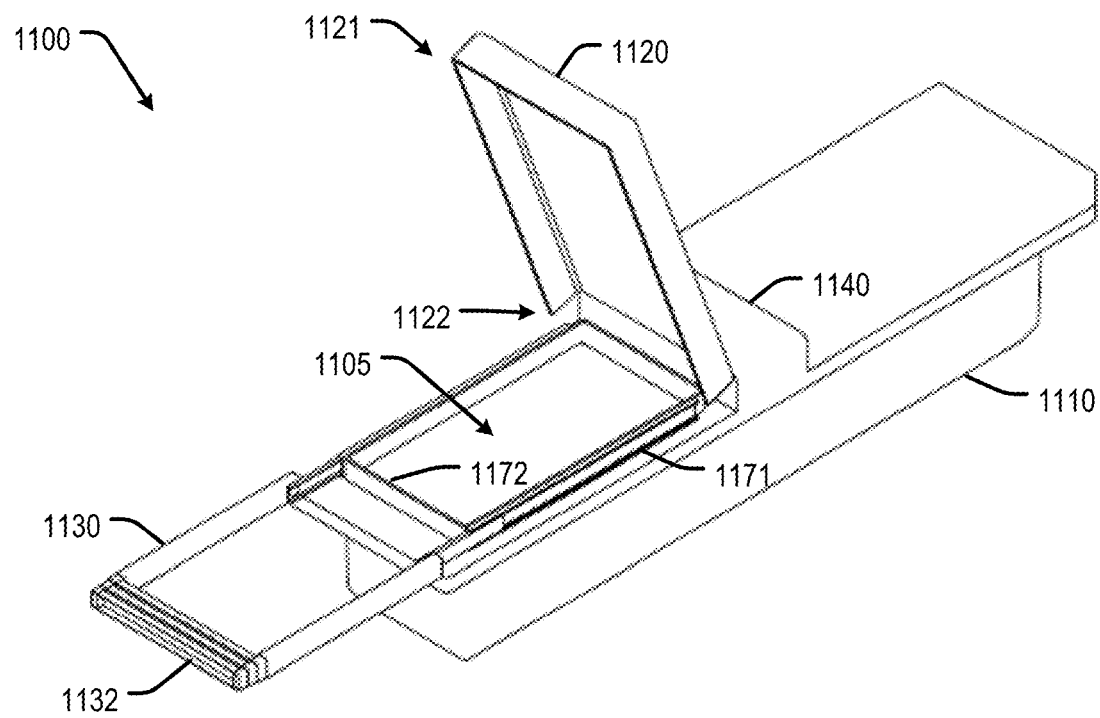
Figure 17C:
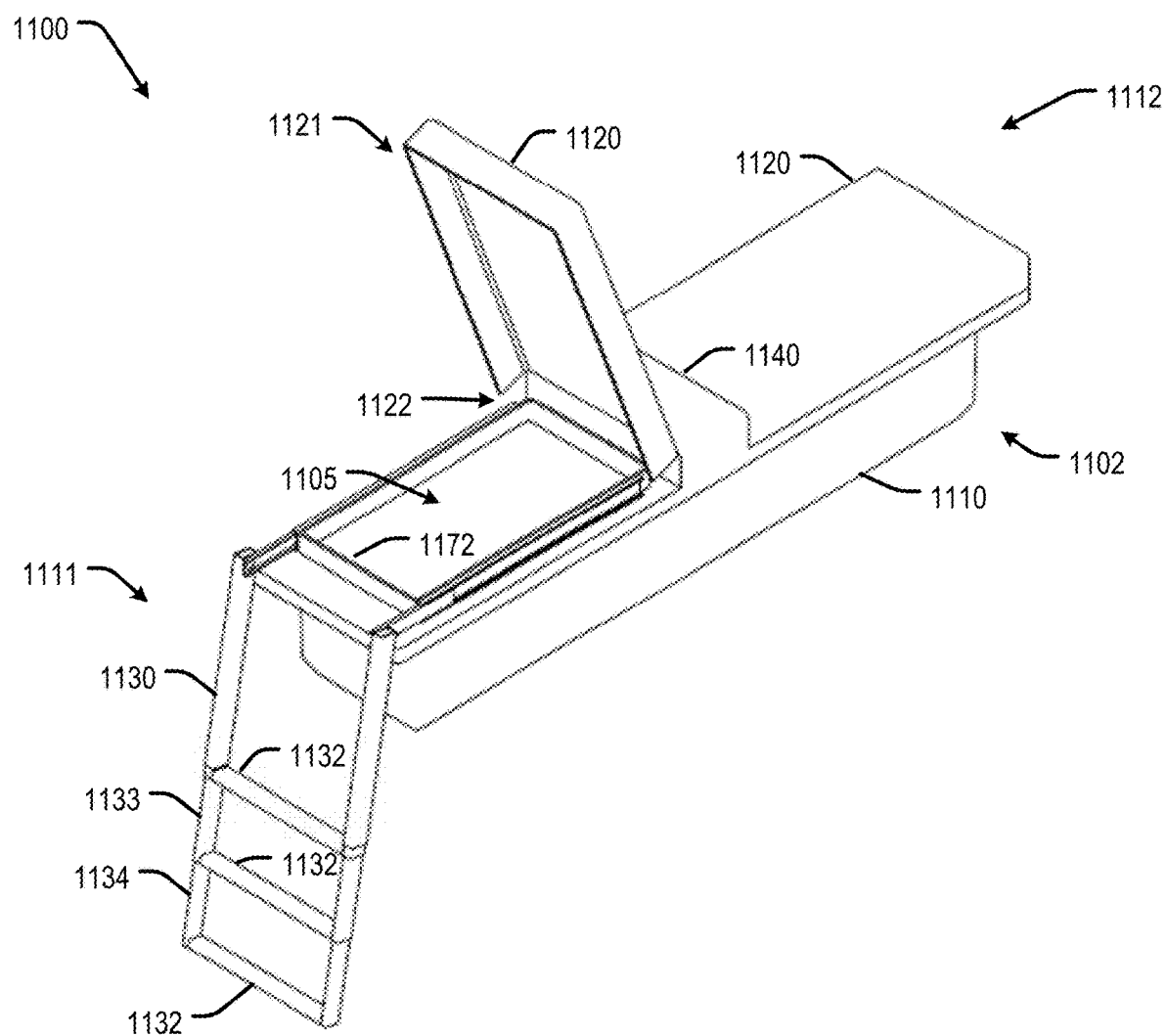
Figure 18A:
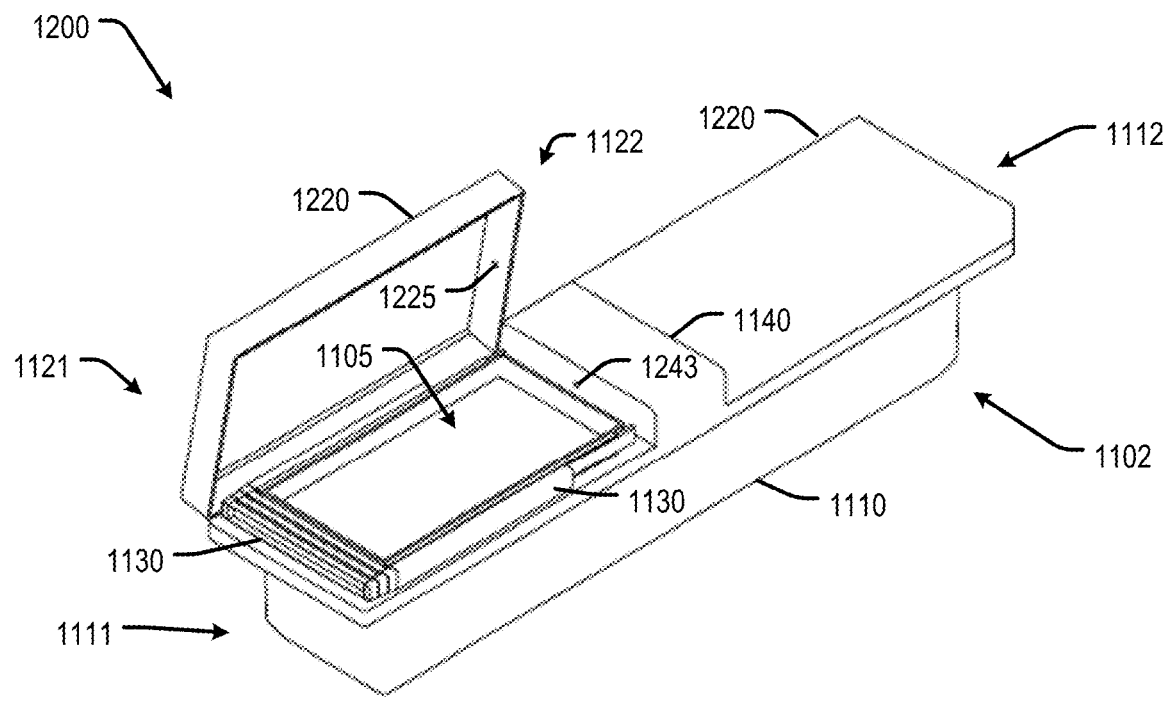
FIG. 18A-18C are perspective views of an example of a container.
Figure 18B:
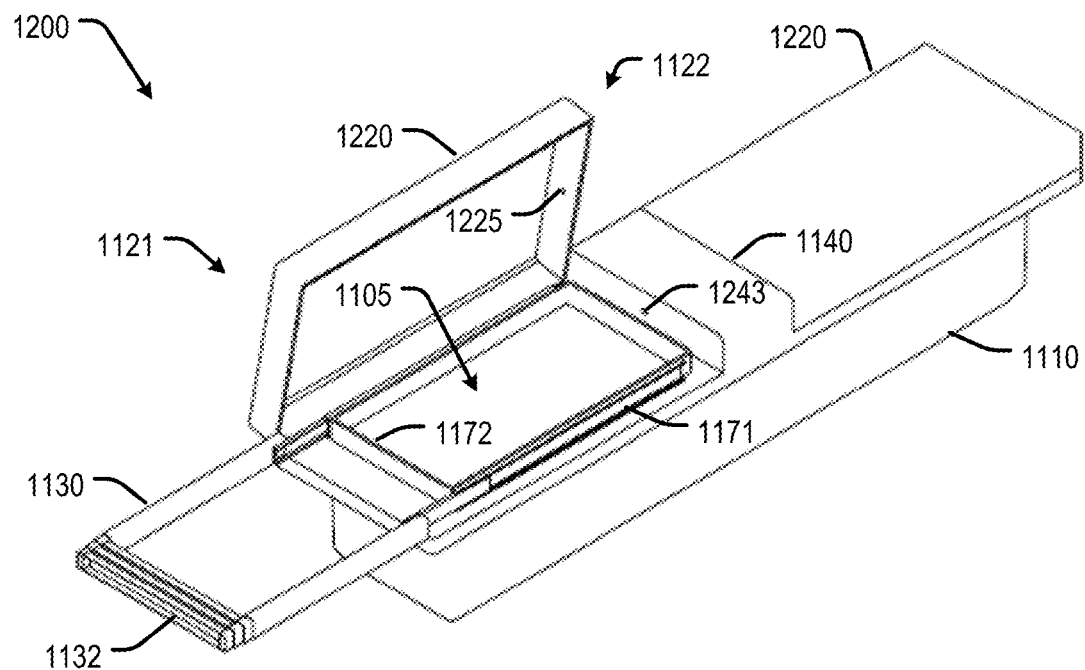
Figure 18C:
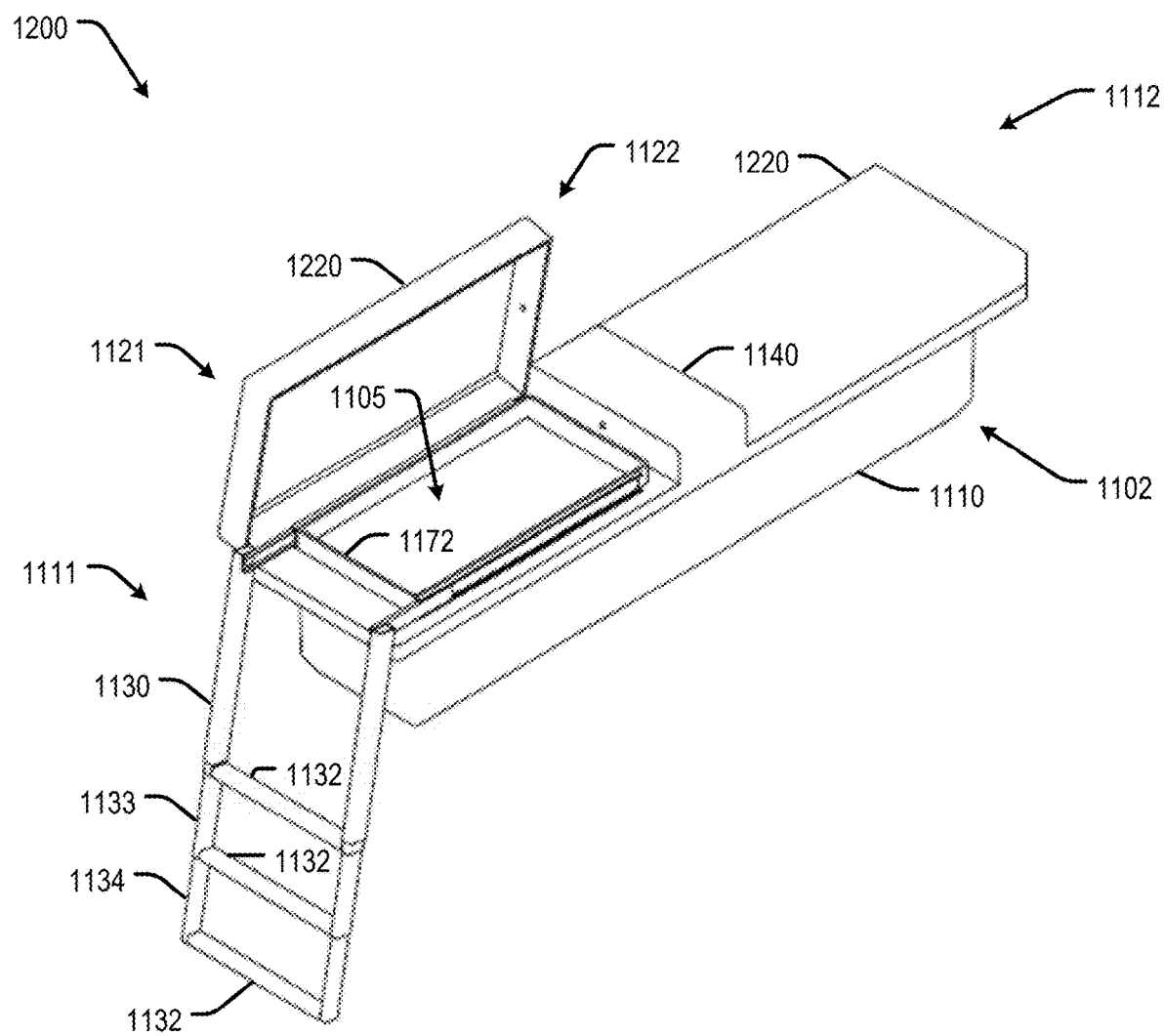

Referring to FIGS. 17A-17C and 18A-18C, illustrative examples of a container 1100 and 1200, respectively, in different ladder deployment stages are shown. For example, FIG. 17A shows a perspective view of container 1100 during a first stage, FIG. 17B shows a perspective of container 1100 during a second stage, and FIG. 17C shows a perspective view of container 1100 during a third stage. Additionally, FIG. 18A shows a perspective view of container 1200 during a first stage, FIG. 18B shows a perspective of container 1200 during a second stage, and FIG. 18C shows a perspective view of container 1200 during a third stage.

Referring to FIGS. 17A-17C, container 1100 may include or correspond to container 100, 200, and/or 300. Container 1100 is configured to allow a user to easily and ergonomically access the container via one or more steps. In some implementations, container 1100 is configured to be coupled to a structure, such as a vehicle, as described further herein at least with reference to FIGS. 13A-13C.

Container 1100 includes a housing 1102 having a base 1110 and one or more lid(s) 1120, a ladder 1130, and a security assembly 1140. Container 1100 is configured to allow a user to easily and ergonomically access a cavity of housing 1102 via an opening 1105. Housing 1102 and base 1110 may include or correspond to housing 102, 202, 302, 402 and base 110, 210, 310, 410 respectively. Housing 1102 may have a first end 1111 and a second end 1112. As shown, first end 1111 is opposite second end 1112. Security assembly 1140 may include or correspond to security assembly 240 or security assembly 440 as descried further herein with reference to FIG. 8B. Ladder 1130 may include one or more steps 1132. In some implementations, ladder 1130 may have one or more telescoping sections, similar to ladder 330 described with reference to FIGS. 6A-6B.

Lid(s) 1120 may be configured to rotate about base 1110. For example, as shown in FIGS. 17A-17C, lid(s) 1120 may have a first end 1121 and a second end 1122 opposite first end 1121. Lid 1120 may be configured to rotate about second end 1122 of the lid(s) that is adjacent to security assembly 1140.

Ladder 1130 may be pivotably and/or slidably coupled to base 1110. For example, ladder 1130 may be coupled to base 1102 via a rail 1171. For example, rail 1171 may be coupled to lip 1172 (e.g., a raised sidewall) that defines opening 1105. Rail 1171 may be configured to enable ladder 1130 to slide from a first position as shown in FIG. 17A, to a second position as shown in FIG. 17B, and to a third position as shown in FIG. 17C. When in the second position, ladder 1130 may be configured rotate to the third position. To further illustrate, ladder 1130 may slide towards first end 1111 of the base 1110 and, after reaching a predetermined point, rotate about the first end 1111 of base 1110. In some implementations, ladder 1130 may comprise telescoping legs (e.g., 1133, 1134) that extend toward the ground after ladder 1130 rotates about the base 1120. Ladder 1130 may comprise notches or holes to lock steps 1132 into place once ladder 1130 is in the deployed position.

Referring to FIGS. 18A-18C, container 1200 may include or correspond to container 100, 200, 300, and/or 1100. Container 1200 is configured to allow a user to easily and ergonomically access the container via one or more steps. In some implementations, container 1200 is configured to be coupled to a structure, such as a vehicle, as described further herein at least with reference to FIGS. 13A-13C. As compared to container 1100, at least one lid 1220 of container 1300 is configured to open/close with respect to a different side of housing 1102 as lid 1120. In some implementations, 1200 container may include two lids, such as a first lid 1120 and a second lid 1220.

As shown in FIGS. 18A-18C, lid 1220 include first end 1121 and second end 1122. Additionally, lid 1220 defines a through hole 1225. Through hole 1225 may include or correspond to through hole 525 of FIG. 8B, or through hole 625 of FIG. 10B, as described further herein. Security assembly 1140 may include a through hole 1243, which may include or correspond to through hole/opening 543 of FIG. 8B, as described further herein.

Figure 19A:
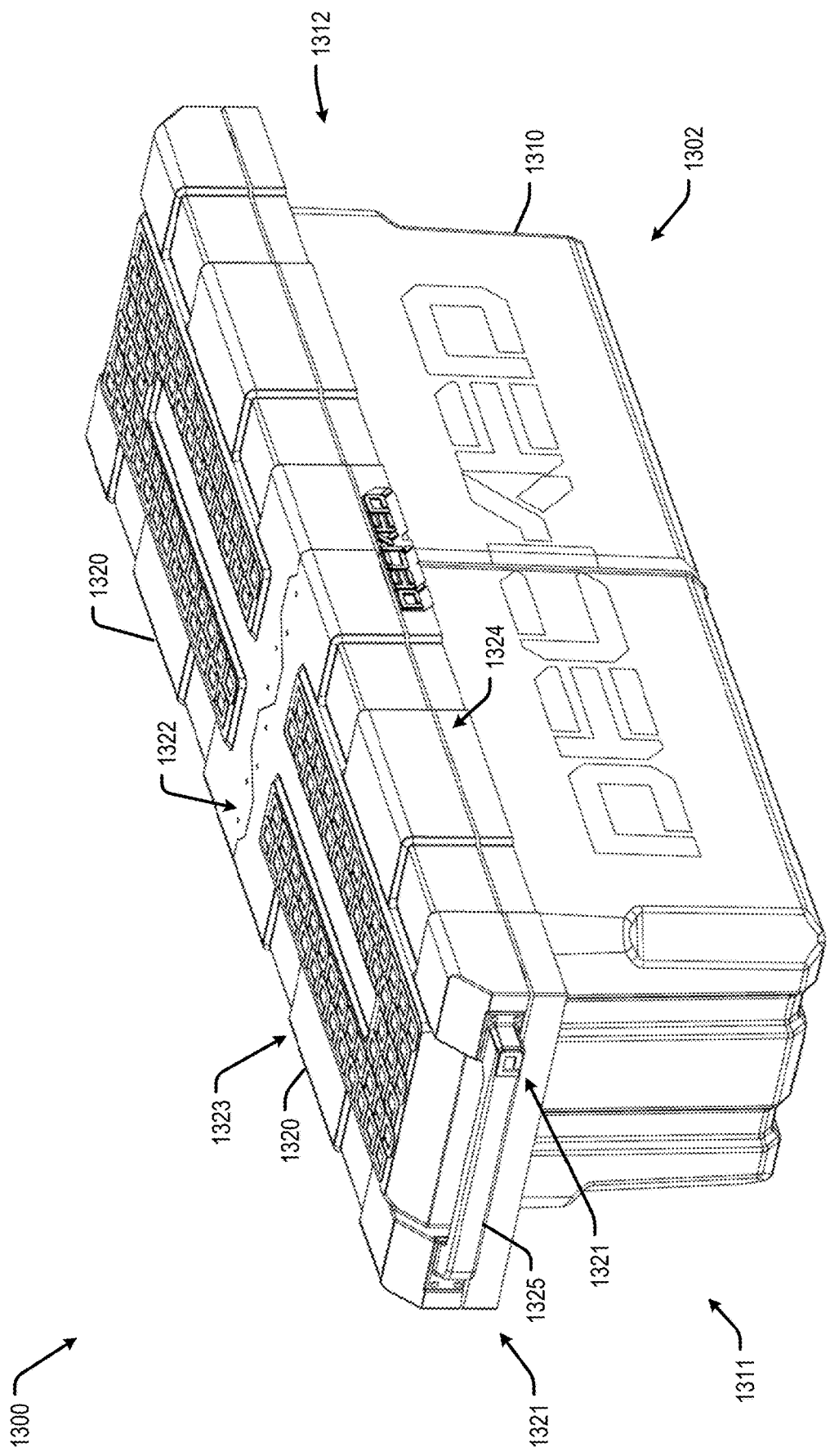
FIG. 19A is a perspective view of an example of a container in a first configuration.
Figure 19B:
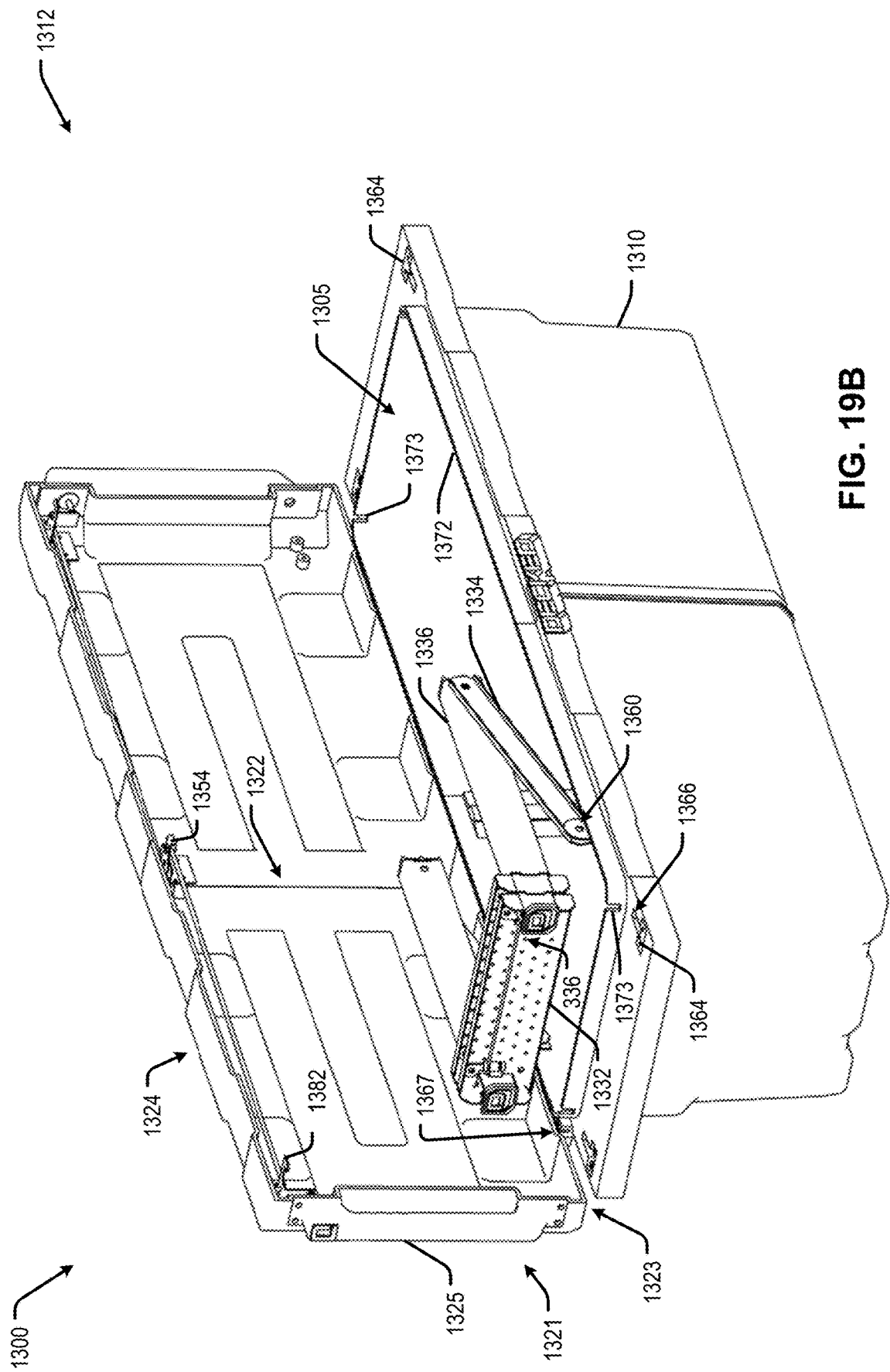
FIGS. 19B and 19C are perspective views of the container of FIG. 19A in a second configuration and a third configuration, respectively.
Figure 19C:
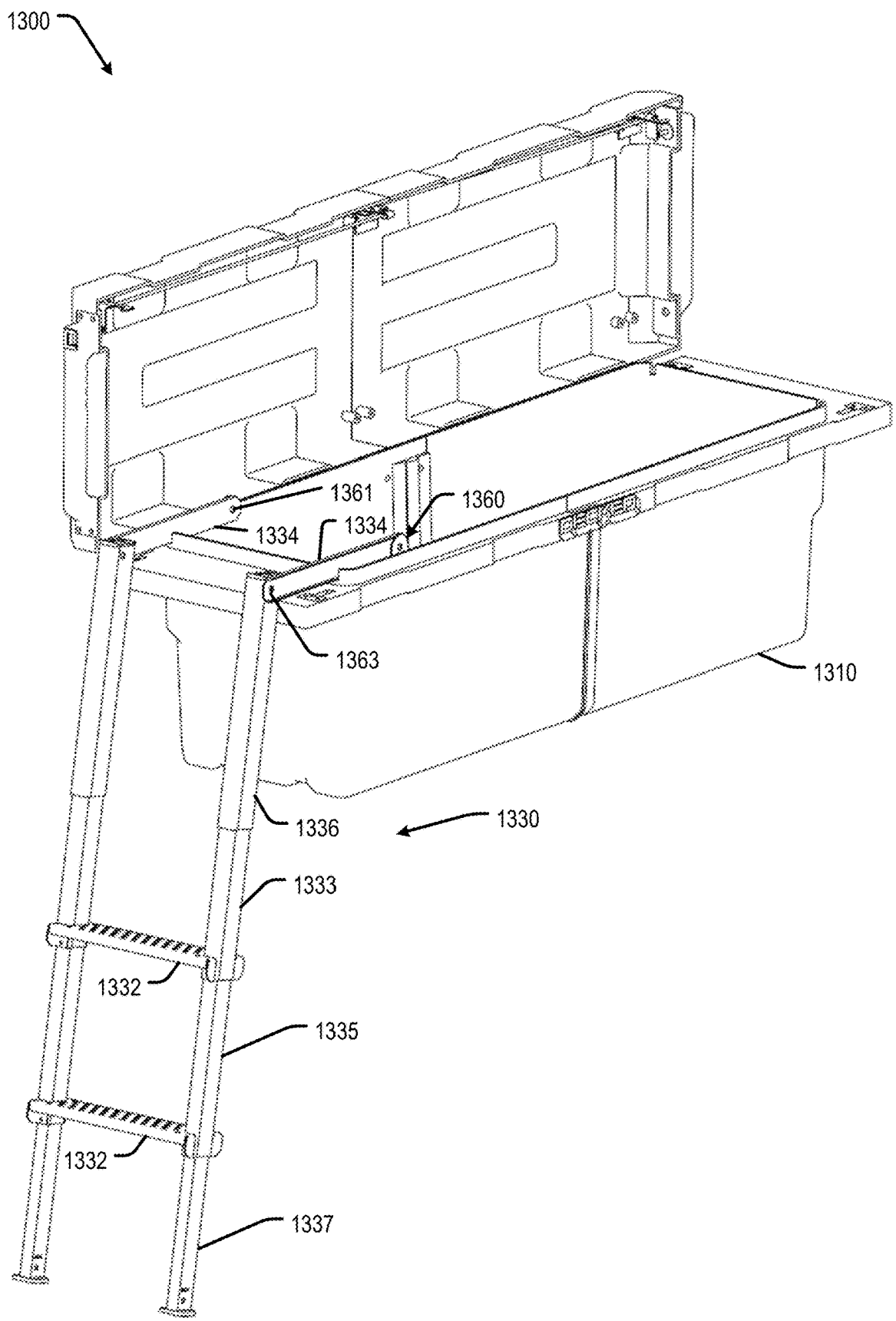
Figures 19D, 19E:
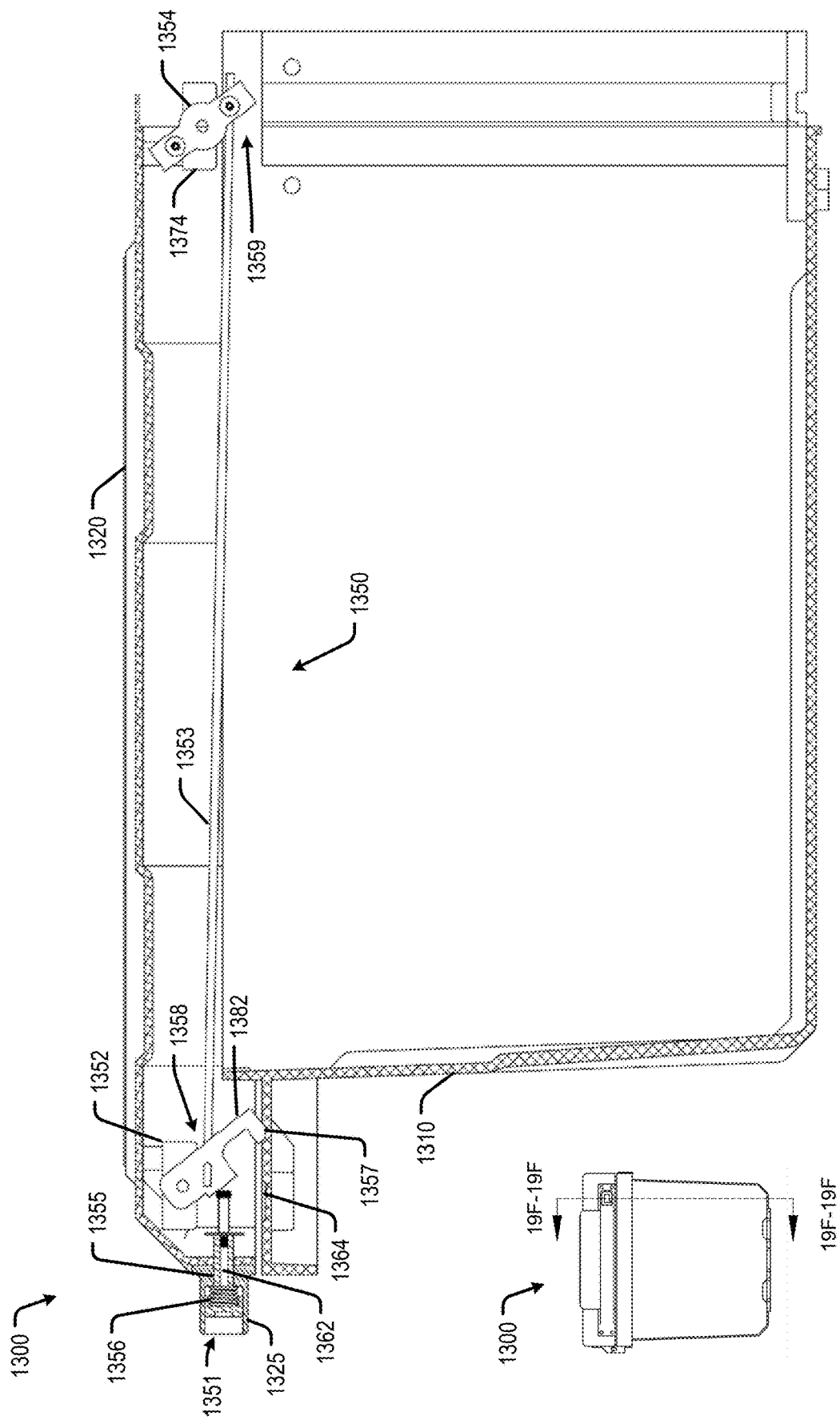
FIG. 19D is a side view of the container of FIG. 19A.
FIG. 19E is a partial cross-sectional view of the container of FIG. 19D taken along line 19E-1E of FIG. 19D
Figure 19F:
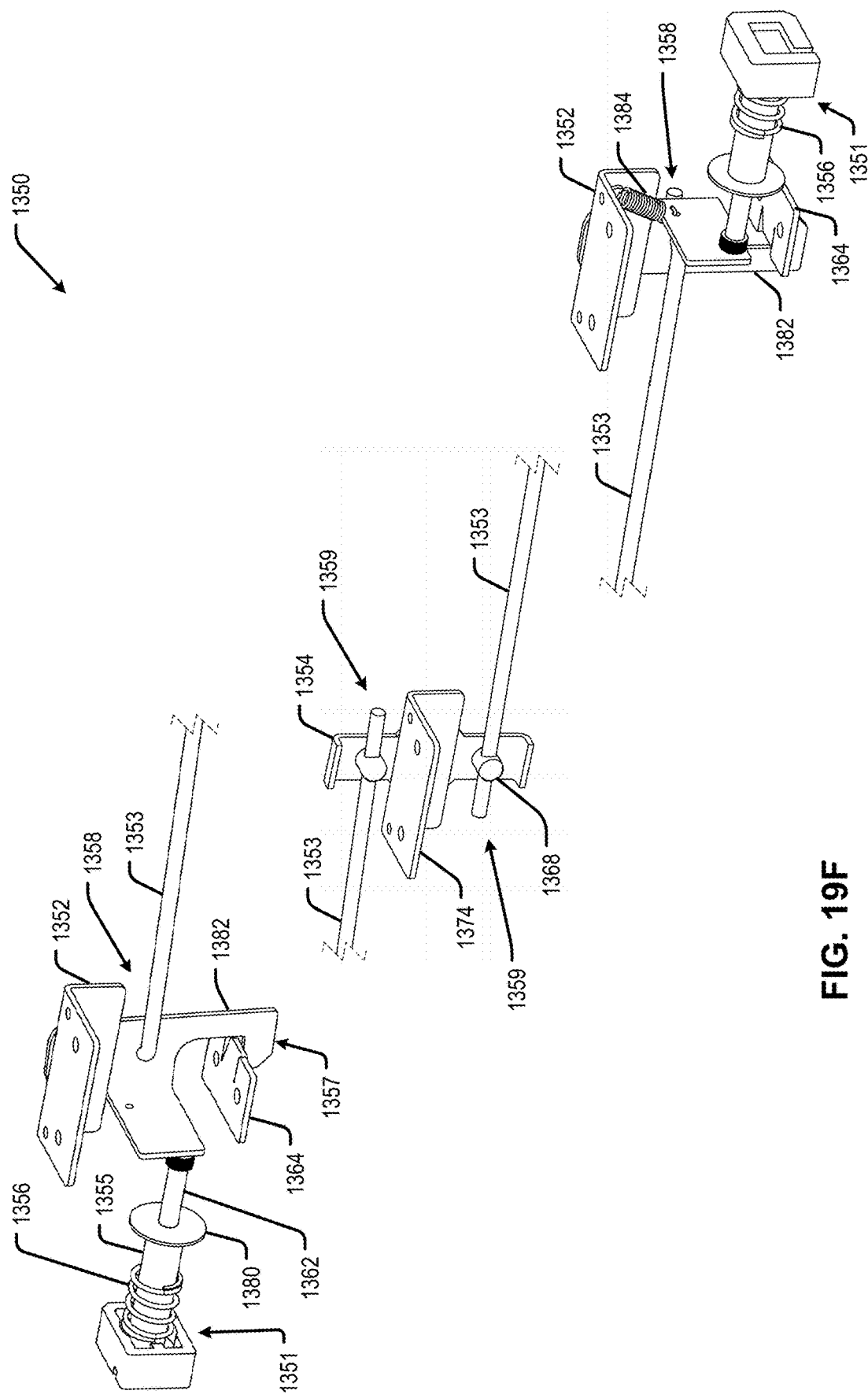
FIG. 19F is an example of a lock system of the container of FIG. 19A.

Referring to FIGS. 19A-19F, an example of one or more aspects of a container 1300 are shown. For example, FIG. 19A shows a perspective view of container 1300 during a first configuration (e.g., closed configuration), FIG. 19B shows a perspective of container 1300 during a second configuration, and FIG. 19C shows a perspective view of container 1300 during a third configuration (e.g., deployed configuration). Additionally, FIG. 19D shows a side view of container 1300, FIG. 19E shows a partial cross-sectional view of container 1300 taken along line 19F-19F of FIG. 19E, and FIG. 19F shows an example of a lock system of container 1300.

Referring to FIGS. 19A-19F, container 1300 may include or correspond to container 100, 200, 300, 500, 1100 and/or 1200. Container 1300 is configured to allow a user to easily and ergonomically access the container via one or more steps. In some implementations, container 1300 is configured to be coupled to a structure, such as a vehicle, as described further herein at least with reference to FIGS. 13A-13C.

Container 1300 includes a housing 1302 having a base 1310 and one or more lid(s) 1320, a ladder 1330, and a locking assembly 1350. Container 1300 is configured to allow a user to access a cavity of housing 1302 via an opening 1305. Housing 1302 and base 1310 may include or correspond to housing 102, 202, 302, 402, 1102 and base 110, 210, 310, 410, 1110, 1210, respectively. Housing 1302 may have a first end 1311 and a second end 1312. As shown, first end 1311 is opposite second end 1312.

Lid(s) 1320 may be configured to move with respect to base 1310 to enable access to a cavity defined by base 1310. For example, lid 1320 may be configure to rotate about base 1310. As shown in FIGS. 19A-19C, lid(s) 1320 may have a first end 1321, a second end 1322, a third end 1323, and a fourth end 1324. The first end 1321 is opposite the second end 1322 and the third end 1323 is opposite the fourth end 1324. In some implementations, lid 1320 includes or is coupled to a handle 1325, such as at first end 1321. Handle 1325 may be configured to allow a user to rotate lid 1320 relative to base 1310. Similar to container 1200, at least one lid 1320 is configured to open/close with respect to the housing. For example, lid 1320 may be configured to rotate with respect to third end 1323 or fourth end 1324 of the lid(s). To illustrate, a hinge 1367 may be coupled to lid 1320 and base 1310 to enable rotation of lid 1320 with respect to base 1310. In some implementations, 1300 container may include two lids, such as a first lid 1320 and a second lid 1320, while in other implementations, container may include a single unitary lid that spans the length of the base 1310.

Ladder 1330 may include one or more steps 1332, a first support frame 1334, and a second support frame 1336. In some implementations, ladder 1330 may have one or more telescoping sections, similar to ladder 330 described with reference to FIGS. 6A-6D. Additionally, or alternatively, ladder 1330 may include one or more locking mechanisms 336.

Ladder 1330 may include one or more support frames, such as a first support frame 1334 coupled to a second support frame 1336. In some implementations, first support frame 1334 is pivotably coupled to second support frame 1336 via a connection 1363. As shown, ladder 1330 may be pivotably coupled to base 1310 via first support frame 1334. For example, ladder 1330 may be coupled to base 1310 via a bracket 1360, such as a hinged/rotation connection 1361. Bracket 1360 may include or correspond to bracket 360.

In some implementations, bracket 1360 may be coupled to a lip 1372 (e.g., a raised sidewall) that defines opening 1305. Lip 1372 of base 1310 may include one or more channels 1373 configured to receive first support frame 1334. Bracket 1360 may be configured to enable first support frame 1334 to rotate from a first position as shown in FIG. 19B, to a second position (e.g., deployed position) as shown in FIG. 19C. When moving from the first position to the second position, second support frame 1336 may be configured to rotate about first support frame 1334 to deploy the second support frame 1336. For example, second support frame 1336 may be positioned at a predetermined angle relative to base 1302 as described herein at least with reference to FIGS. 3A-3C. In some implementations, second support frame 1336 may include telescoping legs (e.g., 1333, 1135, 1337) that extend outward after ladder 1130 rotates about the base 1310 to the second position. Ladder 1330 may include one or more notches or holes to lock steps 1332 into place once ladder 1330 is in the deployed position. In some implementations, telescoping legs (e.g., 1333, 1135, 1337) may be actuated in the same manner as described herein at least with reference to FIGS. 6A-6C. However, as compared to container 300, telescoping legs (e.g., 1333, 1135, 1337) are not integrated with lid(s) 1320.

Locking assembly 1350 may be operable with a container (100, 200, 300, 400, 500, 1100, 1200, 1300) as described herein. To illustrate, locking assembly 1350 may be configured to enable a user to transitioning lid(s) (e.g., 1320) between a closed position and an open position. In some implementations, locking assembly 1350 may be used in conjunction with or in addition to security assembly (e.g., 240, 340, 440, 540, 1140), while in other implementations, locking assembly 1350 may be used without the security assembly.

Locking assembly 1350 may include an actuator 1351, a body 1355, a spring 1356, a rod 1362, a mounting plate 1352, a bracket 1382, and a bracket plate 1364. Actuator 1351, body 1355, and/or spring 1356 may be coupled to lid 1320 (e.g., handle 1325). Spring 1356 may be positioned between a flange 1380 of body 1355 and actuator 1351 to bias actuator 1351 away from flange 1380. Actuator 1351 is coupled to rod 1362 which extends through body 1355. Operation of actuator 1351 may cause rod 1362 to move such that rod 1362 extends to contact bracket 1382.

Bracket 1382 includes a latch portion 1357 configured to be inserted through opening 1366 of base 1310 and to couple with or engage bracket plate 1364 to lock or secure lid 1320 with respect to base 1310. Bracket plate 1364 may be coupled to base 1310. In some implementations, locking assembly 1350 may include a spring 1384 coupled to mounting plate 1352 and bracket 1382 to bias bracket 1382. Mounting plate 1352 is coupled to lid 1320 and to bracket 1382. For example, mounting plate 1352 may be coupled to lid 1320 via one or more screws and mounting plate 1352 may be pivotally coupled to bracket 1382.

A user may provide an input (e.g., physical or electrical) to operate locking assembly 1350. In the depicted implementation, the input may be a physical force applied to actuator 1351, such as a button, to disengage latch portion 1357. However, in other implementations, the input may be a wired or wireless activation signal sent by a controller to disengage latch portion 1357, as described further herein at least with reference to FIG. 8E. Additionally, or alternatively, locking assembly 1350 may include, be coupled to, or operate with a security assembly, such as a security assembly positioned between lids as described with reference to FIGS. 8A and 8B.

In some implementations, body 1355 extends through a portion of lid 1320 (e.g., handle 1325). In this way a user may actuate (i.e., provide an input) to engage or disengage bracket 1382. For example, rod 1362 may be moved towards bracket 1382 to rotate bracket 1382 from a first position (e.g., locked state) to a second position (e.g., unlocked state) so that lid 1320 can freely rotate relative to base 1310. In some implementations, spring 1356 biases rod 1362 from engaging bracket 1382. For example, spring 1356 may be wrapped around body 1355 such that a force is required to move rod 1362 to engage bracket 1382. In this manner, bracket 1382 may not be accidentally disengaged.

As shown, bracket 1382 may include latch portion 1357 that is coupled to base 1310 (e.g, bracket plate 1364) while bracket 1382 is in the first position. Latch portion 1357 may be displaced (e.g., rotated) when rod 1362 engages bracket 1382 so that latch portion 1357 is no longer coupled to base 1310. In some implementations, latch portion 1357 may be a portion of bracket 1382 that is furthest away from the axis of rotation of bracket 1382. In some implementations, bracket 1382 may be biased towards the first position (e.g., locked state). For example, bracket 1382 may be biased by spring 1384, while in other implementations, bracket 1382 is biased in another manner. Biasing of bracket 1382 may assist actuator 1351 in preventing accidental disengagement of latch portion 1357 from being coupled to bracket plate 1364 while in the locked state (e.g., a latched state). Additionally, upon moving lid 1320 to a closed position, bracket 1382 may automatically return to an engaged state to secure lid 1320.

In implementations, locking assembly 1350 includes a link 1353, such as a connecting rod. Link 1353 includes a first end 1358 coupled to bracket 1382 and a second end coupled to rotation member 1354. For example, link 1353 may be coupled to rotation member 1354 via a coupler 1368, such as a bushing or other suitable coupler. Rotation member 1354 may be pivotally coupled to a mounting plate 1374, which is coupled to lid 1320. For example, mounting plate 1374 may be coupled to lid 1320 via screws.

As shown in FIG. 19E, rotation member 1354 is coupled to a single link 1353. Alternatively, as shown in FIGS. 19B, 19C, 19F, rotation member 1354 is coupled to multiple links 1353. When rotation member 1354 is coupled to multiple links 1353, such as shown in FIG. 19F, an input at one actuator 1351 may disengage both brackets (e.g., 1382). To illustrate, as bracket 1382 moves from the first position (e.g., locked state) to the second position (e.g., unlocked state), link 1353, and subsequently rotation member 1354, move responsive to bracket 1382. In this way, disengaging bracket 1382 (from bracket plate 1364) will rotate rotation member 1354. In implementations with two brackets (e.g., 1382), rotation member 1354 rotates to cause another bracket (e.g., 1382) to allow multiple lids 1320 to become unlatched.

Although locking assembly 1350 is shown as including link(s) 1353 and rotation member 1354, in some implementations, locking assembly 1350 may not include link(s) 1353 and rotation member 1354. In some implementations, link 1353 and rotation member 1354 may be coupled to a security assembly that is configurable in a locked state and an unlocked state. While configured in the locked state, the security assemble may prevent movement of link 1353 and/or prevent rotation of rotation member 1354. While configured in the unlocked state, security assembly may permit movement of or move link 1353 and/or permit rotation of or rotate rotation member 1354. In some implementations, lid 1320 may include a first bracket (e.g., 1357) configured to be operated via actuator 1351 and a second bracket (e.g., 1357) configured to be operated via a security assembly, such as a security assembly configured to move a link (e.g., 1353) coupled to the second bracket.

Figure 8A:
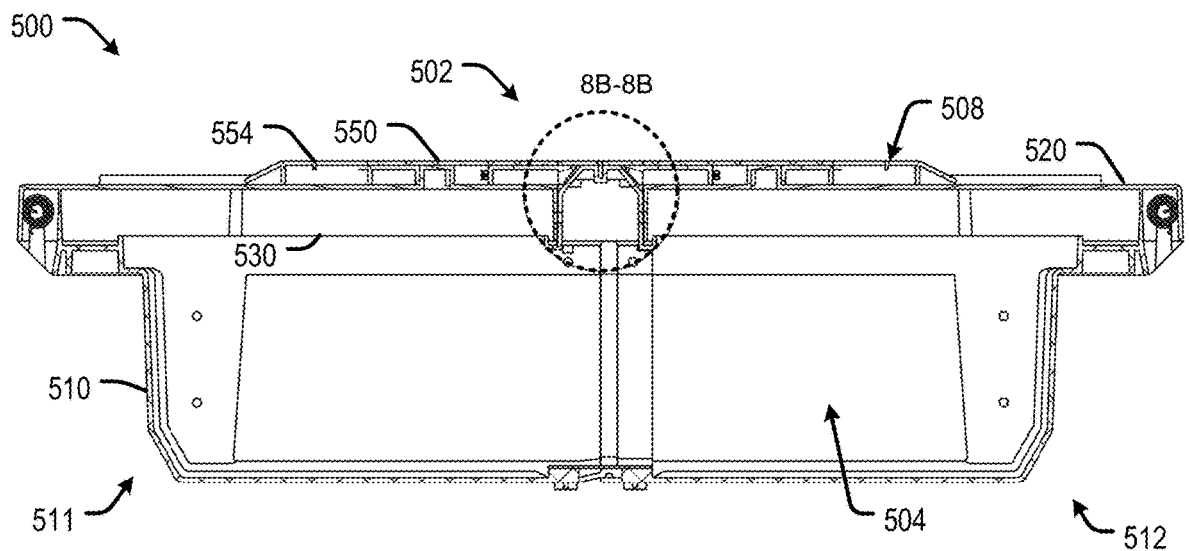
FIG. 8A is a cross-sectional view of an example of a container.
Figure 8B:
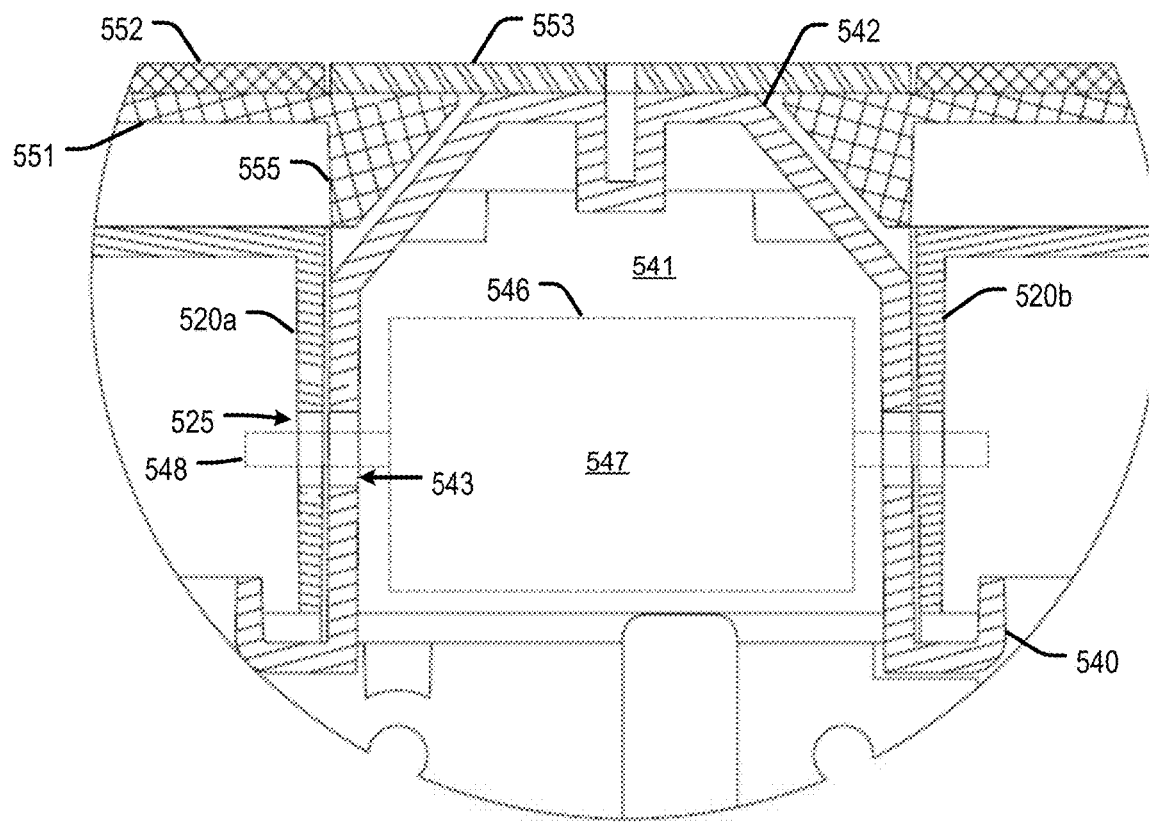
FIG. 8B is an enlarged view of a portion 8B-8B of the container of FIG. 8A.
Figure 8C:
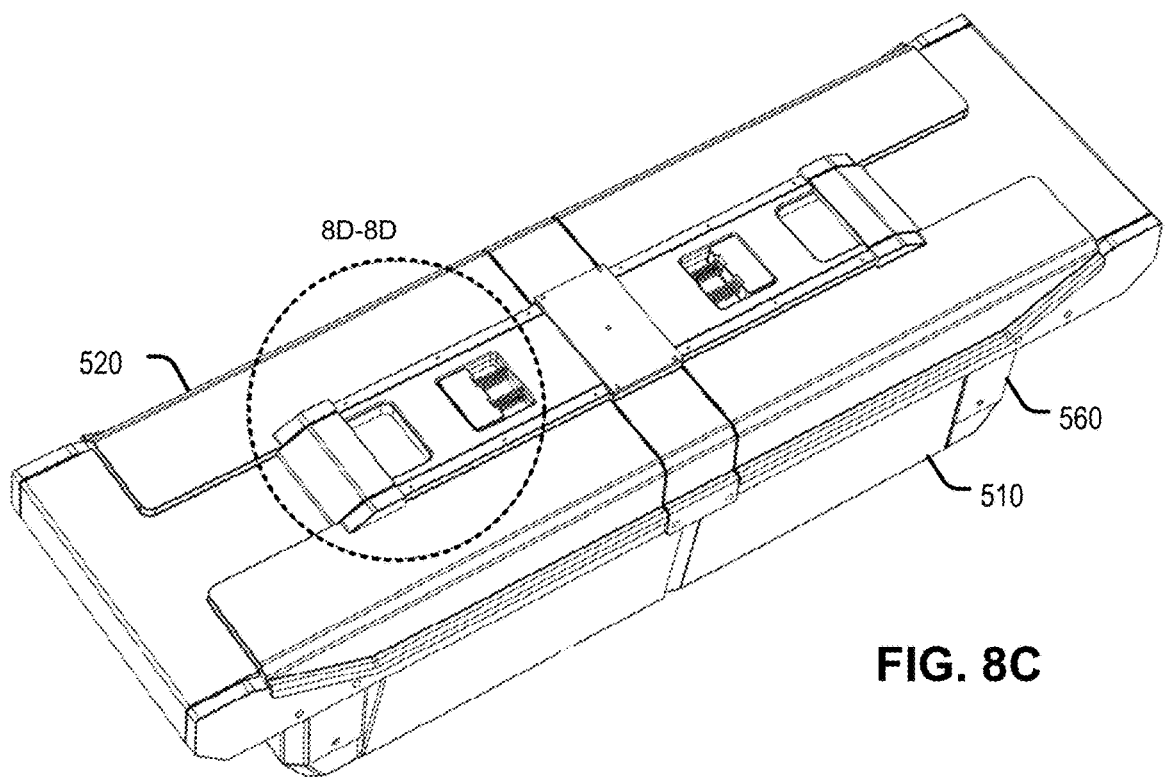
FIG. 8C is a perspective view of the container of FIG. 8A.
Figure 8D:
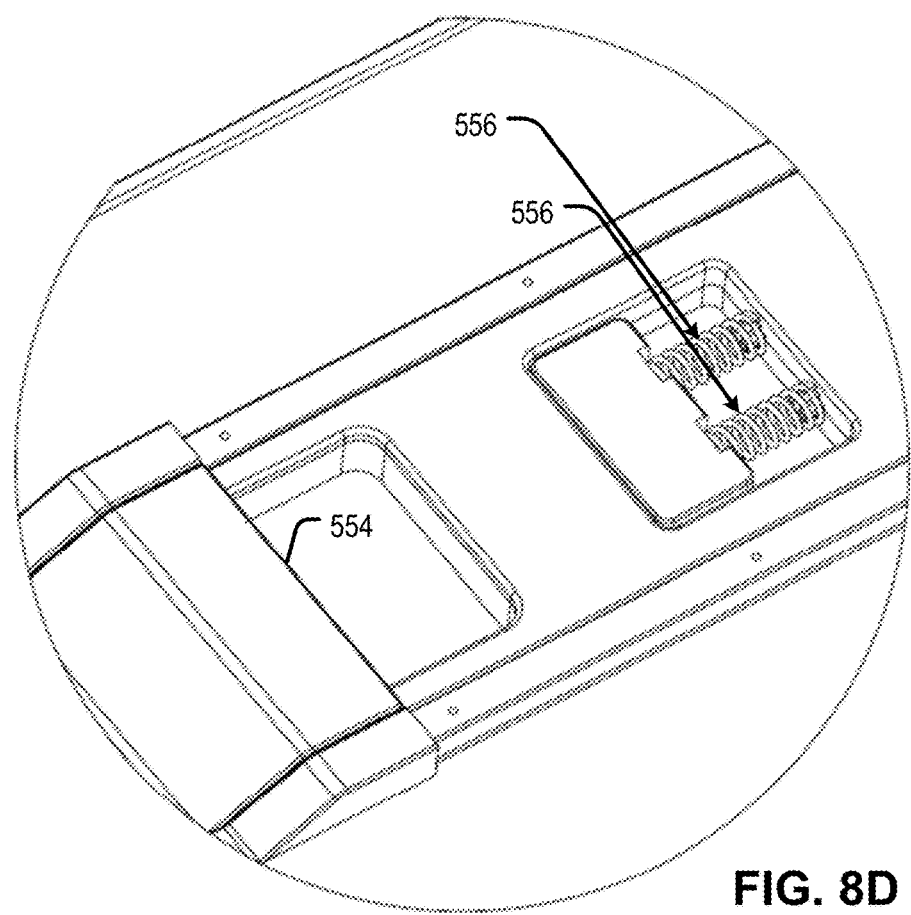
FIG. 8D is an enlarged view of a portion 8D-8D of the container of FIG. 8C.
Figure 8E:
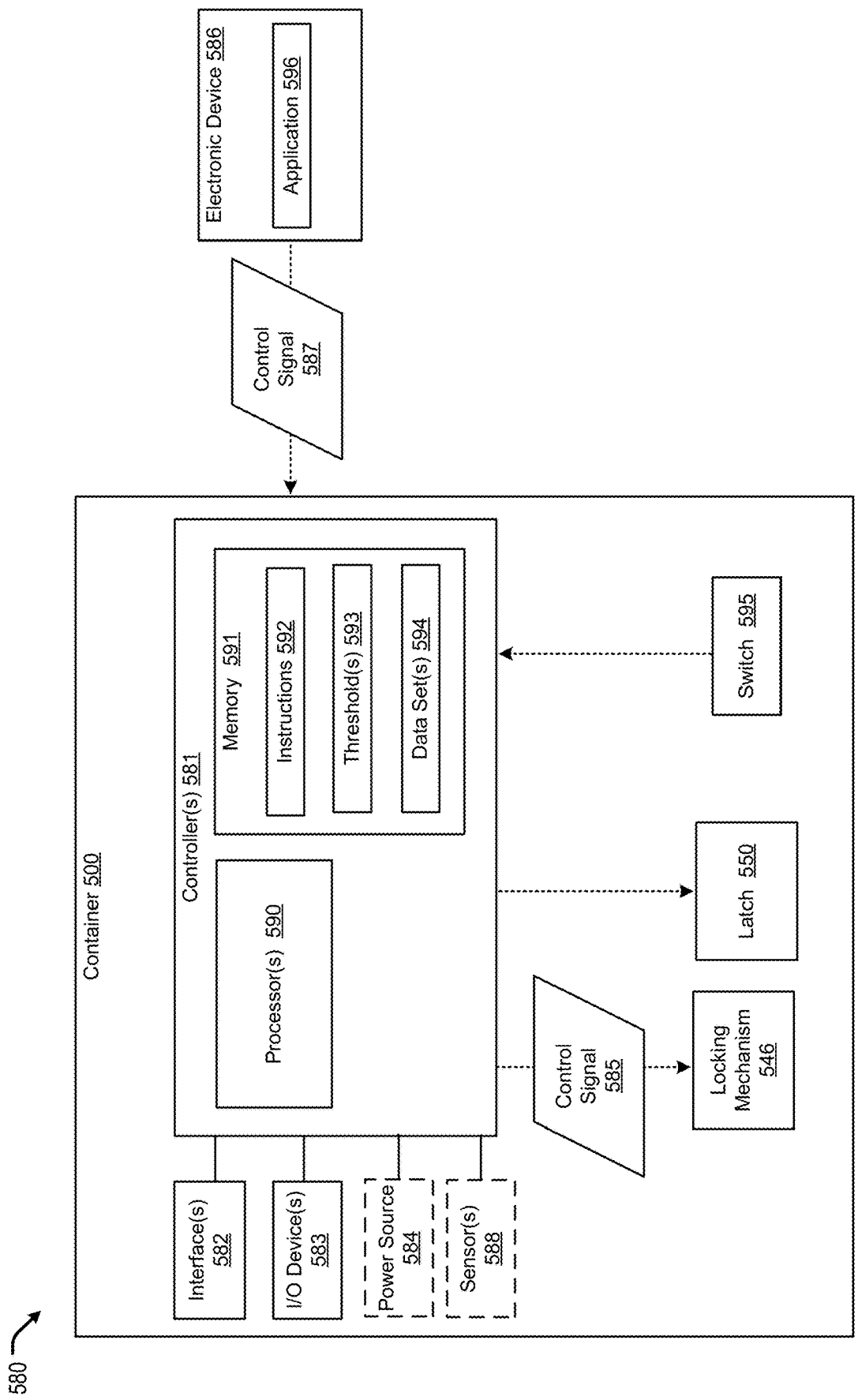
FIG. 8E is block diagram of the container of FIG. 8A.

Referring now to FIG. 8A-8E, aspects of a container 500 are shown. For example, FIG. 8A is a cross-sectional view of container 500, FIG. 8B is an enlarged view of a locking portion of container 500, FIG. 8C is a perspective view of container 500, FIG. 8D is an enlarged view of a latching portion of container 500, and FIG. 8E is a block diagram of container 500. Container 500 may include or correspond to container 100, 200, 300, 400, 1100, 1200, and/or 1300. Container 500 is configured to allow a user to easily and ergonomically access the container via one or more steps. In some implementations, container 500 is configured to be coupled to a structure, such as a vehicle, as described further herein at least with reference to FIGS. 13A-13C.

Container 500 includes a housing 502 having a base 510 and one or more lid(s) 520, a ladder 530, a security assembly 540, a latch 550, and a bracket 560. Housing 502 and base 510 may include or correspond to housing 102, 202, 302, 402, 1102 and base 110, 210, 310, 410, 1102 respectively.

Container 500 may be configured to make access to a cavity 504 (e.g., storage space) of housing 502 inaccessible for unintended users or thieves. In container 500, components may be similar (e.g., in structure and/or function) to components discussed with reference to other assemblies (e.g., 200, 300, 400, 1100, 1200, 1300). For example, security assembly 440 may include or correspond to security assembly 240 and latch 550 may include or correspond to latch 250.

Referring to FIG. 8A, a cross-sectional view of container 500 is shown. In some implementation, security assembly 540 is configured to be positioned adjacent to lid(s) 520. For example, security assembly 540 is configured to be selectively coupleable to lid(s) 520 such that lid(s) 520 are fixed when security assembly 540 is coupled to lids(s) 220. In some implementations, security assembly 240 may be coupled to a center of housing 502, or any other suitable position to be selectively coupleable to lid(s) 520 (e.g., first end 511 or second end 512). For example, security assembly 540 may be positioned between a first lid 520a and second lid 520b.

Security assembly 540 may include an outer casing 542 and a locking mechanism 546. In some implementations, locking mechanism 546 may be coupled to outer casing 542. For example, locking mechanism 546 may be disposed within a cavity 541 defined by outer casing 542. In some implementation outer casing 542 defines one or more hole(s) 543 that provide access to cavity 541.

In some implementations, locking mechanism 546 comprises a body 547 and one or more member(s) 548 (e.g., locking cam, bolt, rods, tabs, or the like). Although referred to herein as member (e.g., 548), member (e.g., 548) may also be referred to herein as a tab, a bar, a cam, a bolt, a shaft, a clip, a latch, a hook, a locking member, or a locking device. Locking mechanism 546 may be configured to couple outer casing 542 to lid(s) 520 via the member(s) 548. In some implementations, each member 548 may be configured to couple outer casing 542 to a respective lid 520. Locking mechanism 546 may be mechanically or electro-mechanically actuated such that locking mechanism 546 is configured to be moveable between a locked position, as shown in FIG. 8B, and an unlocked position. In some implementations, locking mechanism 546 may be actuated to move member(s) 548, such as linear movement away from and toward body 547. For example, while locking mechanism 546 is in the unlocked position, the member(s) 548 does not extend outside of outer casing 542 and/or is disposed within cavity 541 defined by outer casing 542. Additionally, or alternatively, while locking mechanism 546 is in the locked position, at least one of member(s) 548 are may extend from outer casing 542 such that a portion of the member (e.g., 548) is disposed outside of outer casing 542. For example, the portion of member 548 may extend through the hole(s) 543 defined by outer casing 542. In some implementations, member 548 may extend through a hole (e.g., 543) defined in outer casing 542 and through a hole 525 defined in lid 520 to couple security assembly 540 to lid 520. Through hole 525 may include or correspond to through hole 225 of lid 220. Accordingly, lid(s) 520 may be prevented from moving relative to base 510 (e.g., a locked state) when lid 520 is in the closed position (e.g., FIG. 2A) and locking mechanism 546 is in the locked state. Thus, locking mechanism 546 may be actuated selectively to secure access to the container 500.

In some implementations, member 548 may be configured to be coupled to link 1353. For example, an end 1359 may be configured to extend into through hole 525 when a lid is in a locked state. Member 548 may be operated such that the end of link 1353 does not extend into through hole 525.

In some implementations, locking mechanism 546 may not be visible or accessible from an exterior of housing 502 when container 500 is in a first configuration (e.g., a closed configuration) to deter thieves from tampering with security assembly 540 and/or locking mechanism. For example, housing 502 may define an outer surface (e.g., top surface 508 and an exterior of base 510) and locking mechanism 546 (e.g., body 547 and member(s) 548 (e.g, bolt)) is disposed within the outer surface. In some implementations, an entirety of locking mechanism 546 may be disposed within outer surface of housing 502. Additionally, outer casing 542 and/or outer surface of housing 502 may protect locking mechanism 546 and/or lock control system from the environment (e.g., water or dust damage).

Latch 550 (e.g., a latch system) may include a latch slide 551, a latch cover 552, and a latch strike plate 553. Latch 550 may be configured to assist a user in transitioning lid(s) 520 between a closed position and an open position. In some implementations, latch slide 551 may be coupled to lid(s) 520 and latch strike plate 553 may be coupled to security assembly 540. A user may provide an input (e.g., physical or electrical) to operate latch. In an illustrative, non-limiting example, the input may be a physical force applied to a handle 554 to engage latch 550; while in another example, the input may be a wired or wireless activation signal sent by a controller, as described further herein at least with reference to FIG. 8E. Latch strike plate 553 may operate in conjunction latch slide 551 to maintain lid(s) 520 in the closed position.

Latch slide 551 may include a bolt 555 that may translate (e.g., move linearly), relative to the lid 520, toward or away from an end of a lid(s) 520. In some implementations, latch slide 551 may be coupled to handle 554. For example, latch slide 551 may be moved (e.g., via handle 554) toward lid 520 to disengage latch strike plate 553 (e.g., unlocked state) such that lid 520 can freely rotate relative to base 510. For example, bolt 555 (e.g., a bolt portion or a latch) of latch slide 551 may contact latch strike plate 553 to block lid 520 from rotating relative to base 510 while lid 520 is in the closed position. As shown in FIG. 8A, outer casing 542 may be tapered to facilitate engagement of bolt 555 and latch strike plate 553. Additionally, as shown in FIG. 8A, bolt 555 has a wedge shape; however, the shape of bolt 555 is not intended to be limited and bolt 555 may have other shapes or geometries.

Latch 550 and security assembly 540 may operate together to permit and/or restrict movement of lid 520 with respect to base 510 of container 500. In some implementations, security assembly 540 (e.g., locking mechanism 546) may be independent from latch 550. For example, lid 520 may not be moved (e.g., from the closed position) if either of latch 550 or security assembly 540 are in the locked state. Latch 550 may be positioned separately within housing 502 from that of locking mechanism 546. Accordingly, attempted tampering of latch 550 and/or bolt 555, will not affect locking mechanism 546. Therefore, container 500 may have independent two-layer (e.g., latch 550 and locking mechanism 546) security to prevent unauthorized access of container 500 and deter any unauthorized users. In some implementations, latch 550 and/or bolt 555 may not be included and, alternatively, locking assembly 1350 may be included in container 500.

Latch cover 552 is configured to cover select components, or sub-components, of latch 550. For example, latch cover 552 may cover a portion of latch slide 551 and one or more latching springs 556. Referring to FIGS. 8C and 8D, housing 502 is shown in the closed configuration, with latch cover 552 removed. Handle 554 may be disposed on the outer surface of housing 502. For example, handle 554 is disposed on top surface of housing 502 (e.g., lid 520). In some implementations, handle 554 may be contoured to allow a user to manually operate latch 550. For example, a use may manually actuate handle 554, such as while wearing heavy gloves or other equipment that limit the fine motor skills of the hand. In some implementations, handle 554 may be coupled to, and configured to move with, latch slide 551. Latching springs 556 may be coupled to handle 554, latch slide 551 or both. In some implementations, latching springs 556 may bias latch slide 551 toward the locked state (e.g., toward second end 512). Handle 554 may be configured to move latching springs 556 and latch slide 551 to the unlocked state (e.g., away from second end 512) to enable lid 520 to move from the closed position. In some implementations, a lock device may be coupled to handle 554 and/or lid 520 to restrict operation of handle 554. For example, a combination lock or a lock with a key may be installed on handle 554 and/or lid 520, which may provide additional security and further limit unauthorized access to container 500.

As shown in FIG. 8E, a control system 580 may be configured to control one or more operations of container 500, such as operation of locking mechanism 546. In some implementations, control system 580 may be able to initiate operation(s) of latch 550, or the components therein, as described above. Control system 580 may include a controller 581 (e.g., a control device), one or more interface(s) 582, one or more I/O device(s) 583, a power source 584, one or more sensor(s) 588, or combination thereof. In some implementations, control system 580 (e.g., 581-584) may be electrically coupled to components of housing 502 (e.g., latch 550 and/or security assembly 540) and configured to control operation of locking mechanism 546 between the locked position and the unlocked position. For example, circuitry (e.g., a PCB, wires, etc.) may connect each component of control system 580 with housing 502.

Controller 581 may include a processor 590 coupled to a memory 591 (e.g., a computer-readable storage device). Processor 590 may include or correspond to a microcontroller/microprocessor, a central processing unit (CPU), a field-programmable gate array (FPGA) device, an application-specific integrated circuits (ASIC), another hardware device, a firmware device, or any combination thereof. Memory 591, such as a non-transitory computer-readable storage medium, may include volatile memory devices (e.g., random access memory (RAM) devices), nonvolatile memory devices (e.g., read-only memory (ROM) devices, programmable read-only memory, and flash memory), or both. Memory 591 may be configured to store instructions 592, one or more thresholds 593, and one or more data sets 594. In some implementations, instructions 592 (e.g., control logic) may be configured to, when executed by the one or more processors 590, cause the processor(s) 590 to perform one or more operations (e.g., actuate locking mechanism 546). The one or more thresholds 593 and one or more data sets 594 may be configured to cause the processor(s) to generate control signals (e.g., 585). For example, the one or more processors 590 may initiate and/or perform operations as described with reference to locking mechanism 546. In some implementations, controller 581 is configured to generate and send control signals 585. For example, controller 581 may generate and/or send control signals 585 responsive to receiving a signal and/or one or more user inputs via the one or more interfaces 582 and/or the one or more I/O devices 583.

Interfaces 582 may include a network interface and/or a device interface configured to be communicatively coupled to one or more other devices. For example, interfaces 582 may include a transmitter, a receiver, or a combination thereof (e.g., a transceiver), and may enable wired communication, wireless communication, or a combination thereof, such as with an electronic device 586. The one or more I/O devices 583 may include a touchscreen, a display device, a light emitting diode (LED), a speaker, a microphone, a camera, another I/O device, or any combination thereof, as illustrative, non-limiting examples. In some configurations, interfaces(s) 582 and/or I/O device(s) 583 may enable a wired connection to controller 581 and/or power source 584 via a port or other suitable configuration. Additionally, it is noted that in some implementations, interfaces(s) 582 and/or I/O device(s) 583 may include one or more of sensor(s) 588.

Power source 584 may be coupled to controller 581, interface(s) 582, I/O device(s) 583, housing 502 (e.g., 540 and 550), or combination thereof. In some embodiments, power source 584 may be disposed on housing 502 and coupled to components of control system 580 via circuitry. In some implementations, power source 584 may include a battery, capacitors, a charge storage device, etc. For example, power source 584 may comprise a solar powered, or other rechargeable, battery. In other implementations, container 500 is coupled to a power source 584, such as power grid, via a power cord. To illustrate, in an implementation where container 500 is coupled to a vehicle, power source 584 may include a battery of the vehicle.

In some implementations, actuation of locking mechanism 546 (e.g., via control system 580) may be performed in a wired manner (e.g., by pushing a button) or a wireless manner (e.g., actuating a computer application). In some implementations, locking mechanism 546 may be actuated via a switch 595. For example, switch 595 may be a hidden mechanical or electromechanical switch 595 positioned on housing 502. In an implementation where container 500 is coupled to a vehicle, switch 595 may be position in a cab of the vehicle or may be operated via a control panel (e.g., a touch screen) included in the cab. In other implementations, locking mechanism 546 may be actuated via electronic device 586. Electronic device 586 may be configured to communicate with components of housing 502 and may include a processor, a memory (e.g., a computer-readable storage device), a transceiver, or the like. For example, electronic device 586 may be a device that is configured to communicate (e.g., via control signals) solely with control system 580 of container 500. In other implementations, electronic device may be any suitable device (e.g., smart phone, tablet, computer, or other electrical communication system).

Electronic device 586 may be configured to operate container 500. In some implementations, electronic device 586 may include an application (e.g., 596 that is configured to allow electronic device 586 communicate (e.g., via control signals) with control system 580 of container 500. Application 596 may include a user interface configured to generate and send control signals responsive to receiving one or more user inputs via the application 596. In an illustrative, non-limiting example, electronic device 586 may be a smart phone and application 596 may be downloaded and operated with a toolbox specific ID to actuate locking mechanism 546 and/or latch 550. In some implementations, electronic device 586 may send one or more control signals 587 to controller 581 to initiate one or more operations at container 500.

Although container 500 has been described as including interface(s), I/O device(s) 583, controller(s), and power source 584, in other implementations, container may not include one or more of interface(s), I/O device(s) 583, controller(s), and power source 584. For example, in some implementations, container 500 may not include power source 584 (e.g., power supply). Additionally, or alternatively, container 500 may not include I/O device(s) 583.

In some implementations, instructions 592 (e.g., control logic) may be configured to, when executed by the one or more processors 590, cause the processor(s) 590 to perform one or more operations. For example, the one or more operations may include receiving a message (e.g., a control signal, a command, or an instruction) to perform an operation and identifying the requested operation. To illustrate, the operation may include a lock operation of locking mechanism 546, an unlocking operation of locking mechanism 546, a lock operation of latch 550, an unlock operation of latch 550, or a power supply level report, as illustrative, non-limiting examples. The one or more operations may also include initiating the operation based on the received message. To illustrate, initiating the operation may include generating and sending one or more control signals 585. For example, processor(s) 590 may send a control signal (e.g., 585) to locking mechanism 546 to cause locking mechanism 546 to perform an unlock operation. As another example, processor(s) 590 may determine a power level of power source 584 and may send a message to electronic device 586 indicating the power level.

In some implementations, the one or more operations may include determining whether to perform the operation. For example, the one or more operations may include receiving sensor data of one or more sensors 588 of control system 580. The one or more sensors 588 may be included in container 500 and may be configured to detect one or more conditions and to provide data indicating the one or more conditions to controller 581 (e.g., processor(s) 590). To illustrate, the one or more sensors 588 may be configured to determine the power level of power source 584, determine whether power source 584 is coupled to a vehicle battery, determine a state (e.g., locked or unlocked) of locking mechanism 546, determine a state (e.g., locked or unlocked) of latch 550, determine a configuration (e.g., open or closed) of lid 520, determine a state (e.g., stowed or deployed) of ladder 530, as illustrative, non-limiting examples. In another example, the one or more sensors 588 may comprise proximity sensor (e.g., RFID key) to selective operate locking mechanism 546. Controller 581 may determine whether to perform an operation based on the data indicating the one or more conditions. For example, if the ladder 530 is determined to be in the deployed positions, controller 581 will not initiate a lock operation for the locking mechanism 546. As another example, if lid 520 is not in a closed position, controller 581 will not initiate a lock operation for the locking mechanism 546.

In some implementations, the one or more operations include determining whether the one or more thresholds 593 are satisfied and initiating an operation based on the one or more thresholds 593 being satisfied. For example, controller 581 may include a clock or timer and controller 581 may determine whether an elapsed time period is greater than or equal to a threshold (e.g., 593). For example, controller 581 may determine whether an amount of time that lid 520 is in a closed state and locking mechanism 546 is in an unlocked state is greater than or equal to a threshold. If the amount of time is less than the threshold, then no operation is initiated. Alternatively, if the amount of time is greater than or equal to the threshold, controller 581 initiates a lock operation by locking mechanism 546.

In some implementations, the one or more operations include determining whether one or more operations are authorized. For example, data set(s) 594 may include or indicate users, time periods, and/or locations. To illustrate, controller 581 may be configured to perform operations based on a user being included in an authorized user group, a time (e.g., of a clock) being within an authorized time period, and/or based on a location of container 500 being within an authorized region. For example, an entity (e.g., a company) may authorize employees to access one or more containers and may prohibit non-employees from accessing containers—i.e., an employee can be removed from the authorized user group when the employee leaves the company. As another example, access to container 500 may be limited to particular time periods, such as during working hours, during daylight hours, during nighttime hours, or any other specified time period. Additionally, or alternatively, access to container 500 may be limited to one or more geographic areas, such as a job sit, an office, a home location, etc. It is noted that to determine a location of container 500, container 500 may include a GPS and/or may be coupled to a GPS of a vehicle and receive GPS data from the vehicle. In some implementations, access to container 500 may be available outside of a time period and/or a geographic region by one or more designated users. Such users may be authenticated by controller 581 using an authentication process, such as a password verification.

Figure 9A:
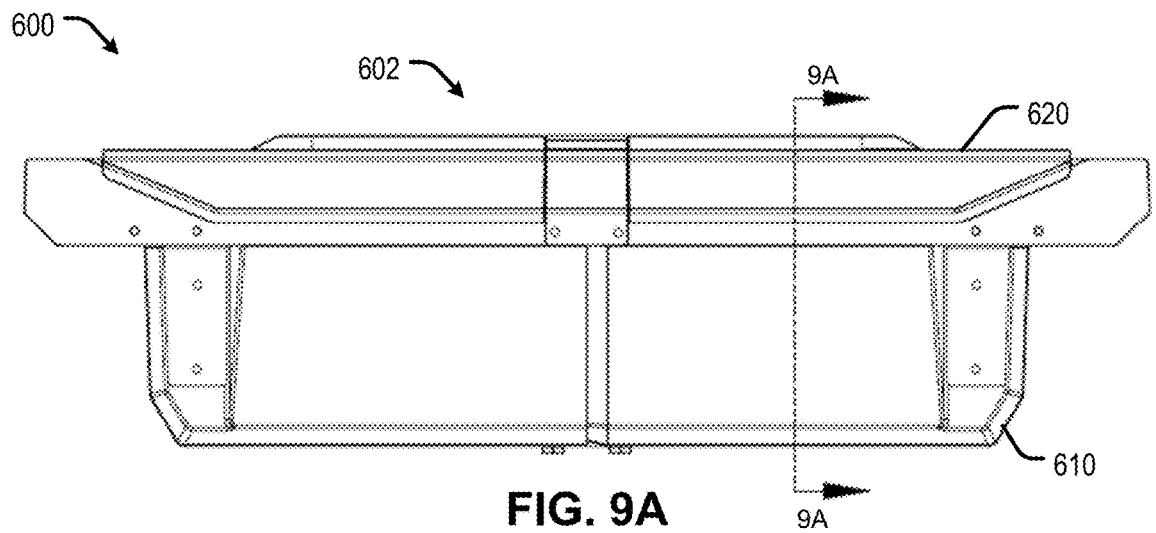
FIG. 9A is a view of an example of a container
Figure 9B:
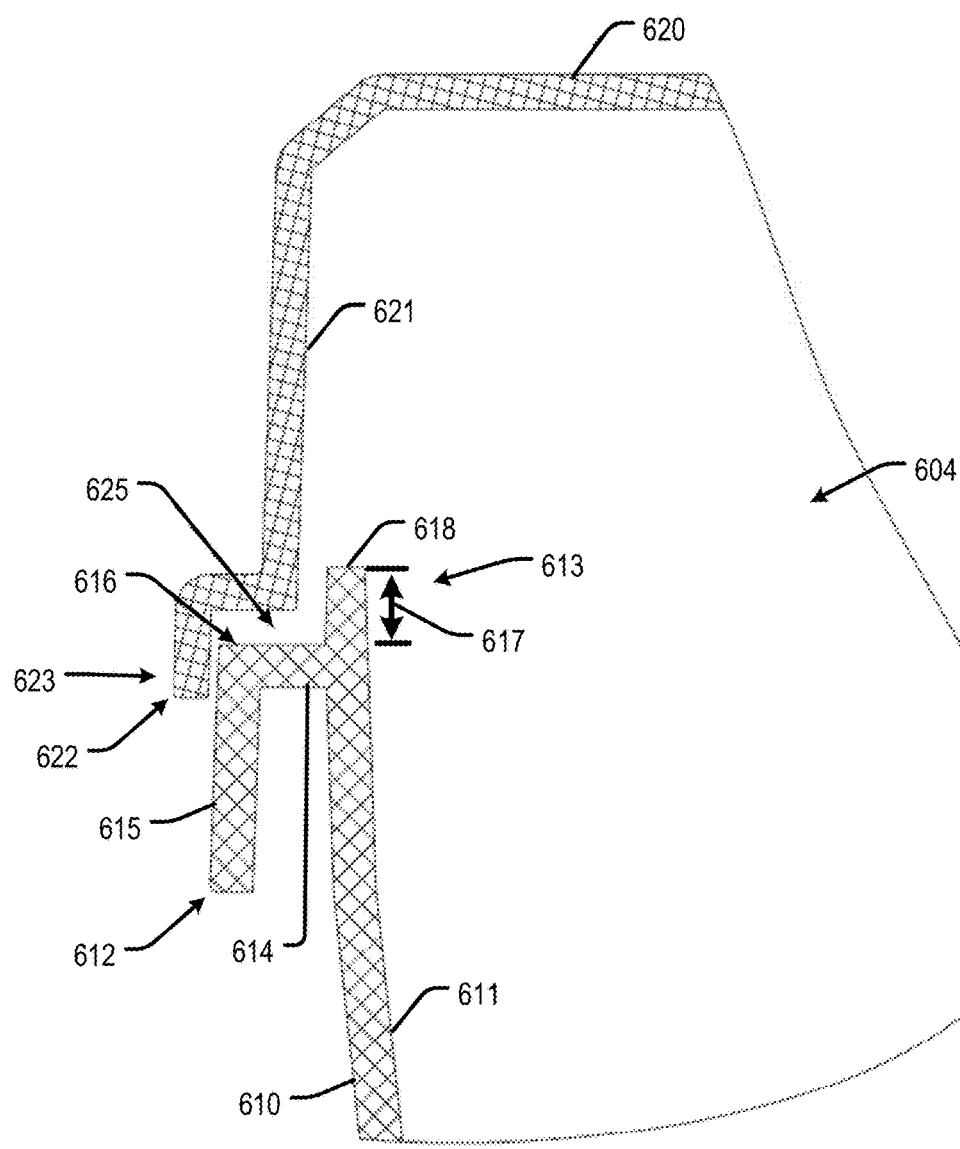
FIG. 9B is a cross-sectional view of the container of FIG. 9A taken along line 9A-9A of FIG. 9A FIGS. 10A-10B are a top and bottom perspective view of an example of a lid of a container.
Figure 11C:
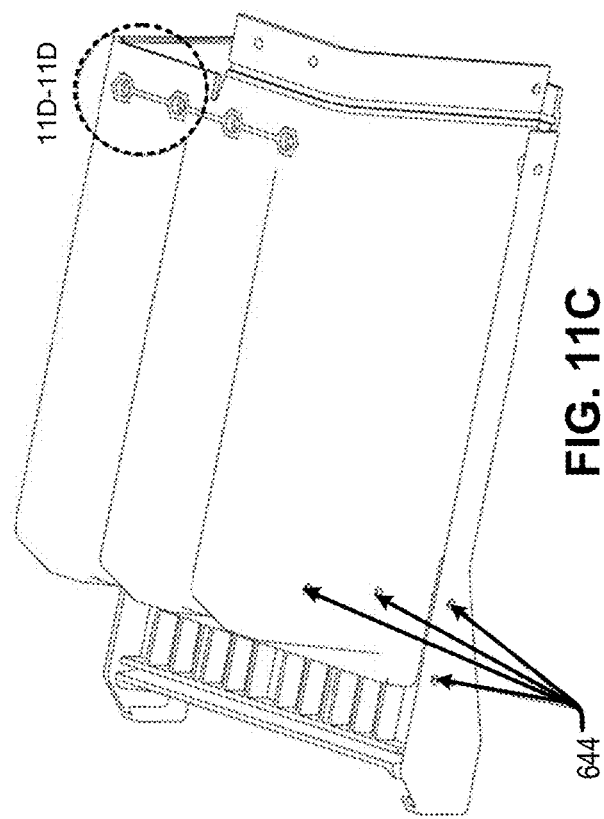
FIGS. 11A and 11C are a top and bottom perspective view of an example of a base of a container.
Figure 11D:
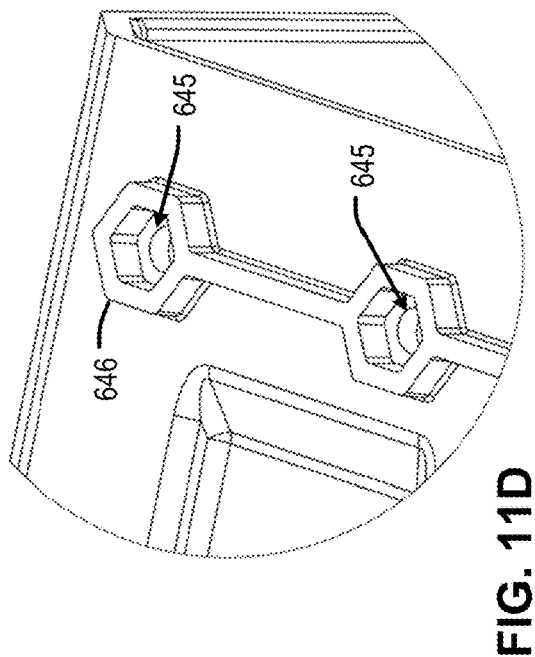
FIGS. 11B and 11D are enlarged views of a portion 11B-11B, 11D-11D of the base shown in FIG. 11A and FIG. 11C, respectively.
Figure 11A:
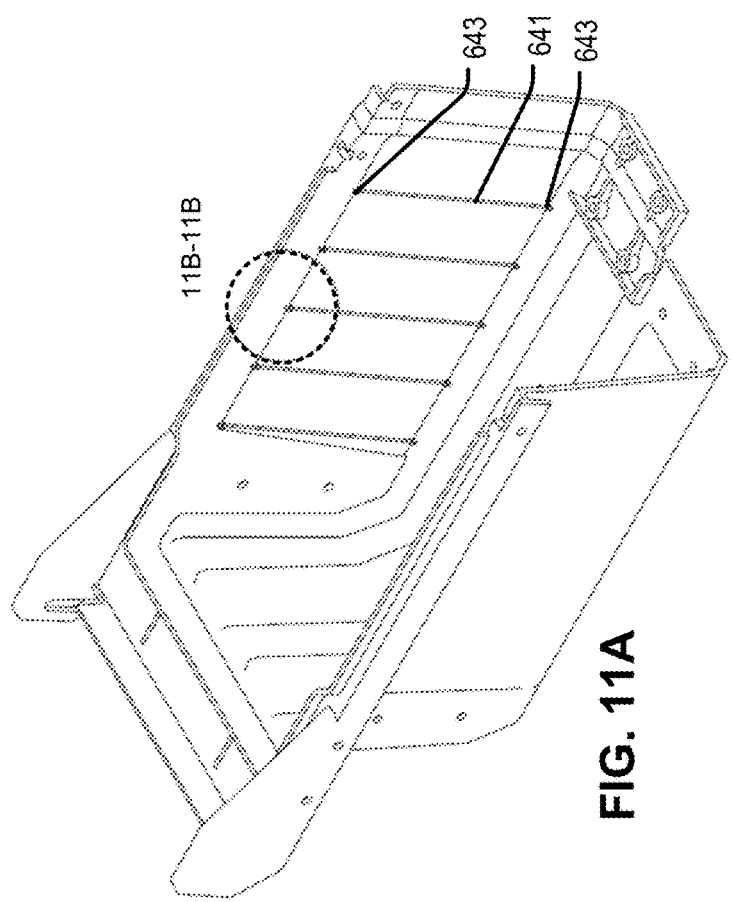
Figure 11B:
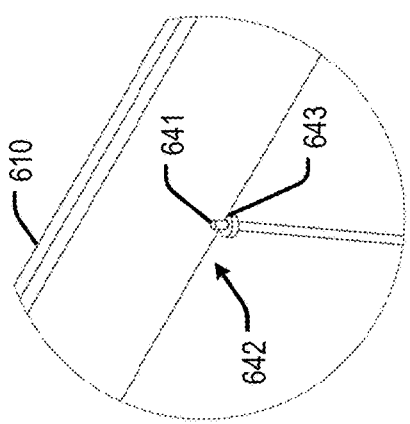

Referring now to FIGS. 9A-9B, 10A-10B, and 11A-11D, aspects of a container 600 are shown. Container 600 includes a housing 602 including a base 610 and one or more lids 620. For example, FIG. 9A shows a view of an example of container 600, FIG. 9B shows a cross-sectional view of container 600 taken along line 9A-9A, FIG. 10A shows a top perspective view of lid 620, FIG. 10B shows a bottom perspective view of lid 620, FIGS. 11A and 11C show top and bottom perspective views, respectively, of a portion of base 610, and FIGS. 11B and 11D show detail views of portions of FIGS. 11A and 11C, respectively.

Container may include or correspond to container 100, 200, 300, 400, 500, 1100, 1200, 1300. Container 600 includes housing 602, which may include or correspond to housing 102, 202, 302, 402, 502, 1102, 1302. Housing 602 includes a base 610 and a lid 620, which may include or correspond to base 110, 210, 310, 410, 510, 1110, 1310 and lid(s) 120, 220, 320, 420, 520, 1120, 1220, 1320, respectively. Container 600 may be configured to protect objects (e.g., tools, equipment, or the like) stored within container 600.

Referring to FIGS. 9A and 9B, FIG. 9A shows container 600 and a cross-section line 9A-9A. Referring to FIG. 9B, a portion of a cross-sectional view including an interface between lid 620 and base 610 is shown. In some implementations, lid 620 and base 610 are coupled together to form a sealing interface (e.g., FIG. 9B) that protects components in a cavity 604 (e.g., storage space) from theft and/or damage from animals or the environment (e.g., rain, hail, snow, ice, wind, dust, dirt, sunlight, or the like).

Base 610 may define a sidewall 611 (e.g., an interior sidewall). Sidewall 611 may include a lip portion 612 and an inner rib portion 613. Lip portion 612 may define an L-shaped member that extends away from inner rib portion 613. For example, lip portion may define a horizontal portion 614 that extends laterally away from inner rib portion 613 and a vertical portion 615 that extends vertically from horizontal portion. In a non-limiting example, horizontal portion 614 is substantially perpendicular to inner rib portion 613. In another non-limiting example, vertical portion 615 is substantially parallel to inner rib portion 613 and spaced apart from inner rib portion 613 by horizontal portion 614. In some implementations, inner rib portion 613 extends vertically from an upper plane 616 of horizontal portion 614. For example, inner rib portion 613 may have a length 617 that is a distance from upper plane 616 to a top surface 618 of inner rib portion 613. Length 617 is greater than or equal to any one of, or between any two of: 0.10, 0.20, 0.30, 0.40, 0.50, 0.60, 0.70, 0.80, 0.90, 1.0 in. (e.g., between 0.25 inches and 0.75 in., such as approximately 0.5 in.).

Lid 620 may comprise a sidewall 621 (e.g., an interior sidewall). Sidewall 621 may comprise a drip edge 622 at a distal end 623 of sidewall 621. In some implementations, drip edge 622 is configured to contact a portion of base 610 (e.g., lip portion 612) when lid 620 and base 610 are in a closed configuration. Drip edge 622 may be shaped similarly to lip portion 612 so that drip edge 622 and lip portion may form a fitted interface. For example, drip edge 622 may define an L-shaped portion of sidewall 621. In some implementations, lip portion 612 is configured to contact a portion of lid 620 when lid 620 and base 610 are in a first configuration (e.g., a closed configuration).

In some implementations, a sealing cavity 625 may be formed between lid 620 and base 610 when lid 620 is coupled to base 610. For example, vertical portion 615, inner rib portion, and drip edge 622 may define sealing cavity 625. In some implementations, sealing cavity 625 is configured to accommodate a bulb seal or similar sealing component (e.g., gasket). For example, lip portion 612 may include a seal, such as a rubber seal, that is positioned between lid 620 and base 610 when lid 620 and base 610 are in the first configuration. Accordingly, cavity 604 may be sealed from the outside environment to protect components stored within the container 600 from environmental conditions.

Referring to FIGS. 10A and 10B, a channel 649 may be coupled to lid 620. For example, channel 649 may be disposed along at least a portion of a periphery 659 of lid 620. In some implementations, channel 649 may be disposed on opposing sides of bottom surface 631 of lid 620. Channel 649 may be coupled to drip edge 622 to improve the sealing interface and to further deter theft attempts. In some implementations, channel 649 may comprise a metal c-channel. In this way, channel 649 may improve the strength of portions of lid 620 to increase the resistance to break-ins (e.g., from tools including saws, knife, levers or other burglary tools). In other implementations, channel 649 may comprise any other suitable material (e.g., polymer, metal, composite material, or the like) that may prevent access to cavity 604. Additionally, lid 620 may include an opening 652 (e.g., a through hole) configured to receive a portion of locking mechanism 546. Opening 652 may include or correspond to through hole 243, 525. Accordingly, channel 649 and/or opening 652 may contribute securely maintaining container 600 in a closed configuration and may provide anti-theft features for container 600.

Referring to FIGS. 11A-11D, base 610 may comprise one or more theft deterrent features, such as, stringers 641 and thru-holes 644,645. Referring to FIGS. 11A and 11C, in some implementations, a plurality of stringers 641 are coupled to base 610. In some implementations, stringers 641 may be positioned on an inner wall 642 of base 610. In some implementations, stringers 641 extend vertically, while in other implementations stringers 641 extend horizontally. In yet other implementations, stringers 641 may extend in any direction between vertical and horizontal. Stringers 641 may be coupled to base 610 via stinger channels 643. In some implementations, stringers 641 extend between stringer channels 643 coupled to inner wall 642. Stringers 641 may fit loosely within stringer channels 643 that are coupled to base 610. Stringers 641 may impede attempts to access cavity 604 with a power tool (e.g. hacksaw, reciprocating saw, or drill). For example, stringers 641 may be spaced and positioned such that the plurality of stringers facilitate resonance and binding with reciprocating saw blades. In some implementations, stringers 641 may comprise any suitable material for impeding access to cavity 604. For example, stringers may include a metal, such as titanium, hardened steel, or other metal alloy.

Referring to FIGS. 11B and 11D, base 610 may define one or more thru-holes for construction/installation of container 600. In some implementations, thru-holes (e.g., 644 and 645) are designed to accept fasteners (e.g., bolts) such that corresponding features of the fastener may reside within cavity 604. For example, thru-holes 644 and 645 accept bolts whose corresponding hex nuts reside within the cavity 604 such that rotating the heads of these bolts will not result in removal unless one is able to access the cavity 604 where the hex nuts reside. In some implementations, a rim 646 may surround each thru-hole (e.g., 644 and 645). Rim 646 may correspond to a head of a fastener (e.g., bolt) so that rotation of fastener is not possible when the fastener is fully inserted into the thru-hole (e.g., 644 and 645). Additionally, or alternatively, rim 646 may aid with assembly of container 600. To illustrate, rim 646 may enable an assembler to fasten the modular components (e.g., bins) of base 610 without having to access both sides of the fastener. For example the assembler may turn the nut from the inside without having to manage, or prevent, rotation of the bolt itself. In this way, storage container 600 may decrease assembly time.

Figure 12:
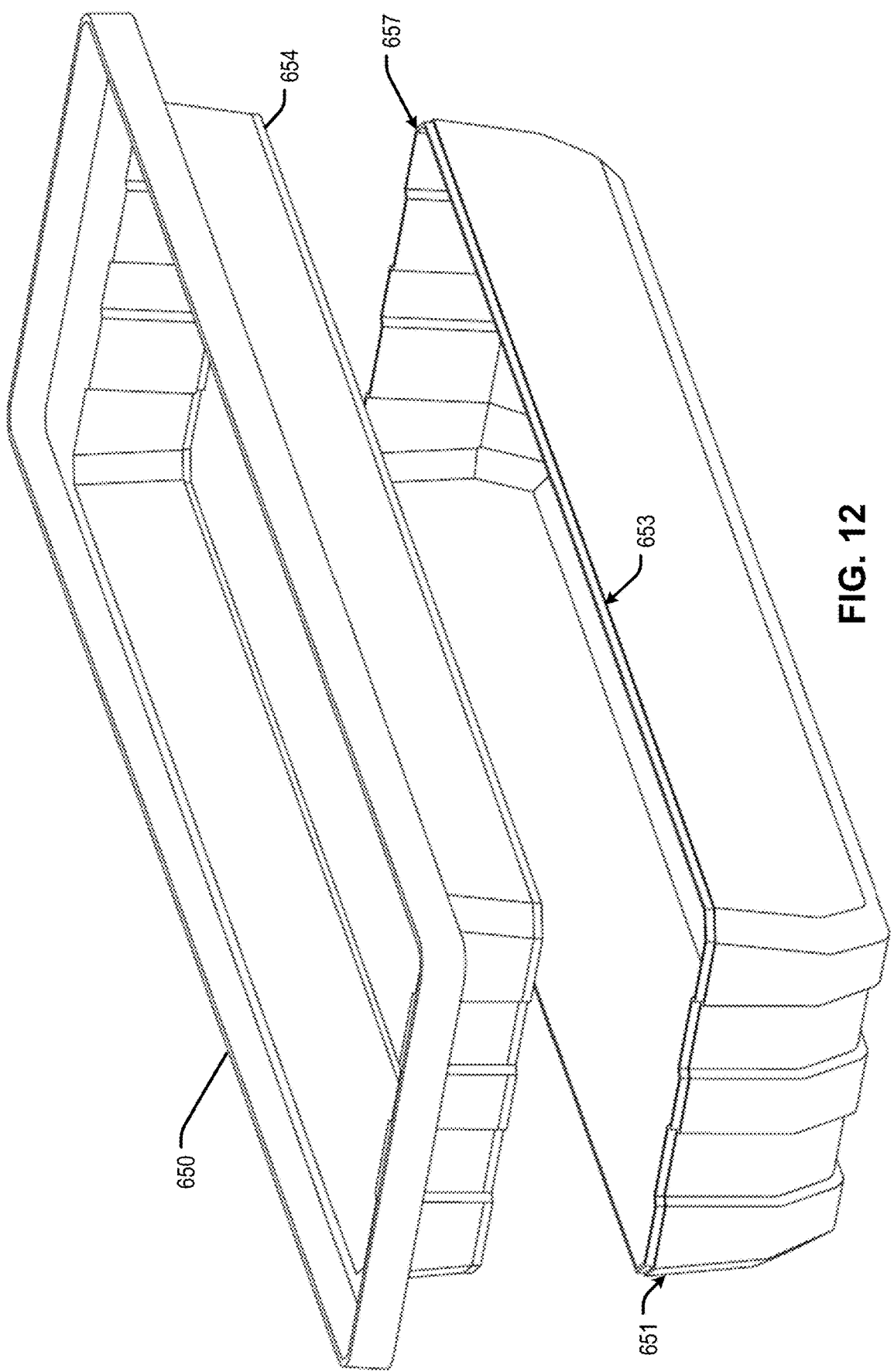
FIG. 12 is a perspective view of an example of a base of a container.

Referring to FIG. 12, an example of aspects of container 600 are shown. Container 600 may include a base 610 that is configured to allow attachment of additional components to the base to increase its dimension in the vertical direction to add storage depth.

Base 610 may include an upper bin component 650 and a lower bin component 651. For example, base 610 may be split in design and manufacture to allow interchange of alternative lower bin components 651 with an upper bin component 650. In some implementations, lower bin component 651 may correspond to base 210, while in other implementations, lower bin component 651 and upper bin component 650 may be coupled together to define base 210.

Lower bin component 651 may be offered in an array of depths to accommodate various truck bed geometries. In some implementations, lower bin component 651 may define a sealing lip 657. For example, a top surface 653 of lower bin component 651 may define sealing lip 657 along a periphery of lower bin component 651. In some implementations, sealing lip 657 may be configured to couple lower bin component 651 to upper bin component 650. In some implementations, sealing lip 657 has been optimized to facilitate robust attachment and prevent water or dust intrusion. For example, sealing lip 657 may be shaped to fit with a bottom surface 654 of upper bin component 650. Although each of upper bin component 650 and lower bin component 651 are shown as single structures, in other implementations, one or both of upper bin component 650 and lower bin component 651 may include multiple portions, such as two or more modular portions. Additionally, it is noted that upper bin component 650 and lower bin components 651 described with reference to FIG. 12 may be incorporated into one or more of containers 100, 200, 300, 400, 500, 1300.

Figure 13A:
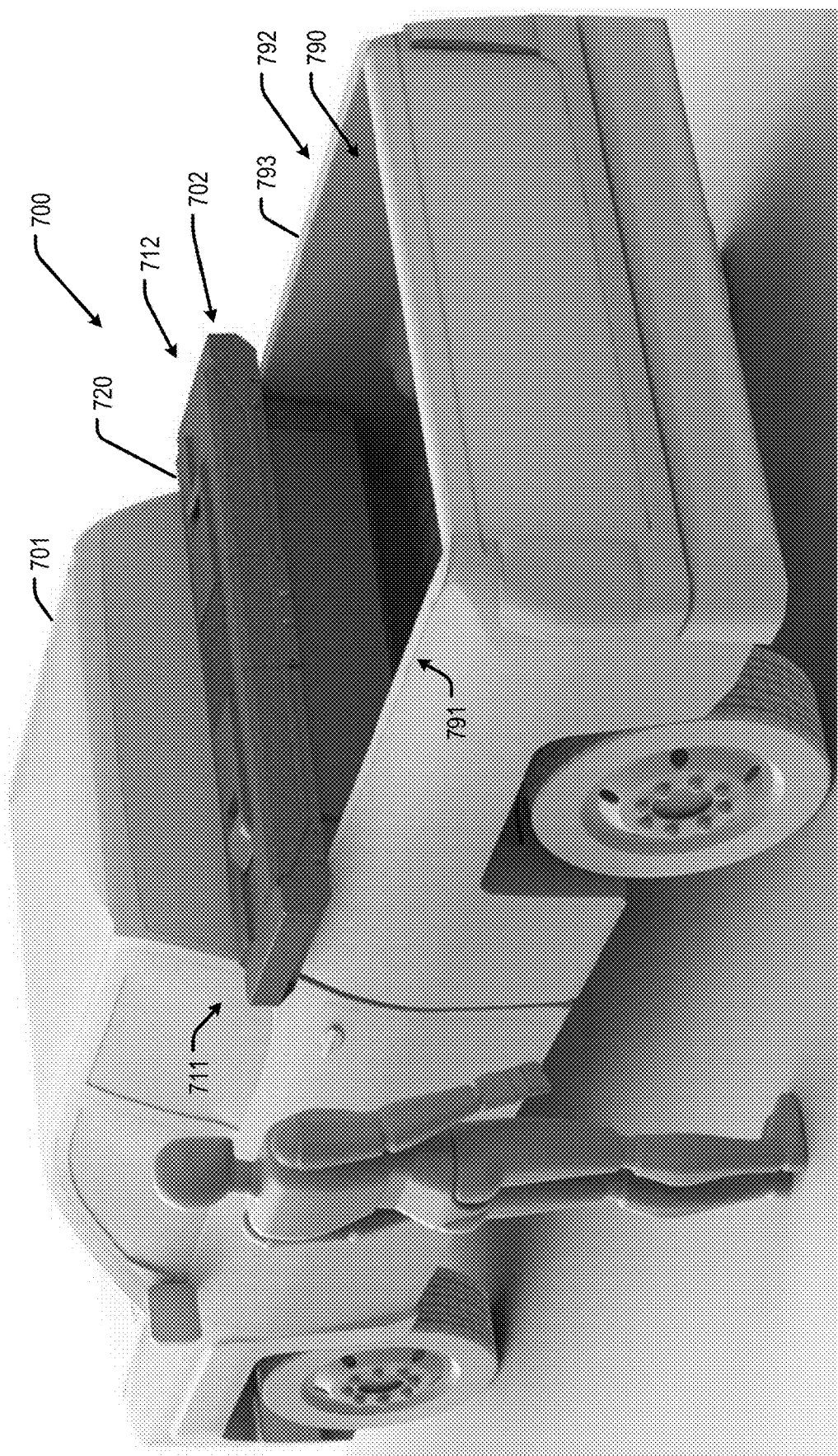
FIGS. 13A-13C are perspective views of an example of a container in use with a vehicle.
Figure 13B:
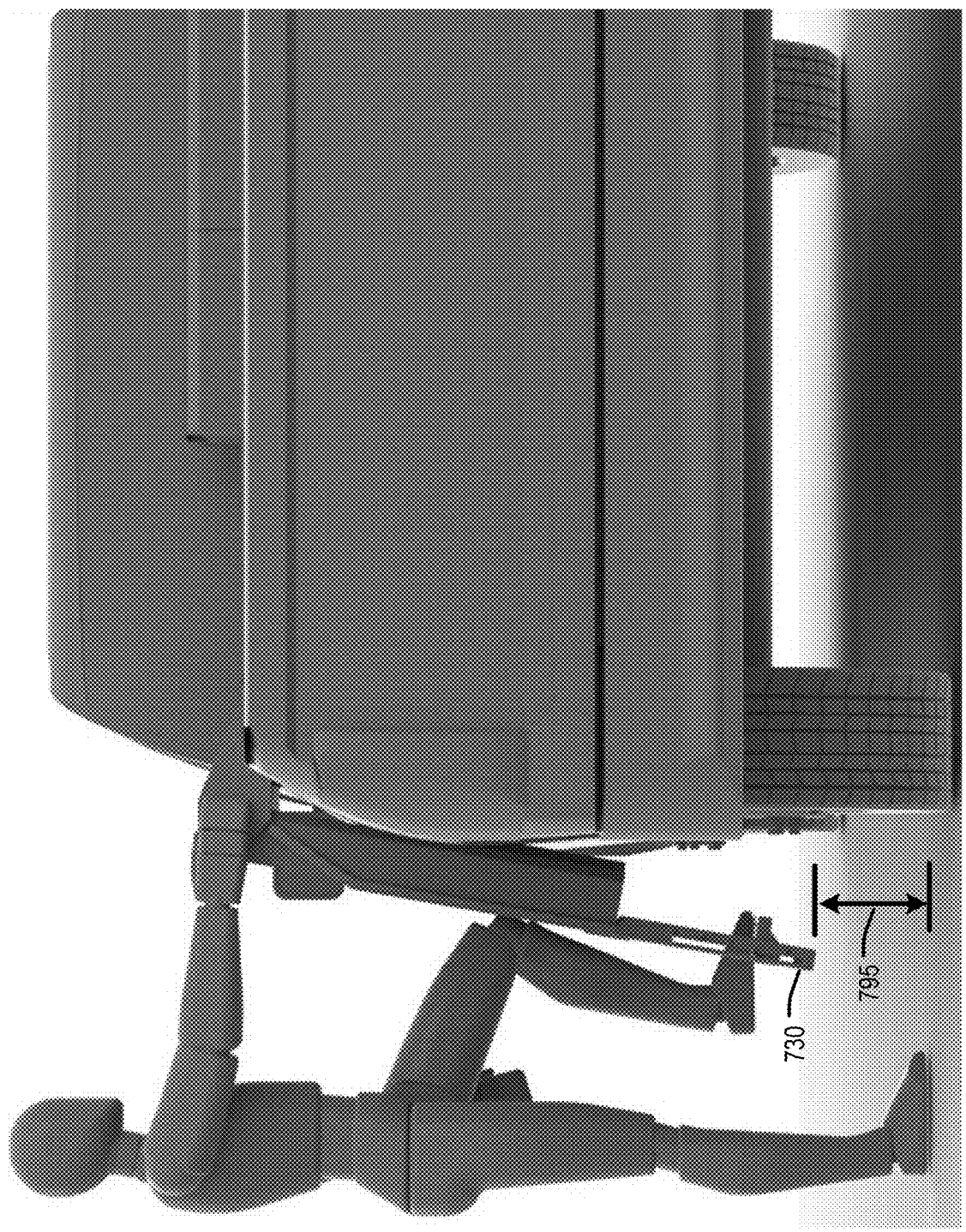
Figure 13C:
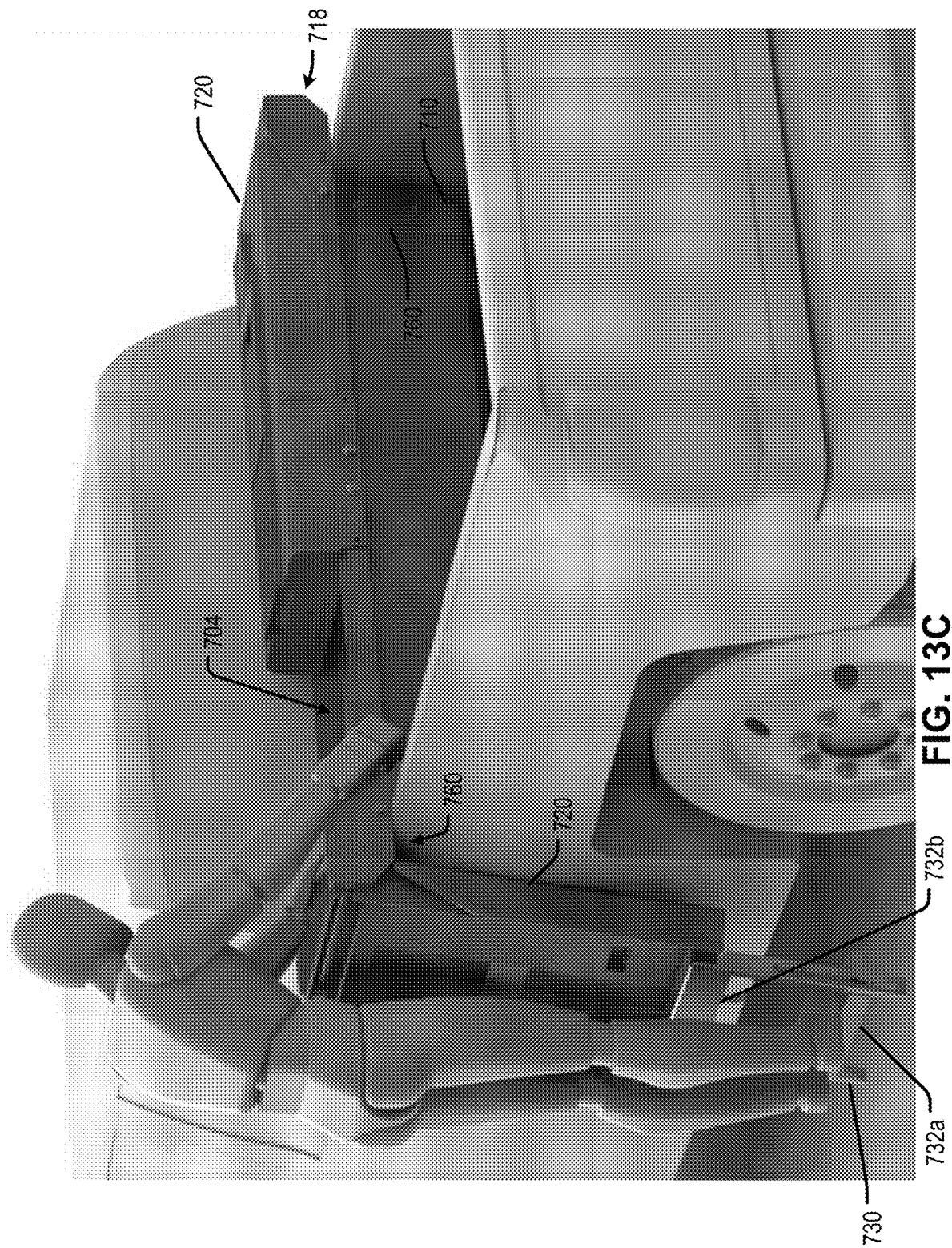

Referring to FIGS. 13A-13C, aspects of an example of a container 700 coupled with a vehicle (e.g., 701) are shown. Container 700 includes or corresponds to container 100, 200, 300, 400, 500, 600, 1100, 1200, and/or 1300. Container 700 includes a housing 702 having a base 710 and one or more lid(s) 720, and a ladder 730. Container 700 may be configured to secure a cavity 704 of housing 702 where tools or other equipment may be stored.

Referring to FIG. 13A, container 700 is coupled to a vehicle, such as a truck 701. For example, vehicle may be a pickup (e.g., class 1-3) truck. In some implementations, housing may be disposed within a bed 790 of the pickup truck 701. Housing 702 may be positioned within bed 790 such that housing 702 extend across a width (between left to right) the bed 790. For example, housing 702 is configured to be disposed within truck bed 790 such that a first end 711 of base 710 and a second end 712 of base 710 are positioned on a left rail 791 (e.g., left side) and a right rail 792 (e.g., right side) respectively, of truck bed 790. In some implementations, base 710 is disposed within bed 790 while at least a portion of lid(s) 720 are disposed outside of bed 790. At least a portion of lid(s) 720 may disposed outside of bed 790 in a vertical manner (i.e., above a top surface 793 of left or right rail) or horizontal manner (i.e., laterally outside of bed 790). For example, lid(s) 720 may be disposed vertically and horizontally outside bed 790 while housing 702 is positioned within bed 790. In this manner, lid(s) 720 may operate between the open and closed position without contacting or damaging an exterior of the truck 701.

In some implementations, base 710 (e.g., a support portion 718) or a bracket 760 may be in contact with a top surface 793 of left and right rails 791, 792. Each rail 791, 792 may support at least a portion of housing 702 while container is disposed within bed 790. In some implementations, base 710 may be supported by a floor (e.g. bottom surface that defines bed 790). In other implementations, lid(s) 720 may support housing 702 while base 710 is suspended (i.e., floating) within bed 790. Housing 702 (e.g., lid 720) may be moveable while supported by rails 791, 792 and positioned within bed 790. For example, lid 720 may be moved from the closed configuration, as shown in FIG. 13A, to the deployed configuration, as shown in FIG. 13B.

In some implementations, while lid 720 is in the open position and base 710 is disposed in truck bed 790, such as shown in FIG. 13B, the lid 720 may not contact a side of the truck bed. To illustrate, lid 720 may not be in contact with an exterior (e.g., side panel) of the vehicle (e.g., 701). As described above at least with reference to FIGS. 3B-3C, lid 720 may be prevented from rotating past a predetermined angle (e.g., 260°) relative to base 710. In this manner, while lid 720 is in the open position, lid 720 may be positioned away from the side panel of the truck 701. Additionally, or alternatively, a cushion may be disposed on housing 702 (e.g., lid 720) to prevent container 700 from damaging (e.g., scratching) truck 701 when contacting truck 701. For example, cushioning or padding may be disposed on base 210 where the base 210 is in contact with bed 790. In another example, cushioning or padding may be disposed on portions (e.g., a top surface) of lid(s) 720 for implementations where lid(s) 720 contact truck 701. In some implementations, cushioning or padding may compose a polymer (e.g., rubber) strip or pad configured to contact the paint of vehicle (e.g., 701) without damage.

As shown in FIGS. 13B and 13C, ladder 730 may be utilized by a user to access cavity 704 of housing 702. Ladder 730 may include one or more steps, such as a first step 732a and a second step 732b. In some implementations, while container 700 is in the deployed configuration, a portion of ladder 730 is positioned lower (e.g., closer to the ground) than bed 790. For example, a step (e.g., 732a) of ladder may be closer to ground level than bed 790. In this way, a user may access components stored in container in a more ergonomic manner than a conventional toolbox. In some implementations, ladder 730 may be suspended above the ground level by a distance 795 (e.g., FIG. 13B), while in other implementations, ladder 730 may extend to ground level (i.e., contact the ground).

Figure 14:
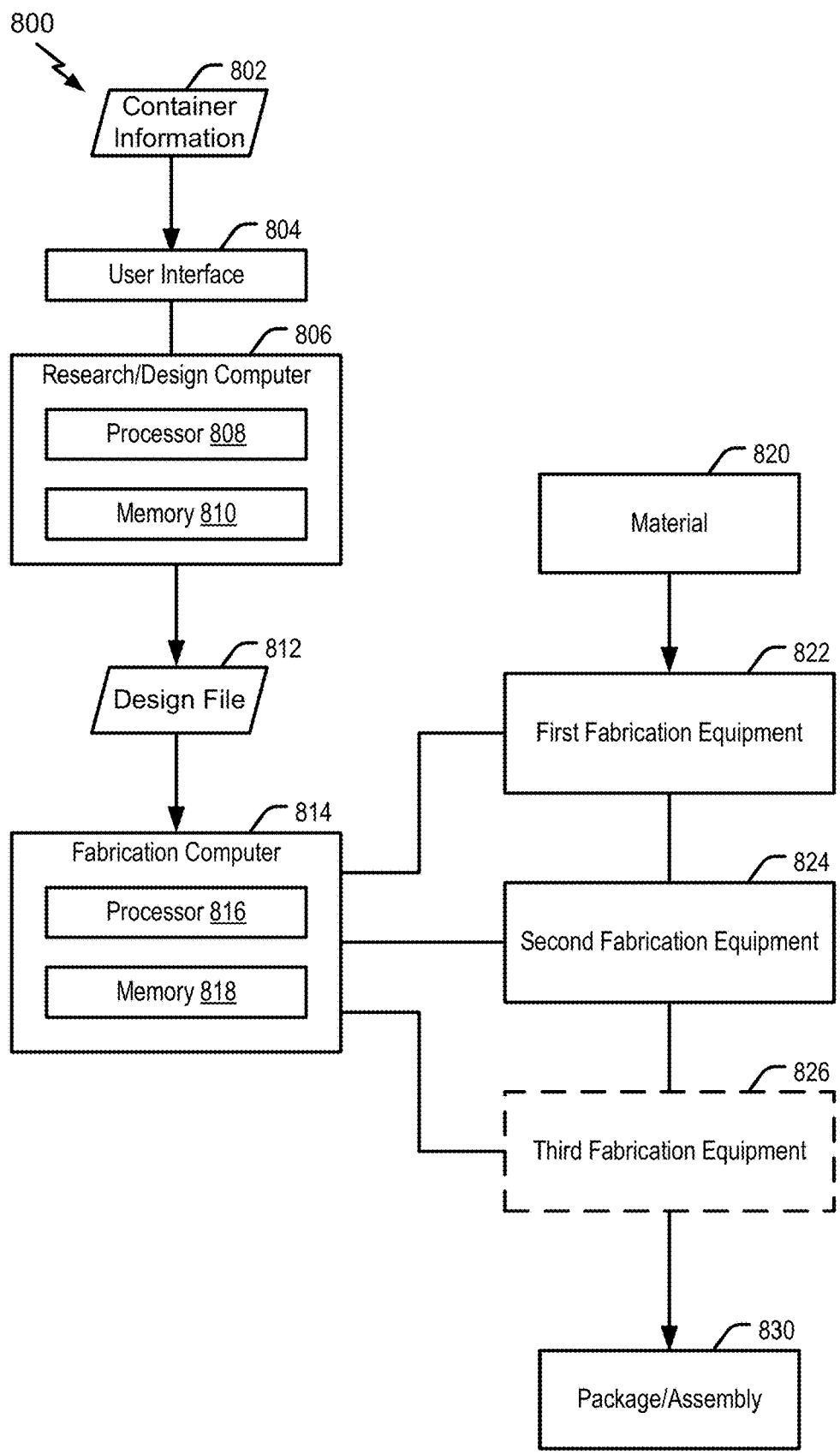
FIG. 14 is an example of a kit of a container for use with a vehicle.

The foregoing disclosed containers (e.g., 100, 200, 300, 400, 500, 600, 700, 1100, 1200, 1300) may be designed and configured into computer files stored on a computer readable media. Some or all of such files may be provided to fabrication handlers who fabricate the storage containers based on such files. The storage containers are then packaged and shipped to users for assembly, as described above. In some implementations, the containers may be shipped in an assembled or partially assembled state. FIG. 14 depicts an example of a system 800 for fabricating storage containers.

Container information 802 is received at a research/design computer 806. Container information 802 may include design information representing at least one physical property of a storage container, such as 100, 200, 300, 400, 500, 600, 700, 1100, 1200, 1300. For example, container information 802 may comprise dimensions of bins (e.g., a length, width, height), dimensions of lids, dimensions of ladder, via a user interface 804 coupled to research/design computer 806. Research/design computer 806 includes a processor 808, such as one or more processing cores, coupled to a computer readable medium such as a memory 810. Memory 810 may store computer readable instructions that are executable to cause processor 808 to transform container information 802 into a design file 812. Design file 812 may include information indicating a design for a storage container, such as the dimensions corresponding to a specific vehicle size (e.g., truck bed). Design file 812 may be in a format that is usable by other systems to perform fabrication, as further described herein.

Design file 812 is provided to a fabrication computer 814 to control fabrication equipment during a fabrication process for a material 820 (e.g., a portion of a base). Fabrication computer 814 includes a processor 816 (e.g., one or more processors), such as one or more processing cores, and a memory 818. Memory 818 may include executable instructions such as computer-readable instructions or processor-readable instructions that are executable by a computer, such as processor 816. The executable instructions may enable processor 816 to control fabrication equipment, such as by sending one or more control signals or data, during a fabrication process for material 820. In some implementations, the fabrication system (e.g., an automated system that performs the fabrication process) may have a distributed architecture. For example, a high-level system (e.g., processor 816) may issue instructions to be executed by controllers of one or more lower-level systems (e.g., individual pieces of fabrication equipment). The lower-level systems may receive the instructions, may issue sub-commands to subordinate modules or process tools, and may communicate status back to the high-level system. Thus, multiple processors (e.g., processor 816 and one or more controllers) may be distributed in the fabrication system.

The fabrication equipment includes first fabrication equipment 822, second fabrication equipment 824, and optional third fabrication equipment 826. First fabrication equipment 822 is configured to form a base of the container, such as base 110, 210, 310, 410, 510, 610, 710, 1110, 1310. Base may comprise one or more bins. In some implementations, each bin is identical and may be coupled together to form the base. In a particular implementation, first fabrication equipment 822 includes first injection molding equipment. Second fabrication equipment 824 is configured to form a lid of the container, such as lid 120, 220, 320, 420, 520, 620, 720, 1120, 1220, 1320. In some implementations, the lid may comprise dimensions similar to, or corresponding with the bins of the base. In a particular implementation, second fabrication equipment 824 includes second injection molding equipment. Third fabrication equipment 826 is configured to form a ladder. The ladder may include or correspond to ladder 130, 230, 330, 430, 530, 730, 1130, 1330 and may have one or more components, such as an upper frame and a lower frame, an outer frame and an inner frame, one or more steps, a bar, a spring, or other components as described above. Third fabrication equipment 826 includes one or more metal working machines and/or one or tools to form, construct, or assemble the ladder. After second or third fabrication equipment 824, one or more components may be assembled and/or packaged at 830. For example, the one or more components may be packaged into a kit, as described with reference to FIG. 15.

Fabrication computer 814 may be configured to initiate one or more operations of first fabrication equipment 822, second fabrication equipment 824, and/or third fabrication equipment 826. For example, processor 816 may execute instructions stored at memory 818 to perform operations including forming a base (e.g., one or more bins), a lid, or a ladder. System 800 enables fabrication of a container, with universal/modular components that are compatible with one or more vehicles which is less complex and has less cost than fabrication of a conventional container.

Figure 15:
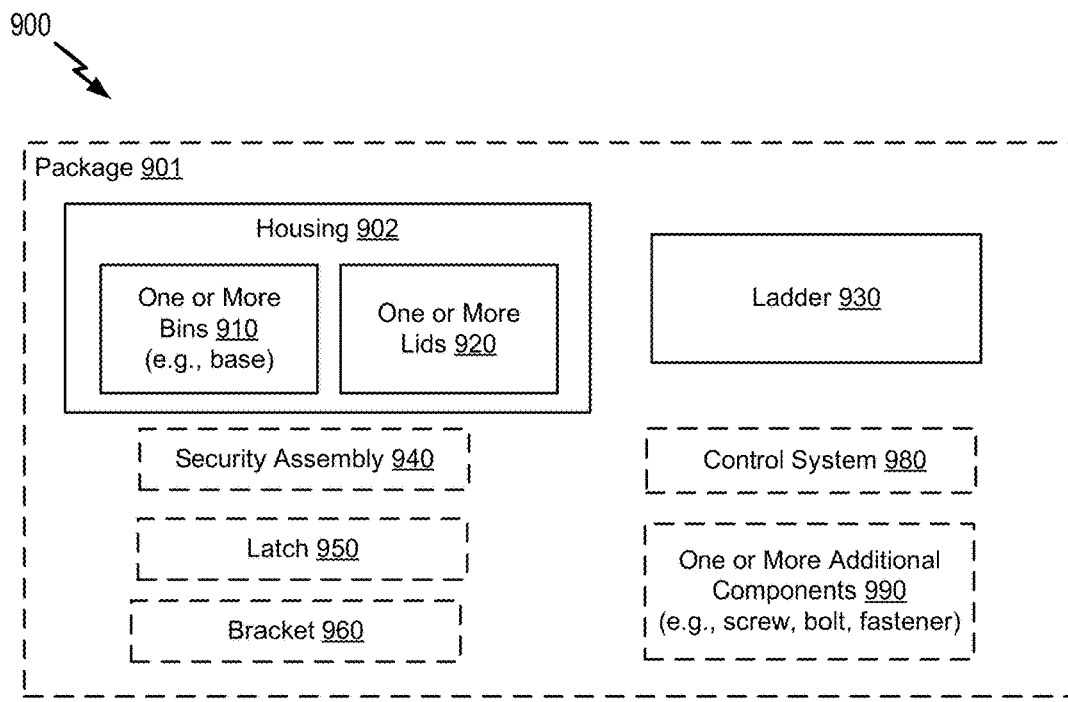
FIG. 15 is a block diagram of an example of a system for fabricating a container.

Referring to FIG. 15, an example of a kit 900 for a container for use with a vehicle is shown. The container may include or correspond to the container 100, the container 200, the container 300, the container 400, or any other container previously discussed (e.g., 500, 600, 700, 1100, 1200, 1300).

Kit 900 includes a housing 902 and a ladder 930. The housing 902 may include or correspond to housing 102, 202, 302, 402, 502, 602, 702, 1102 (including lid 1120 and/or lid 1220), 1302, or any other housing described herein. Ladder 930 may correspond to ladder 130, 230, 330, 430, 530, 730, 1130, 1330, or any other ladder described herein.

In some implementations, kit 900 may include security assembly 940, a latch 950, a bracket 960, a control system 980, and one or more additional components 990 of combination thereof. Security assembly 940 may include or correspond to security assembly 240, 340, 440, 540, 1140, or any other security assembly described herein. Latch 950 may include or correspond to latch 250, 350, 450, 550, bracket 1382, or any other latch described herein. Bracket 960 may include or correspond to bracket 260, 360, 560, 760, 1360, or any other bracket described herein. Control system 980 may include or correspond to control system 580, or any other bracket described herein. The one or more additional components 990 may include or correspond to one or more screws/bolts, written instructions, and/or other components.

In some implementations, kit 900 may include a package 901. For example, package 901 may include a box, a bag, a container, or the like. Package 901 may include the one or more bins (e.g., 910), lids 920, and ladder 930. Additionally, or alternatively, package 901 may include a packaging medium (e.g., packaging material), such as foam, paper, or the like.

Figure 16:
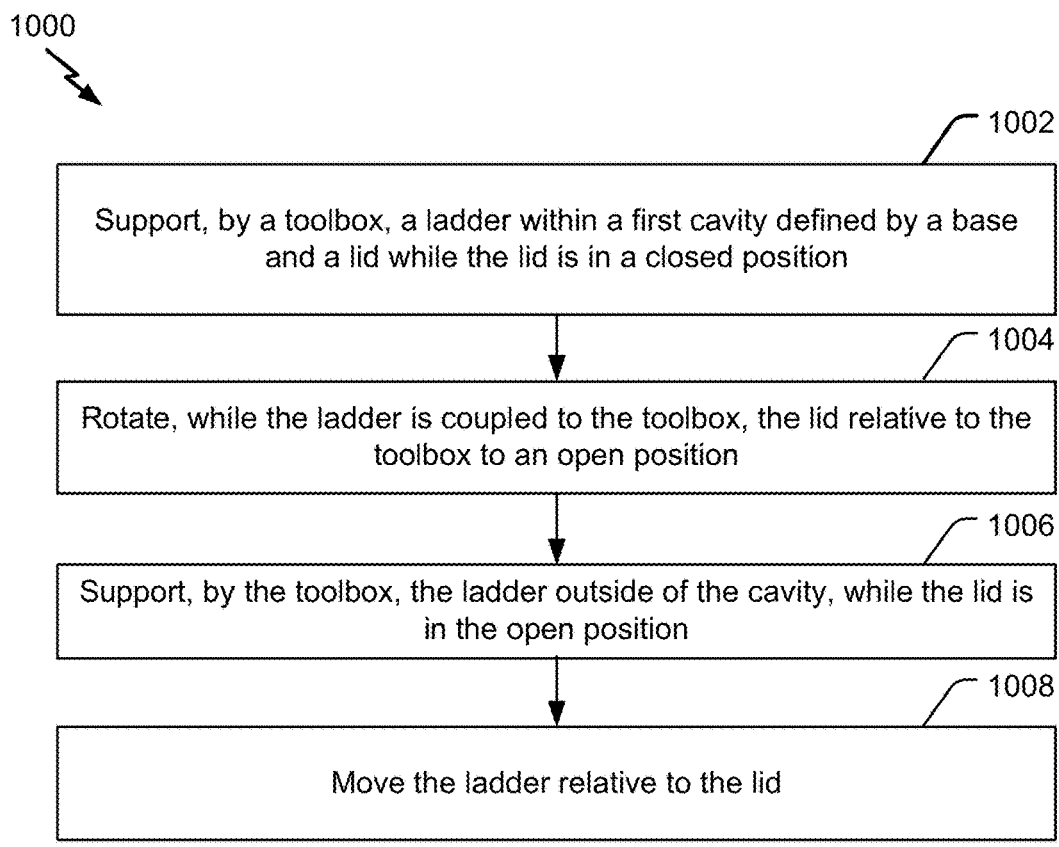
FIG. 16 illustrates a flow diagram of an example of a method of operating a container.

Referring to FIG. 16, a method 1000 of operating a container, such as a toolbox, is shown. Method 1000 may be performed at, by, or with container 100, 200, 300, 400, 500, 600, 700, 1100, 1200, 1300 (e.g., one or more components thereof).

Method 1000 includes supporting, by a housing, a ladder within a first cavity defined by a base and a lid while the lid is in a closed position, at 1002. Housing may include or correspond to housing 102, 202, 402, 502, 602, 702, 1102, 1302. For example, base and lid may include or correspond to base 110, 210, 410, 510, 610, 710, 1110, 1310 and lid 120, 220, 420, 520, 620, 720, 1120, 1220, 1320, respectively. Ladder may include or correspond to ladder 130, 230, 330, 430, 530, 730, 1130, 1330.

Method 1000 further includes rotating, while the ladder is coupled to the housing, the lid relative to the housing to an open position, at 1004. To illustrate lid 220 may rotate about first end 211 of base 210. As another example, lid 620 and 720 may rotate about base 610 and 710, respectively. Method 1000 may further include supporting, by the toolbox, the ladder outside of the cavity, while the lid is in the open position, at 1006, and moving the ladder relative to the lid, at 1008. In some implementations, method 1000 may include sliding and/or rotating the ladder relative to the housing to achieve the open position.

In some implementations, method 1000 includes rotating the lid about a pivot point of the base at least 180°, from the closed position to the open position. Additionally, or alternatively, method 1000 may include, while the lid is in the open position, extending a portion of the ladder from a stowed position in which the portion ladder is positioned within a second cavity defined by the lid, to a deployed position in which the portion of the ladder is positioned outside the second cavity. For example, extending a portion of the ladder may include extending a portion of the ladder comprising at least one step. As another example, extending the ladder may include rotating the ladder about a first end of the lid and/or sliding the ladder from the second cavity defined by the lid.

It is noted that in some implementations, method 1000 may include one or more operations as described with reference to control system 580. It is further noted that one or more operations, one or more operations described above with reference to FIGS. 1A-1B, 2A-2F, 3A-3C, 4A-4D, 5A-5D, 6A-6D, 7A-7B, 8A-8E, 9A-9B, 10A-10B, 11A-11D, 12, 13A-13C, 17A-17C, 18A-18C, and 19A-19F.

The above specification and examples provide a complete description of the structure and use of illustrative configurations. Although certain configurations have been described above with a certain degree of particularity, or with reference to one or more individual configurations, those skilled in the art could make numerous alterations to the disclosed configurations without departing from the scope of this invention. As such, the various illustrative configurations of the methods and systems are not intended to be limited to the particular forms disclosed. Rather, they include all modifications and alternatives falling within the scope of the claims, and configurations other than the one shown may include some or all of the features of the depicted configurations. For example, elements may be omitted or combined as a unitary structure, connections may be substituted, or both. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one configuration or may relate to several configurations. Accordingly, no single implementation described herein should be construed as limiting and implementations of the disclosure may be suitably combined without departing from the teachings of the disclosure.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims. The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A toolbox assembly for use with a vehicle, the toolbox assembly comprising:
    a housing that defines a cavity; and
    a ladder coupled to the housing, the ladder movable relative to the housing while the ladder is coupled to the housing;
    wherein the ladder is movable relative to the housing between:
        a first position in which the ladder is disposed within the cavity; and
        a second position in which the ladder is disposed outside the cavity.

2. The toolbox assembly of claim 1, wherein the housing comprises:
    a base comprising a first end and a second end opposite the first end; and
    a lid coupled to the base, the lid is moveable between:
        a closed position in which the lid covers an opening defined by the base; and
        an open position in which at least a portion of the opening is exposed.

3. The toolbox assembly of claim 1, wherein:
    the ladder comprises a telescoping ladder having one or more ladder sections, at least one ladder section comprising a step.

4. The toolbox assembly of claim 2, further comprising:
    a bracket coupled to the base; and
    wherein the ladder is coupled to the bracket at a pivot point and is configured to rotate about the pivot point.

5. The toolbox assembly of claim 2, further comprising:
    a handle coupled to the lid; and
    wherein the handle comprises a button coupled to a locking assembly configured to secure the lid in a closed position with respect to the base.

6. The toolbox assembly of claim 2, wherein
    the ladder is coupled to the base; and
    the ladder comprises one or more steps.

7. The toolbox assembly of claim 2, wherein:
    at least a portion of the housing is configured to be disposed within a truck bed such that the first end of the base and the second end of the base are positioned on a left side and a right side, respectively, of the truck bed.

8. The toolbox assembly of claim 2, wherein:
    the ladder is configured to be in a stowed position in which a portion of the ladder is positioned within a cavity defined by the base; and the ladder is configured to be moveable from the stowed position to a deployed position in which the portion of the ladder is positioned outside the cavity.

9. The toolbox assembly of claim 8, wherein the ladder is pivotably coupled to the base and configured to rotate relative to the base during transition between the stowed position and the deployed position.

10. A toolbox assembly for use with a vehicle, the toolbox assembly comprising:
a housing that defines a cavity;
a ladder coupled to the housing, the ladder movable relative to the housing while the ladder is coupled to the housing; and
a locking device coupled to the base, the locking device comprising:
an outer casing; and
a lock disposed within the outer casing and moveable between:
a locked positioned; and
an unlocked position,
wherein the ladder is movable relative to the housing between:
a first position in which the ladder is disposed within the cavity; and
a second position in which the ladder is disposed outside the cavity,
wherein the housing comprises:
a base comprising a first end and a second end opposite the first end; and
a lid coupled to the base, the lid is moveable between:
a closed position in which the lid covers an opening defined by the base; and
an open position in which at least a portion of the opening is exposed.

11. The toolbox assembly of claim 10, further comprising:
a lock control system coupled to the housing and configured to control operation of the lock between the locked position and the unlocked position, the lock control system comprising:
a controller coupled to the locking device and configured to operate the locking device between the locked position and the unlocked position;
a receiver configured to receive a first signal from a remote device and communicate the first signal to the controller;
a transmitter configured to transmit a second signal from the controller; and
a power source coupled to the locking device.

12. A method of operating a toolbox coupled to a vehicle, the method comprising:
supporting, by a toolbox, a ladder within a first cavity defined by a base and a lid while the lid is in a closed position;
rotating, while the ladder is coupled to the toolbox, the lid relative to the toolbox to an open position;
supporting, by the toolbox, the ladder outside of the first cavity, while the lid is in the open position; and
moving the ladder relative to the lid.

13. The method of claim 12, wherein rotating the ladder relative to the toolbox further comprises:
while the lid is in an open position:
rotating the ladder about a pivot point with respect to the base; and
extending a portion of the ladder; and
wherein the portion of the ladder comprising at least one step.

14. The method of claim 13, further comprising:
after extending the portion of the ladder:
collapsing the portion of the ladder;
rotating the ladder about the pivot point to stow the ladder within a cavity of the base; and
closing the lid.

15. A toolbox assembly for use with a vehicle, the toolbox assembly comprising:
a housing that comprises:
a base;
a first lid coupled to a first end of the base; and
a second lid coupled to a second end of the base;
each lid of the first lid and the second lid moveable between:
a first position in which the lid covers an opening defined by the base; and
a second position in which at least a portion of the opening is exposed; and
a first ladder coupled to the base, the first ladder movable relative to the base while the first ladder is coupled to base.

16. The toolbox assembly of claim 15, further comprising a second ladder coupled to the base, the second ladder movable relative to the base while the second ladder is coupled to the base.

17. The toolbox assembly of claim 15, further comprising:
a locking device coupled to the base, the locking device comprising:
an outer casing; and
a lock disposed within the outer casing and comprising:
one or more members moveable between
a locked position in which a portion of at least one of the one or more members is positioned outside the outer casing; and
an unlocked position in which the portion of the one or more members is positioned within the outer casing;
wherein:
the outer casing is positioned between the first lid and the second lid; and
while each lid is in the first position and the lock is in a locked position, each lid is in a locked state.

18. The toolbox assembly of claim 17, further comprising:
a controller coupled to the locking device and configured to operate the locking device between the locked position and the unlocked position;
a receiver configured to receive a first signal from a remote device and communicate the first signal to the controller;
a transmitter configured to transmit a second signal from the controller; and
a power source coupled to the locking device.

19. The toolbox assembly of claim 15, wherein:
the base comprises a first modular bin and a second modular bin coupled together to define the base;
a first end of the first lid is coupled to a first end of the first modular bin;
a first end of the second lid is coupled to a first end of the second modular bin; and
the first lid and second lid are independently movable relative to the base.

20. The toolbox assembly of claim 19, wherein:
at least a portion of the base is configured to be disposed within a truck bed such that the first end of the base and the second end of the base are positioned on opposing sides of the truck bed.

21. A toolbox assembly for use with a vehicle, the toolbox assembly comprising:
- a housing that defines a cavity, the housing including:
  - a base; and
  - a lid coupled to the base; and
- a ladder coupled to the housing, the ladder movable relative to the housing while the ladder is coupled to the housing;
- wherein the ladder is movable relative to the housing between:
  - a first position in which the ladder is disposed within the cavity; and
  - a second position in which the ladder is disposed outside the cavity.

* * * * *